(12) United States Patent
Abousleman

(10) Patent No.: US 6,192,158 B1
(45) Date of Patent: Feb. 20, 2001

(54) WAVELET IMAGE CODER USING TRELLIS-CODED QUANTIZATION

(75) Inventor: Glen Patrick Abousleman, Scottsdale, AZ (US)

(73) Assignee: Motorola, Inc., Schaumburg, IL (US)

(*) Notice: Under 35 U.S.C. 154(b), the term of this patent shall be extended for 0 days.

(21) Appl. No.: 09/050,202

(22) Filed: Mar. 30, 1998

(51) Int. Cl.[7] ................................. G06K 9/36; H04L 5/12
(52) U.S. Cl. ........................... 382/240; 382/248; 375/265
(58) Field of Search ................................... 382/240, 232, 382/226, 248–276; 375/265, 261, 434, 285, 296; 371/43.4

(56) References Cited

U.S. PATENT DOCUMENTS 4,959,382 * 9/1990 Bardell, Jr. ............................ 714/739

OTHER PUBLICATIONS

Sriram, P. and Marcellin, M.W., "Image Coding Using Wavelet Transforms and Entroph–Constrained Trellis Coded Quantization," IEEE Transactions on Image Processing, vol. 4, No. 6, Jun. 1995, pp. 725–733.*

Qing Chen and Thomas R. Fischer, "Robust Quantization for Image Coding and Noisy Digital Transmission," Conference: Snowbird, UT, USA, Mar. 31–Apr. 3, 1996, pp. 3–12.*

* cited by examiner

Primary Examiner—Thomas D. Lee
Assistant Examiner—Wenpeng Chen
(74) Attorney, Agent, or Firm—John C. Scott; Timothy J. Lorenz; Frank J. Bogacz

(57) ABSTRACT

A system (8) for digital processing of optical image data includes a wavelet decomposition unit (12) for decomposing an input image (10) into a plurality of frequency subbands. Each subband is then converted to a frequency domain representation, phase scrambled, and then converted back into a time domain representation in a phase scrambling unit (14). The subbands are then subject to trellis coded quantization (TCQ) in a trellis coded quantization encoding unit (16, 40) before being transmitted into a channel (28). In one embodiment, fixed rate trellis coded quantization (FRTCQ) is used in a communications system having a relatively noiseless channel.

19 Claims, 2 Drawing Sheets

WAVELET IMAGE CODER USING TRELLIS-CODED QUANTIZATION

The present application is based on prior U.S. application Ser. No. 08/886,502, filed on Jul. 1, 1997, which is hereby incorporated by reference, and priority thereto for common subject matter is hereby claimed.

FIELD OF THE INVENTION

This invention relates in general to image coders and, more particularly, to image coders utilizing wavelet decomposition and trellis coded quantization.

BACKGROUND OF THE INVENTION

Image compression algorithms generally try to reduce the number of bits required to represent digital imagery while adhering to certain quantitative and subjective image fidelity criteria. Techniques such as JPEG (an algorithm which was standardized by Joint Pictures Expert Group to compress still imagery) and other more advanced designs utilizing variable-length entropy coding are extremely susceptible to channel errors. This susceptibility may make these types of image coders useless when operated over very noisy channels or where the amount of error protection (channel coding) required would not be acceptable.

What is needed is a very high-performance image coder which is robust to channel errors when operated over the binary symmetric channel. The coder should provide state-of-the-art performance with no channel errors present and graceful degradation as channel errors increase. Additionally, the coder should be of modest complexity to enable implementation on a variety of platforms. This type of coder would find application in wireless digital battlefield communications as well as any type of military system needing transmission of high-resolution imagery over noisy, low-bandwidth channels.

DETAILED DESCRIPTION OF THE PREFERRED EMBODIMENTS

There have been several approaches to designing quantizers which operate over binary symmetric channels (BSC). These have included channel-optimized scalar quantization (COSQ), for example, as discussed by N. Farvardin and V. Vaishampayan, in "Optimal Quantizer Design for Noisy Channels: An Approach to Combined Source-Channel Coding," *IEEE Trans, Inform. Theory,* vol. 33, pp. 827–838, November, 1987 and channel-optimized trellis-coded quantization (COTCQ), for example, as discussed by M. Wang and T. R. Fischer, in "Trellis-Coded Quantization Designed for Noisy Channels," *IEEE Trans. Inform. Theory,* vol. 40, pp. 1792–1802, November, 1994, among others, which publications are incorporated in Appendices B and C, respectively for their teachings, especially with respect to trellis coding (block 16) and decoding (block 30) publication "Robust Quantization For Image Coding and Noisy Digital Trnamission" by Q. Chen and T. R. Fischer, published in the Conference Proceedings of the Data Compression Conference, Snowbird, Utah, March, 1996, is incorporated in Appendix A.

As used herein, the term "binary symmetric channels" refers to a channel wherein noise causes some number of bits to "flip" at random, i.e., a bit that is supposed to be a logical one becomes a logical zero, or vice versa, and wherein the probability of a logical one becoming a logical zero is the same as the probability of a logical zero becoming a logical one. This behavior is typical of wireless channels having noise (block 28) and radio digital links are examples of binary symmetric channels.

Table 1 shows the obtained signal to noise ratio of COSQ when encoding the memoryless Gaussian, Laplacian, and generalized Gaussian (a=0.5) sources at 3 bits/sample, as a function of bit error probability (BEP). Also shown are the respective rate-distortion function values when BEP=0.005.

TABLE 1

| | SNR (in dB) of COSQ for various distributions at 3 bits/sample. | | | | |
|---|---|---|---|---|---|
| | $D (R)$, $P_b = .005$ | $P_b = .005$ | $P_b = .01$ | $P_b = .05$ | $P_b = .10$ |
| Gen. Gaussian | 20.97 | 8.35 | 7.23 | 4.05 | 2.32 |
| Lapiacian | 17.87 | 10.49 | 9.17 | 5.18 | 3.62 |
| Gaussian | 17.24 | 12.04 | 10.50 | 6.47 | 4.67 |

From Table 1, it is evident that the encoded performance of COSQ is opposite in order to that theoretically possible as seen from the rate-distortion functions. That is, COSQ achieves the best possible SNR performance when encoding the memoryless Gaussian source, and degraded performance when encoding all other generalized Gaussian sources with shape parameters α of less than 2. Note that these same general performance characteristics hold true when COTCQ is employed.

Figure 1:
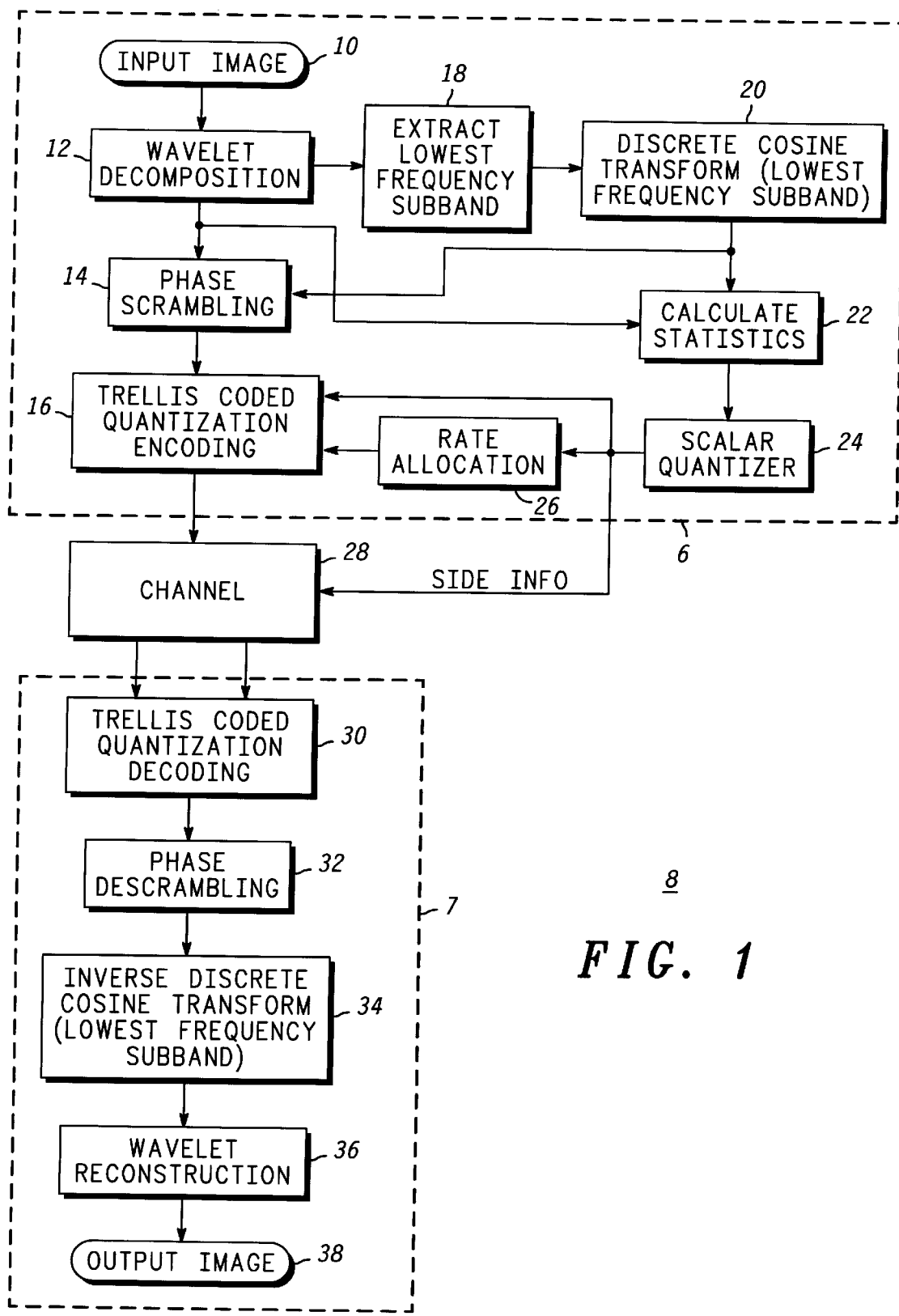
FIG. 1 is a block diagram illustrating a wavelet image coder/decoder in accordance with one embodiment of the present invention.

FIG. 1 serves as a simplified schematic view of a wavelet image coder/decoder system 8 using robust channel-optimized trellis-coded quantization in accordance with the teachings of the present invention. As illustrated, system 8 includes an image coder 6 that communicates digital images to an image decoder 7 via a channel 28. That is, the image coder 6 is, in the preferred embodiment, part of a transmitter and the image decoder 7 is part of a receiver in a communications system. In the preferred embodiment of the present invention, a robust quantization method is employed whereby the signal to be quantized (block 10) is all-pass filtered (block 14) to produce a signal with Gaussian statistics. Since the ideal all-pass filter does not change the frequency response magnitude, the implementation of the filtering operation can be done by changing the frequency phase response of the input. A simple way to do this is to scramble the phase spectra of the input source by adding some randomized reference phase spectra as prefiltering, and then adding the same, but negative reference phase spectra as postfiltering, to recover the original phase spectra of the source. A large variety of reference signals could be chosen. One possible choice of the reference phase spectra is the binary phase spectra of a pseudo-noise signal or the m-sequence. The size of the pseudo-noise signal should be the same as that of the input source. If the input source is a two-D signal (e.g., an image), the two-D quasi-m-array can be used as the pseudo-noise signal. The quasi-m-array is generated by two identical m-sequences. Since the binary pseudo-noise phase can be pre-computed and stored, prefiltering and postfiltering can be easily carried out, however, an FFT and inverse FFT are needed for each filtering operation, which increases the computational complexity of encoding and decoding. FIG. 3 of Appendix A shows the implementation of the all-pass filtering operation by phase-scrambling. Since fixed-rate channel-optimized trellis-coded quantization (block 16) is used, the performance curves obtained by quantizing the memoryless Laplacian source or any generalized Gaussian source (with shape parameter of a<2), will be elevated to the performance of the encoded Gaussian source. Fixed-rate channel-optimized trellis-code quantization (Block 16) is shown in sufficient detail for one of ordinary skill in the art to understand at page 1793 of Appendix C which is entitled "Trellis-Coded Qantization Designed For Noisy Channels".

The all-pass filter is implemented by using a phase scrambling operation (block 14). The input sequence x(n) is transformed using an FFT, and pseudo-random noise is added to the phase component. An inverse FFT is then performed with the resulting sequence y(n) being (nearly) Gaussian distributed. In this way, the performance curve of a Gaussian channel-optimized quantizer can be achieved with a broad range of source distributions. Thus, a fixed (Gaussian) rate-distortion performance is guaranteed, independent of the source distribution.

In image decoder 7, phase descrambling (block 32) is accomplished via a similar sequence of operations as were employed for the scrambling (block 14) using the same (but negative reference) pseudo-random noise sequence to recover the phase in the restored image (block 38). The descrambling operation (Block 32) is similar to that described above for the phase scrambling operation (Block 14) and is shown in detail beginning at the last paragraph of page 6 and continuing through to FIG. 3 at page 7 of Appendix A as was mentioned above.

For operation over binary symmetric channel 28, a channel optimized version of trellis-coded quantizing encoder 16 and decoder 30 was developed, as is discussed by M. Wang and T. R. Fischer, in "Trellis-Coded Quantization Designed for Noisy Channels," *IEEE Trans. Inform. Theory,* vol. 40, pp. 1792–1802, November, 1994, which is hereby incorporated by reference. It is shown that for bit error probabilities greater than 0, a 4-state COTCQ system outperformed 8-dimensional channel-optimized vector quantization (COVQ) for encoding the memoryless Gaussian source. Moreover, the COTCQ system greatly outperforms the COSQ system reported in N. Farvardin and V. Vaishampayan, "Optimal Quantizer Design for Noisy Channels: An Approach to Combined Source-Channel Coding," *IEEE Trans. Inform. Theory,* vol. 33, pp. 827–838, November, 1987. For implementation of trellis-coding quantization decoding (Block 30) see again, page 1793 of Appendix C. This is explained similar to that for the encoding process (Block 16) as was mentioned above.

Image coder 6 of the instant invention is based on wavelet decomposition (block 12) used in conjunction with robust channel-optimized trellis-coded quantization (block 16). Input image 10 is transformed using the 2-D discrete wavelet transform 12 (DWT) into 16 equal-sized subbands. The lowest frequency subband (LFS) is partitioned into non-overlapping 4×4 blocks (block 18) and transformed using 2-D discrete cosine transform 20 (DCT). The lowest frequency subband contains 90%–95% of the energy in input image 10 and tends to be characterized by a high degree of spatial correlation, i.e., if two consecutive bits are known, the next bit can be estimated or guessed. The higher frequency subbands tend to have a low degree of correlation and therefore do not require the discrete cosine transform process (which results in a sequence having substantially less correlation). "Like" DCT coefficients (i.e., those coefficients corresponding to the same DCT frequency position within each 4 by 4 block) are collected into sequences as are the remaining 15 high-frequency subbands (block 20). Each sequence is separately all-pass filtered (using the phase scrambling technique, block 14) and encoded (block 16) using fixed-rate channel-optimized TCQ designed for the memoryless Gaussian source.

In calculating statistics (block 22) for the data, the sequence corresponding to the DC discrete cosine transform coefficients has nonzero mean while the remaining "non-DC" discrete cosine transform coefficient sequences as well as the 15 high-frequency subbands are assumed to have a mean of zero. All discrete cosine transform and high-frequency subbands are normalized by subtracting their mean (only the sequence corresponding to the DC or lowest frequency subband transform coefficients has non-zero mean) and by dividing by their respective standard deviations (block 22). These quantities are quantized (block 24) using 8-bit uniform scalar quantization and are sent directly via the digital channel (block 28) while sequence variances are processed to determine a rate allocation (block 26) that provides an optimal signal to noise ratio (SNR) when the image data are trellis-coded quantization encoded (block 16). A greater variance corresponds to greater signal energy and this in turn determines the number of bits to be selected for optimal signal to noise properties in the encoded signal. In other words, a choice between 2, 4 etc. bit encoding is made based on rate distortion characteristics describing predetermined signal to noise characteristics and the required bit rate, as is described in "Efficient Bit Allocation For An Arbitrary Set Of Quantizers", by Shoham et al., *IEEE Trans. Acoust., Speech, Signal Processing,* vol. ASSP-36, no. 9, pp. 1445–1453, September 1988, which is hereby incorporated by reference.

Following transmission (block 28), received data are decoded (block 30), the phase is descrambled (block 32) and an inverse discrete cosine transform of the lowest frequency subband is performed (block 34). Wavelet reconstruction (block 36) recombines the sixteen subbands into an output image 38.

Image coder 16, 30 of the instant invention is an extension of the coder presented in the paper "Robust Quantization for Image Coding and Noisy Digital Transmission" by Chen et al., in *Conf. Proceedings,* Data Compression Conference, Snowbird, Utah, March, 1996, which is hereby incorporated in Appendix A. It is based on COSQ and utilizes a 13-band pyramid decomposition.

Applicant has discovered that a symmetric 16-band decomposition with 2-D DCT encoding (block 20) of the LFS provides significantly higher performance than the 13-band system. Additionally, applicant has also discovered that entropy-constrained TCQ (ECTCQ) utilized in a system similar to the one discussed here, vastly outperforms (both quantitatively and subjectively) the identical system using entropy-constrained scalar quantization (ECSQ). Applicant expects a similar increase in performance by using COTCQ as opposed to COSQ, especially when the BEP is less than 0.05. Moreover, applicant expects this coder to exhibit the same graceful degradation characteristics with increasing channel BEP as shown in Q. Chen and T. R. Fischer, "Robust Quantization for Image Coding and Noisy Digital Transmission," in *Conf. Proceedings,* Data Compression Conference, Snowbird, Utah, March, 1996.

Thus, a technique has been described which overcomes specific problems and accomplishes certain advantages relative to prior art methods and mechanisms. The improvements over known technology are significant. This technique combines a method for converting any memoryless sequence to a Gaussian sequence (robust quantization) for more efficient quantization, with wavelet decomposition, channel-optimized trellis-coded quantization, and optimal rate allocation, to produce an image coder providing state-of-the-art image compression performance when operated over extremely noisy channels. This algorithm may be implemented in hardware and/or software in any system utilizing wireline or wireless communications where high-quality, low-bit-rate image transmission over extremely noisy channels.

Figure 2:
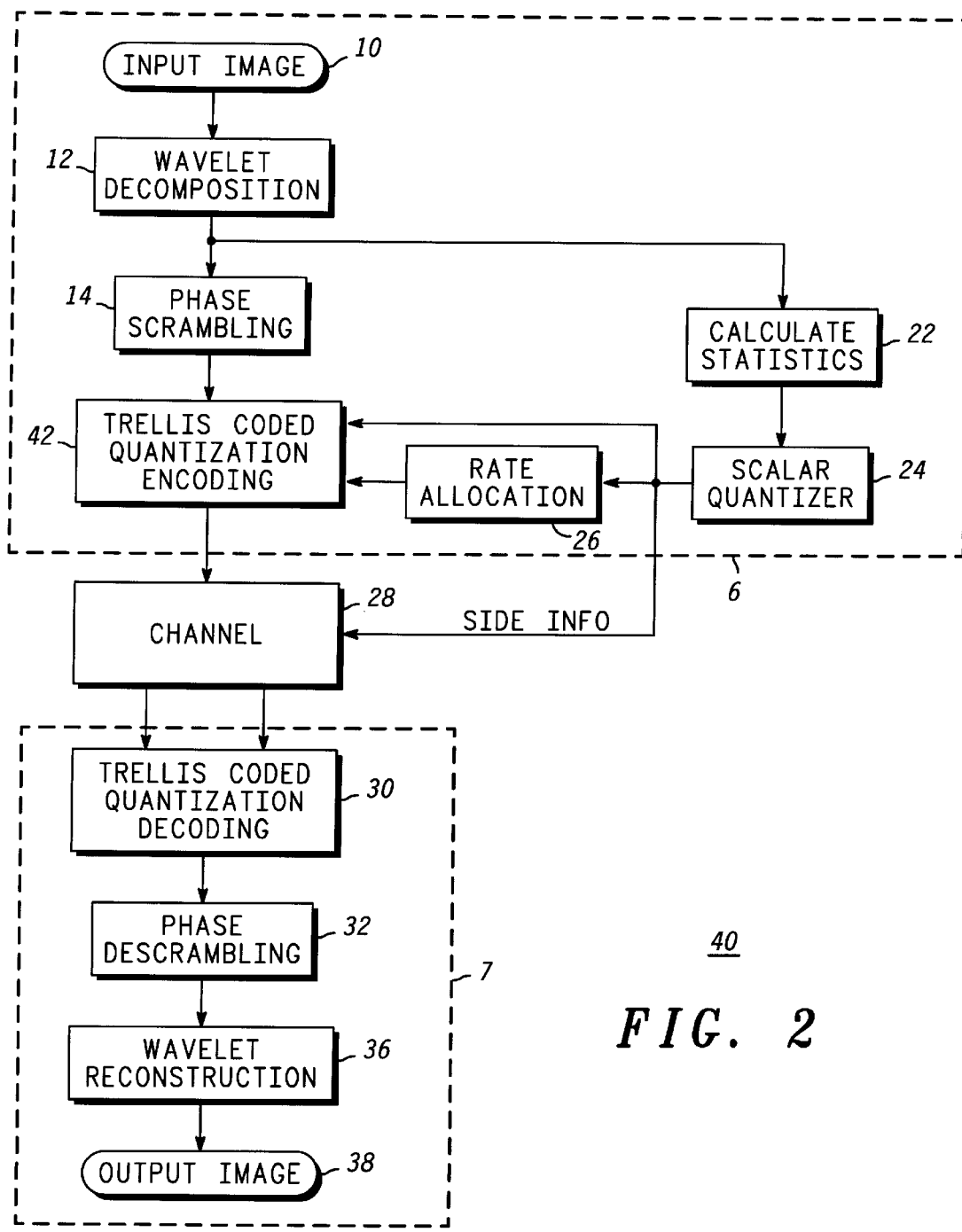
FIG. 2 is a block diagram illustrating a wavelet image coder/decoder in accordance with another embodiment of the present invention.

FIG. 2 is a block diagram illustrating a wavelet image coder/decoder system 40 in accordance with another embodiment of the present invention. Where possible, the same reference numerals are used in FIG. 2 that were used in FIG. 1 to describe similar functionality. As illustrated, the wavelet coder/decoder system 40 does not include the lowest frequency subband (LFS) extraction unit 18 or the discrete cosine transform (DCT) unit 20 of the image coder 6 of FIG. 1. In addition, the wavelet coder/decoder system 40 does not include the inverse discrete cosine transform unit 34 of the image coder 6 of FIG. 1. Instead of processing the LFS using a DCT, the wavelet coder/decoder system 40 further decomposes the LFS with additional levels of wavelet decomposition. In addition, the wavelet coder/decoder system 40 uses a different form of trellis coded quantization (i.e., fixed rate TCQ) than the system 8 of FIG. 1.

As with the previously described system, the coder/decoder system 40 is a non-entropy-coded design utilizing wavelet decomposition, trellis-coded quantization (TCQ), and frequency-domain phase scrambling. The coder/decoder system 40 combines attributes from the robust quantization design reported in Chen et al. (discussed above) and the wavelet/TCQ coders reported in the papers "Hyperspectral Image Coding Using Wavelet Transforms and Trellis Coded Quantization" by G. P. Abousleman, *Wavelet Applications II,* H. Szu, Editor, Proc. SPIE 2491, 1995, and "Image Coding Using Wavelet Transforms and Entropy-Constrained Trellis-Coded Quantization" by Sriram et al., *IEEE Trans. Image Processing,* vol. 4, June, 1995, both of which are hereby incorporated by reference.

The system 8 of FIG. 1 is designed for use with noisy channels, and, therefore, it was determined that COTCQ quantization techniques would be used in the trellis coded quantization encoding unit 16. Use of COTCQ generally requires a large matrix of codebooks to be generated that includes one set of codebooks for every operational channel bit error rate. The system 40 of FIG. 2, on the other hand, is designed for use with a channel that approximates a noiseless channel and, therefore, it was determined that the less complex fixed rate trellis coded quantization (FRTCQ) would be used in the trellis coded quantization encoding unit 42. FRTCQ uses a different rate allocation scheme than COTCQ and thus requires a much smaller number of codebooks and less codebook storage than the COTCQ system. In a preferred embodiment, only 8 codebooks are used (the largest of which is only 512 codewords in length) requiring less than 1024 floating-point codewords of codebook storage. The system 40 of FIG. 2 is designed for use in a communications system that utilizes some form of channel noise mitigation to approximate a noiseless channel. For example, in one embodiment of the invention, the system 40 is implemented in a communications system that utilizes adaptive-rate coded digital image transmission to reduce the effects of noise in the channel. Adaptive-rate coded digital image transmission refers to a system that is capable of adapting transmission characteristics based on the present condition of the channel 28, as sensed in the transmitter or, preferably, in the receiver (as discussed in a co-owned, co-pending application entitled "Adaptive-Rate Coded Digital Image Transmission" having inventors Kleider and Abousleman, which is hereby incorporated by reference).

The following discussion is with reference to FIG. 2. As before, the signal to be quantized is all-pass filtered to produce a signal with Gaussian statistics. The all-pass filter is implemented using a phase scrambling operation in the phase scrambling unit 14. That is, the input sequence, x(n), is transformed using the fast Fourier transform (FFT), and separated into its magnitude and phase components. The phase spectrum of an appropriate reference function is then added to the phase spectrum of the input sequence. An inverse FFT is then performed with the resulting sequence, y(n), being (nearly) Gaussian distributed. In this way, the performance curve of a Gaussian-optimized quantizer can be achieved with a broad range of source distributions.

A convenient reference function for the all-pass filtering operation is the binary pseudo-noise (PN) sequence, also known as the m-sequence. The m-sequence is chosen because of its ease of generation and its autocorrelation properties. The sequence utilized in the system discussed herein is generated from a feedback shift register corresponding to the 16th-order primitive polynomial $x^{16}+x^5+x^3+x+1$ [11]. The sequence is then truncated to the appropriate length (as determined by the size of a given subband) prior to Fourier transformation, thus guaranteeing frequency-domain phase symmetry.

In a preferred embodiment, the image to be encoded is decomposed into 22 subbands using a modified Mallat tree configuration in the wavelet decomposition unit 12. That is, the image is initially decomposed into 16 equal-sized subbands, with two additional levels of decomposition being applied to the lowest-frequency subband. Decomposition is preferably performed using a plurality of high pass filters and low pass filters. Each subband is collected into a one-dimensional sequence and separately all-pass filtered in the phase scrambling unit 14 and encoded using fixed-rate trellis coded quantization (FRTCQ) in the trellis coded quantization encoding unit 16 designed for the memoryless Gaussian source. A discussion of FRTCQ can be found in the paper "Trellis Coded Quantization of Memoryless and Gauss-Markov Sources" by Marcellin et al., *IEEE Trans. Commun.*, vol. 38, Jan, 1990, which is hereby incorporated in Appendix D. Sections III–V, pages 83–86, of Appendix D show a fixed rate trellis coded quantization (FRTCQ) unit for performing a FRTCQ on phase scrambled frequency subbands. All subbands are normalized by subtracting their mean (only the sequence corresponding to the lowest-frequency subband is assumed to have non-zero mean) and dividing by their respective standard deviations. The mean values and standard deviation values are determined in the calculate statistics unit 22.

The total side information to be transmitted consists of the mean value of the lowest-frequency subband and the standard deviation values of all 22 subbands. In a preferred embodiment, these quantities are quantized with 16-bit uniform scalar quantizers using a total of 368 bits in the scalar quantizer unit 24. The compression ratio is also transmitted and allotted 10 bits. These quantities are assumed to be transmitted with no channel errors. Finally, the initial trellis state (for use in the TCQ encoding unit 16) for each encoded sequence requires 2 bits (for a 4-state trellis). The total side information then consists of 422 bits per image.

Fixed-rate TCQ codebooks are designed in one-bit increments from 1 to 8 bits/sample. The training sequence consisted of 100,000 samples derived from a Gaussian pseudo random number generator. Codebook design uses a modified version of the generalized Lloyd algorithm for vector quantizer design.

Rate allocation is performed in the rate allocation unit 26 by using the iterative technique discussed in Shoham et al. The algorithm allocates bits based on the rate-distortion performance of the various trellis-based quantizers and the energy content of the wavelet coefficients. This rate allocation procedure allows precise bit rate specification, independent of the image to be coded.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

APPDENDIX A

ROBUST QUANTIZATION FOR IMAGE CODING AND NOISY DIGITAL TRANSMISSION[1]

Qing Chen and Thomas R. Fischer
School of Electrical Engineering and Computer Science
Washington State University
Pullman, WA 99164-2752, USA

Abstract

A robust quantizer is developed for encoding a variety of memoryless sources and transmission over the binary symmetric channel (BSC). The system combines channel optimized scalar quantization (COSQ) with all-pass filtering, the latter performed using a binary phase-scrambling/descrambling method. Applied to a broad class of sources, the robust quantizer achieves the same performance as the Gaussian COSQ for the memoryless Gaussian source. This quantizer is used for image coding for transmission over a BSC. An explicit error protection code is used only to protect side information. The PSNR performance degrades gracefully as the channel bit error rate increases.

I  Introduction

Approaches to designing scalar and vector quantizers for use over a binary symmetric channel (BSC) include Farvardin and Vaishampayan's channel optimized scalar quantization (COSQ) [1], and channel optimized vector quantization (COVQ) [2], Ayanoğlu and Gray's trellis waveform coding [3], and Wang and Fischer's channel optimized trellis coded quantization (COTCQ) [4]. For a given VQ design, Farvardin [5], Zeger and Gersho [6], and Hagen and Hedelin [7] have developed algorithms to assign binary codewords to index the VQ codevectors to minimize the distortion caused by channel errors. This has been called pseudo-Gray VQ [6]. Laroia and Farvardin's scalar vector quantizer (SVQ) [8] is representative of the good VQ performance that can be achieved, provided channel errors are not a significant problem. Figure 1 compares the performance of these methods for a memoryless Gaussian source. It is evident that if the channel bit error rate is significant (larger than about $10^{-2}$) very

---

[1]This work was supported, in part, by the National Science Foundation under Grant NCR-9303868 and by a Grant from Intel Corporation.

4 little improvement over channel optimized scalar quantization is achieved. Figure 2 compares the performance of COSQ to the distortion-rate function evaluated at the channel capacity (termed the optimal performance theoretically attainable (OPTA)) for Gaussian, Laplacian, and generalized Gaussian (with shape parameter $\nu = 0.5$) sources. Two features are evident. The first is that there is large potential performance gain possible whenever the BSC bit error rate (BER) is significant. The second is that the general ordering of the COSQ performance curves for Gaussian, Laplacian, and generalized Gaussian ($\nu = 0.5$) sources is exactly opposite to the ordering of their respective optimal performance theoretically attainable.

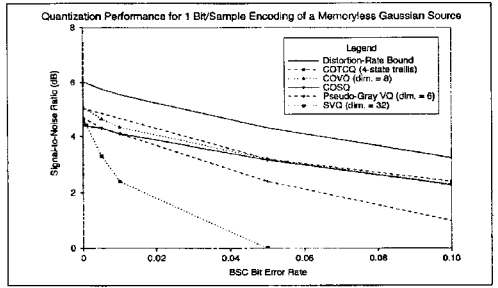

Figure 1: SNR performance of various quantizers for the memoryless Gaussian source.

Popat and Zeger [9] introduce a robust quantization method (for noiseless channels) based on all-pass filtering followed by (Lloyd-Max) scalar quantization. They show that a properly designed filter can change any of a wide class of source distributions into one that is near-Gaussian. By using the Gaussian pdf-optimized scalar quantizer, a fixed rate-distortion performance is achieved, independent of the source distribution. For the class of encoding systems restricted to using simple, fixed-rate scalar quantization, the proposed scheme offers advantage, since the signal-to-noise ratio (SNR) performance of the pdf-optimized scalar quantizer for the Gaussian source can be significantly larger than the SNR performance for other sources and their respective pdf-optimized quantizers. This conclusion, however, is mitigated by two observations. First, the complexity of the all-pass filtering is significantly larger than the complexity of scalar quantization. If one compares equal-complexity encoding schemes, then the method in [9] may offer no advantage. For example, for an encoding rate less than about 4 bits/sample and memoryless sources with a generalized Gaussian density [1] with small shape parameter $\nu$ (say, $\nu \leq 1$), an equal-complexity tree-structured vector quantizer may dramatically outperform (in SNR) the scheme in [9]. Second, the all-pass filtering implicitly limits the possible encoding

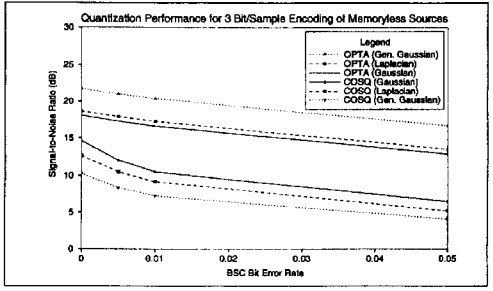

Figure 2: SNR performance of the COSQ for the generalized Gaussian sources performance to the rate-distortion function of a memoryless Gaussian source, and this performance limit can be far from the true rate-distortion function of the source.

We note that the ordering of the COSQ curves in Figure 2 is consistent as the BSC bit error rate changes and that the same ordering occurs for other encoding rates [1]. Unlike the situation considered in [9] (corresponding to $\rho = 0$ in Fig. 2) for which very good performing multidimensional quantization methods are known, when the channel bit error rate is large, good performing VQ methods (that is, close to the OPTA) are not known and very little improvement over COSQ has yet been achieved. The robust quantizer described in this paper, then, can be viewed as a combination of the all-pass filtering approach of Popat and Zeger, but combined with the COSQ for applications where the BSC bit error rate is large.

In transform or subband image coding, the perceptual effect of transmission errors depends significantly on the frequency band of the affected coefficient. In general, transmission bit errors have more pronounced perceptual effect on low frequency image information than on high frequency information. If we assume scalar quantization of image transform or subband coefficients followed by fixed-length binary encoding of each quantization level, then isolated transmission bit errors cause isolated errors in the decoded (transform or subband) quantized coefficient amplitudes. BSC bit errors then tend to cause impulsive noise at the decoder, and it is the impulse response of the decoder synthesis filter that produces the transmission error artifacts in the decoded image. Since, for typical natural scenes, most of the image energy is in the low frequency information, transmission bit errors tend to cause the largest amplitude errors in the lower frequencies and these errors tend to be more noticeable and objectionable.

Kuo and Huang [10] introduce an all-pass filtering method (referred to as "phase-scrambling") for reducing the perceptual effect of transmission error in DCT image coding. The basic idea underlying this method is to "spread out" the energy introduced by transmission bit errors over many transform coefficients. The total transmission-error-caused noise power is unchanged, but it is no longer an impulsive noise; instead the noise power is spread out over many coefficients. The perceptual advantage is dramatic.

In this paper it is shown that by a simple use of all-pass filtering, the COSQ performance curve of the memoryless Gaussian source can be achieved for a broad class of sources. In the context of Figure 2, the bottom two performance curves are "lifted up" to the level of the Gaussian COSQ. This method is referred to as robust COSQ and is a generalization to noisy channels of the approach in [9]. Then, the robust quantizer is used in subband image coding. Unlike the proposed method in [10] where all-pass filtering is implemented using phase scrambling based on whole-image FFT's, we consider the perceptual importance on different frequency bands. The general conclusion is that while significant SNR improvement can be achieved by using the robust COSQ in all bands, only the lowest frequency subbands (or transform coefficients) need be processed in this way to obtain most of the perceptual benefit. This latter observation leads to a much less complex implementation since only a relatively few of the image subband pixels need be all-pass filtered.

II   The Robust COSQ

A   The Overall Encoding System Structure

Farvardin and Vaishampayan[1] develop an iterative algorithm for designing a locally optimum, joint source/channel quantizer and coder for the class of generalized Gaussian distributions and the binary symmetric channel. This quantizer is referred to as the channel-optimized scalar quantizer. Figure 2 shows that COSQ achieves a higher SNR for the Gaussian source than for the Laplacian and generalized Gaussian (with small shape parameter) sources. A robust quantizer is proposed with the goal of encoding any memoryless source and achieving the performance of the COSQ for the Gaussian source.

In [9], the encoding system uses a fixed-rate SQ, but filters the memoryless source before and after quantizing. If the all-pass filter is properly designed, the filtered signal will have an approximately Gaussian marginal distribution. The MSE for the overall system is then (approximately) equal to that incurred by quantizing a memoryless Gaussian source.

Since the ideal all-pass filter does not change the frequency response magnitude, the implementation of the filtering operation can be done by changing the frequency phase response of the input. A simple way to do this is to scramble the phase spectra of the input source by adding some randomized reference phase spectra as prefiltering, and then adding the same, but negative reference phase spectra as postfiltering, to recover the original phase spectra of the source [10]. A large variety of reference signals could be chosen. One possible choice of the reference phase spectra is the binary phase spectra of a pseudo-noise signal [10] or the $m$-sequence [11]. The size of the pseudo-noise signal should be the same as that of the input source. If the input source is a 2-D signal (e.g., an image), the 2-D quasi-$m$-array can be used as the pseudo-noise signal. The quasi-$m$-array [12] is generated by two identical $m$-sequences. Since the binary pseudo-noise phase can be pre-computed and stored, prefiltering and postfiltering can be easily carried out, however, an FFT and inverse FFT are needed for each filtering operation, which increases the computational complexity of encoding and decoding. Figure 3 shows the implementation of the all-pass filtering operation by phase-scrambling.

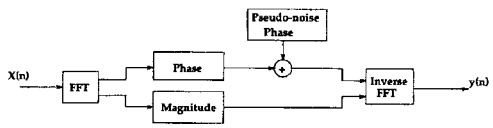

Figure 3: All-pass filtering: prefiltering by phase scrambling

Figure 4 shows the overall *robust quantization* system structure. The memoryless source sequence, $x(n)$ is converted to a sequence $y(n)$ with (approximately) Gaussian distribution. Encoding $y(n)$ using the Gaussian COSQ followed by transmission over the BSC and decoding yields $\hat{y}(n)$. Applying the phase descrambling operation to $\hat{y}(n)$, yields $\hat{x}(n)$.

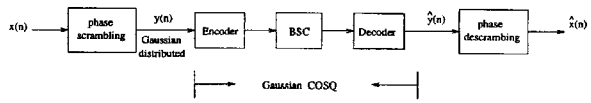

Figure 4: Block diagram of the overall system

*Proposition:* For the encoding of a broad class of memoryless sources, it is always possible to achieve the performance of the Gaussian channel-optimized scalar quantizer (COSQ) for a memoryless Gaussian source.

Proof:

1. Let $\underline{x}$ be an $L$-tuple vector from the source. Use *all-pass filtering* to form $y$. The filtering, which is unitary, does not change the variance of the source, $$\sigma_y^2 = \sigma_x^2.$$

The components of $\underline{y}$ are (approximately) Gaussian [9].

2. Encode $\underline{y}$ as $\underline{\hat{y}}$, one dimension at a time, using the Gaussian COSQ.

3. Let $\underline{\hat{y}}$ be the receiver version of $\underline{\tilde{y}}$. Apply the inverse phase scrambling to get $\underline{\hat{x}}$. We have $$\frac{1}{L}\|\underline{x} - \underline{\hat{x}}\|^2 = \frac{1}{L}\|\underline{y} - \underline{\hat{y}}\|^2$$

and $E\{\frac{1}{L}\|\underline{y} - \underline{\hat{y}}\|^2\}$ is the Gaussian channel optimized scalar quantizer performance.

∎

Comment: In practice, the source need not be memoryless. The distribution of $y(n)$ still tends toward Gaussian provided the range of support for the all-pass filtering is significantly larger than the range of dependence in the source data.

B Experimental Results

Table 1 compares the proposed robust quantizer SNR performance to the COSQ performance for the Gaussian, Laplacian, and generalized Gaussian (with shape parameter $\alpha = 0.5$) sources at an encoding rate of $r = 3$ bits/sample, for channel BER of $\epsilon = 10^{-3}, 10^{-2}$, and $10^{-1}$. The size of the input signal is 512 by 512. The all-pass filtering is done using the binary phase spectra of the 512 by 512 pseudo-noise array which is a 511 by 511 quasi-$m$-array (with the feedback taps [9,6,5,4,2,1]) with the boundaries filled with zeros [10]. As illustrated in Table 1, the SNR performance of the proposed quantizer is superior to that of the COSQ for Laplacian and generalized Gaussian sources in all cases. The SNR improvement is as large as 4.8 dB for the generalized Gaussian source. For the memoryless Gaussian source, the performances of these two quantizers are naturally identical.

|      | $\epsilon = 0.001$ | | $\epsilon = 0.010$ | | $\epsilon = 0.100$ | |
|------|------|------|------|------|------|------|
|      | COSQ | RQ | COSQ | RQ | COSQ | RQ |
| GG   | 9.18 | 13.96 | 7.23 | 10.55 | 2.32 | 4.68 |
| Lap  | 12.09 | 13.98 | 9.18 | 10.56 | 3.79 | 4.67 |
| Gaus | 13.98 | 13.98 | 10.55 | 10.55 | 4.67 | 4.67 |

Table 1: SNR (in dB) of the COSQ and the robust quantizer (RQ) for memoryless generalized Gaussian (GG) ($\alpha = 0.5$), Laplacian (Lap), and Gaussian (Gaus) sources at an encoding rate of $r = 3$ bits/sample.

III Image Coding

A subband image coder [13] is developed using a 13-band octave decomposition. A 2-D separable tree-structured QMF filter bank is used for analysis and synthesis of subbands. The 1-D QMF filter bank is the Johnston D-32 filter bank [14]. The subband signals are encoded using the robust quantizer or the COSQ. Several coding structures are considered. In the simplest, termed A-RQ, each subband is separately all-pass filtered (using the phase scrambling method) and encoded using the robust quantizer.

Table 2 compares the peak signal-to-noise ratio (PSNR) performance of the proposed method (A-RQ) to that of several recently proposed vector quantization methods ([15] (SVQ-DCT), [16] (PVQ-SUB), [17] (LVQ-SUB)), and [18] (S/C-SUB(D)) for encoding the Lenna image. In [15], an adaptive 2-D DCT image coding system is used. The DCT coefficients are quantized by scalar-vector quantizers (SVQ). In [16] the fixed-rate pyramid vector quantization [19] (PVQ) with product-code enumeration method is used to encode image subbands. A four-level recursive subband decomposition is used to decompose the image. The lowest frequency, scalar quantized band is protected by repeating the two most significant index bits three times. The PSNR value of this scheme is obtained from the performance curve printed in the paper. In [17], the performance results of subband coding using fixed-rate lattice VQ are reported. The image is decomposed into 13 subbands. All subbands except the 4 lowest frequency bands are classified into 4 classes. The class map is protected using a (7,4) Hamming code. The S/C-SUB(D) system is introduced in [18]. DCT coding is used in the LFS after a 16-band uniform subband decomposition. All other subbands are encoded using entropy-coded scalar quantization. A different rate-compatible punctured convolutional code is used to protect the (Huffman) coded bits for each subband. This joint source/channel coding scheme performs well, but has large complexity. From Table 2 it is clear that except for the S/C-SUB(D) system, the A-RQ system performance is competitive with the other systems when the channel BER is at least about $10^{-3}$. For the case of $\epsilon = 10^{-2}$ and encoding rate of 0.5 bit/pel, the improvement is more than 5.6 dB. When the channel is noise-free or the channel BER is less than about $10^{-3}$, the objective performance of the A-RQ system is significantly less than the other systems. There are two major reasons for this. First, since VQ can achieve boundary and granular gains over SQ, VQ outperforms SQ when the channel is ideal or near ideal. Second, the integer rate allocation restriction for SQ reduces the achieved subband coding gain. Most of the reduction in PSNR performance is due to the scalar quantization of the higher frequency subbands. The main advantage of the robust quantization subband image coder is its modest complexity: no explicit error control coding is used, except to protect the side information.

To illustrate the results, Fig. 5 shows the performance of the robust quantization in a 13-band subband coding system at an overall encoding rate of 0.5 bit/pixel and at several channel bit error rates. At a bit error rate of 0.01, there are virtually no visual artifacts due to channel bit errors. The overall signal-to-noise ratio degrades gracefully as the channel bit error rate increases.

| Rate | | $\epsilon = 0.000$ | $\epsilon = 10^{-4}$ | $\epsilon = 10^{-3}$ | $\epsilon = 10^{-2}$ | $\epsilon = 10^{-1}$ |
|---|---|---|---|---|---|---|
| 1 bpp | A-RQ | 36.72 | 36.54 | 36.02 | 33.57 | 25.40 |
| | SVQ-DCT | 39.00 | N/A | N/A | N/A | N/A |
| | PVQ-SUB | 38.50 | N/A | N/A | N/A | N/A |
| | LVQ-SUB | 39.97 | 38.74 | 32.86 | 25.32 | N/A |
| | S/C-SUB(D) | 38.53 | 37.53 | 36.71 | 35.24 | N/A |
| 0.5 bpp | A-RQ | 33.45 | 33.31 | 33.00 | 31.42 | 24.82 |
| | SVQ-DCT | 35.88 | 32.00 | 22.41 | 13.73 | N/A |
| | PVQ-SUB | N/A | 34.50 | 32.70 | 25.80 | 18.30 |
| | LVQ-SUB | 35.61 | 35.30 | 32.51 | 25.72 | N/A |
| | S/C-SUB(D) | 35.32 | 34.46 | 33.90 | 32.38 | N/A |
| 0.25 bpp | A-RQ | 30.73 | 30.59 | 30.34 | 29.24 | 24.12 |
| | SVQ-DCT | 32.55 | 30.03 | 23.25 | 14.97 | N/A |
| | S/C-SUB(D) | 32.19 | 31.49 | 30.94 | 29.96 | N/A |

Table 2: PSNR (in dB) of the proposed subband encoding system, and the SVQ-DCT, PVQ-SUB, LVQ-SUB, and S/C-SUB(D) systems for encoding the 512 × 512 Lenna image and transmission over a binary symmetric channel with bit error rate $\epsilon$.

References

[1] N. Farvardin and V. Vaishampayan, "Optimal quantizer design for noisy channels: An approach to combined source-channel coding," *IEEE Trans. on Information Theory*, vol. IT-33, no. 6, pp. 827-838, Nov. 1987.

[2] N. Farvardin and V. Vaishampayan, "On the performance and complexity of channel-optimized vector quantizers," *IEEE Trans. on Information Theory*, vol. IT-37, no. 1, pp. 155-160, Jan. 1991.

[3] E. Ayanoğlu and R. M. Gray, "The design of joint source and channel trellis waveform coders," *IEEE Trans. on Information Theory*, vol. IT-33, pp. 855-865, Nov. 1987.

[4] M. Wang and T. R. Fischer, "Trellis coded quantization designed for noisy channels," *IEEE Trans. on Information Theory*, vol. IT-40, pp. 1792-1802, Nov. 1994.

[5] N. Farvardin, "A study of vector quantization for noisy channels," *IEEE Trans. on Information Theory*, vol. IT-36, no. 4, pp. 799-809, July 1990.

[6] K. Zeger and A. Gersho, "Pseudo-Gray coding," *IEEE Trans. on Communications*, vol. COM-38, no. 12, pp. 2147-2158, Dec. 1990.

[7] R. Hagen and P. Hedelin, "Robust vector quantization by a linear mapping of a block code," submitted to *IEEE Trans. on Information Theory*.

[8] R. Laroia and N. Farvardin, "A structured fixed-rate vector quantizer derived from a variable-length scalar quantizer: Part I – memoryless sources," *IEEE Trans. on Information Theory*, vol. IT-39, no. 3, pp. 851-867, May 1993.

[9] A. C. Popat and K. Zeger, "Robust quantization of memoryless sources using dispersive FIR filters," *IEEE Trans. on Communications*, vol. 40, pp. 1670-1674, Nov. 1992.

[10] C. J. Kuo and C. S. Huang, "Robust coding technique- transform encryption coding for noisy communications," *Optical Engineering*, vol. 32, pp. 150-156, January 1993.

[11] R. C. Dixon, *Spread Spectrum Systems*, New York: John Wiley, 1984, pp.56-107.

[12] C. J. Kuo and H.B. Rigas, "2-D quasi m-arrays and Gold code arrays," *IEEE Trans. on Information Theory*, vol. IT-37, pp. 385-388, March 1991.

[13] J. W. Woods, and S. D. O'Neil, "Subband coding of images," *IEEE Trans. on Acoust. speech and Signal Proc.*, vol. 34, pp. 1278-1288, Oct. 1986.

[14] J. D. Johnston, "A filter family designed for use in quadrature mirror filter banks," *Proc. ICASSP*, pp. 291-294, April 1980.

[15] N. Farvardin, F. Camurat and R. Laroia, "An application of fixed-rate scalar-vector quantization in image coding," *Proc. 1994 IEEE Int. Conf. on Image Processing*, vol. I, pp. 598-602, Austin, TX, Nov. 1994.

[16] A. C. Hung and Teresa H.-Y. Meng, "Error resilient pyramid vector quantization for image compression," *Proc. 1994 IEEE Int. Conf. on Image Processing*, vol. I, pp. 583-587, Austin, TX, Nov. 1994.

[17] Z. Mohdyusof and T. R. Fischer, "Subband image coding using a fixed-rate lattice vector quantizer,", *Proc. 1995 IEEE Int. Conf. on Image Processing*, to appear.

[18] N. Tanabe and N. Farvardin, "Subband image coding using entropy-coded quantization over noisy channels," *IEEE J. Sel. Areas Commun.*, vol. 10, pp. 926-942, June 1992.

[19] T. R. Fischer, "A pyramid vector quantizer", *IEEE Trans. on Information Theory*, vol. IT-32, No.4, July 1986.

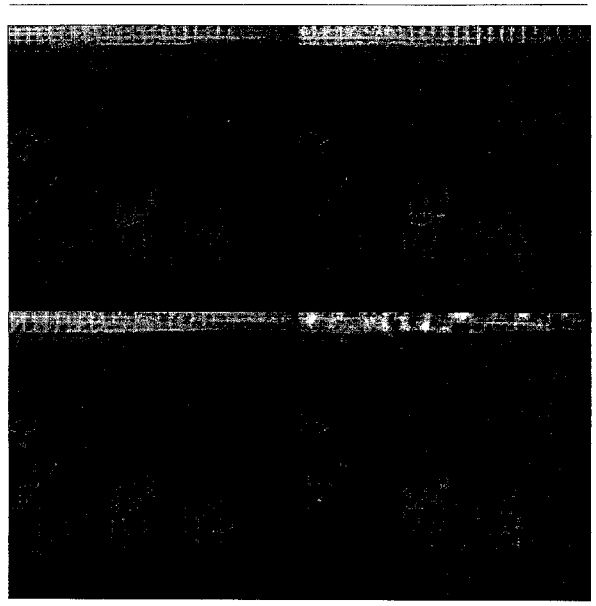
Figure 5: 512 × 512 'Goldhill'. Up-left: original. Others: Reconstructed images, all 13 bands are encoded using the robust quantizer at an overall encoding rate of 0.5 bits/pixel, Up-right: channel BER $\epsilon = 10^{-3}$. Bottom-left: $\epsilon = 10^{-2}$. Bottom-right: $\epsilon = 10^{-1}$.

Optimal Quantizer Design for Noisy Channels: An Approach to Combined Source-Channel Coding

NARIMAN FARVARDIN, MEMBER, IEEE, AND VINAY VAISHAMPAYAN, MEMBER, IEEE

*Abstract* —We present an analysis of the zero-memory quantization of memoryless sources when the quantizer output is to be encoded and transmitted across a noisy channel. Necessary conditions for the joint optimization of the quantizer and the encoder/decoder pair are presented, and an iterative algorithm for obtaining a locally optimum system is developed. The performance of this locally optimal system, obtained for the class of generalized Gaussian distributions and the binary symmetric channel, is compared against the optimum performance theoretically attainable (using rate-distortion theoretic arguments), as well as against the performance of Lloyd–Max quantizers encoded using the natural binary code and the folded binary code. It is shown that this optimal design could result in substantial performance improvements. The performance improvements are more noticeable at high bit rates and for broad-tailed densities.

I. INTRODUCTION

IN A TYPICAL communication system we wish to transmit information about a source $\{X_n\}$ with entropy rate (possibly infinite) $H(X)$ across a channel with capacity $C$ (measured in bits/source symbol) in such a way that the resulting reproduction of $\{X_n\}$ at the receiver, say, $\{\hat{X}_n\}$, is as close a replica of the original source as possible. Shannon's channel coding arguments [1], [3] prove that when $H(X) > C$, reliable communication is impossible in the sense that $\{X_n\}$ cannot be reproduced at the receiver with arbitrarily small probability of error. In this case rate-distortion theoretic arguments [2]–[4] suggest that a *source encoder* can be used whose effect, essentially, is that of mapping the source output $\{X_n\}$ into an approximation of itself, say, $\{\tilde{X}_n\}$, whose entropy rate $H(\tilde{X})$ satisfies $H(\tilde{X}) < C$. Then, again through channel coding arguments [1], [3], [4], it is well-known that $\{\tilde{X}_n\}$ can be encoded and transmitted through the channel with arbitrarily small probability of error; i.e., the only distortion between $\{X_n\}$ and the reconstructed sequence in the receiver $\{\hat{X}_n\}$ is that Manuscript received October 29, 1985; revised August 26, 1986. This paper was presented in part at the IEEE International Symposium on Information Theory, Ann Arbor, MI, October 5–10, 1986. This work was supported in part by a grant from Martin Marietta Laboratories and in part by the National Science Foundation under Grant NSFD CDR-85-00108.
The authors are with the Electrical Engineering Department and Systems Research Center, University of Maryland, College Park, MD 20742, USA.
IEEE Log Number 8717359.

produced by the source encoder. Thus the best source encoder is that which maps $\{X_n\}$ into $\{\tilde{X}_n\}$, satisfying $H(\tilde{X}) < C$, in such a way that $\{\tilde{X}_n\}$ is as good an approximation of $\{X_n\}$ as possible.

The above argument implies a certain demarcation in the encoding process. Specifically, it suggests that the source and the channel encoder can be separated in such a way that the entropy rate reduction takes place in the source encoder and the protection against channel errors in the channel encoder. Indeed, one of the important results of Shannon's celebrated papers [1], [2] was his demonstration that the source and the channel coding functions are fundamentally separable. However, as indicated clearly in [3], the assumption that the source and the channel coders are separable is justifiable only in the limit of arbitrarily complex encoders and decoders. In practical situations there are limitations on the system's complexity which make this separation questionable. It is our intent in this paper to study the interrelationship between the source and channel coders for a practical system with limited complexity.

The effects of the channel errors on the performance of source coders, as well as the interaction between the source and channel coders, have been studied by several researchers. Among others, Spilker [5] has noted that when the output of a zero-memory quantizer is coded and transmitted via a very noisy channel, quantizers with a small number of levels (i.e., large quantization distortion) yield better performance than those with a larger number of levels. Kurtenbach and Wintz [6] studied the problem of optimum quantizer design when the quantizer's output is transmitted over a noisy channel. However, in [6] the issue of code assignment is not addressed. On the other hand, Rydbeck and Sundberg [7], without considering the quantizer design problem, have shown that the code assignment plays an important role in determining the system's performance.

A few researchers in the channel coding area have used the abstract Fourier analysis on groups to design an optimum mean squared-error code for discrete-alphabet uniformly distributed sources [8]–[10].

On the more practical side, combined source-channel coding schemes have been studied for image coding situations [11], [12] and for speech coding [13], [14].

0018-9448/87/1100-0827$01.00 ©1987 IEEE

We present a rigorous treatment of the joint optimization of a source-channel coding scheme for a specific case in which the source is a discrete-time memoryless source, the source coder is a zero-memory quantizer, and the channel coder is a block coder. Here, we make use of the results in [15], which were developed for a more general scheme, to develop necessary conditions for the joint optimality of the source and the channel coders. Moreover, we develop an algorithmic procedure which is sure to result in a locally optimal system. We will demonstrate through numerical results that, in certain cases, optimal design of source-channel codes could result in substantial performance improvements.

The paper is organized as follows. In Section II we present a description of the overall system and the issues involved in system optimization. In Section III the necessary conditions for optimality are derived under the squared-error distortion criterion. This is followed by the description of the algorithm for system design in Section IV. Section V is devoted to the presentation and discussion of the numerical results. Section VI contains a summary and suggestions for future research.

II. Problem Statement and Preliminary Analysis

In this paper, our analysis is based on the assumption that the source to be encoded $\{X_n\}$ can be modeled as a discrete-time zero-mean *memoryless* stationary process with probability density function (p.d.f.) $p(x)$ and variance $\sigma_X^2 = E\{X_n^2\} < \infty$.

The block diagram of the system we wish to analyze is illustrated in Fig. 1. In the first stage of the encoding process, the source output, which belongs to a continuous alphabet, is discretized by means of a zero-memory quantizer. An $N$-level zero-memory quantizer is a function $q(\cdot)$ which maps the source output $x \in \mathbb{R}$ into one of $N$ values $Q_1, Q_2, \cdots, Q_N$, each in $\mathbb{R}$. This operation can be described in terms of the threshold levels $T_1, T_2, \cdots, T_{N-1}$, partitioning the support of $p(\cdot)$ into $N$ disjoint and exhaustive regions described by $I_l = (T_{l-1}, T_l]$, $l = 1, 2, \cdots, N$, with $(T_0, T_N) = (\alpha, \beta)$ describing the support of $p(\cdot)$, such that $x \in \mathbb{R}$ is mapped to $y = q(x) \in A_Y = \{Q_1, Q_2, \cdots, Q_N\}$ according to $$q(x) = Q_l, \qquad x \in I_l, l = 1, 2, \cdots, N. \qquad (2.1)$$

Here the $T_l$ are called the *quantization thresholds* and the $Q_l$ are called the *quantization (representation) levels*.

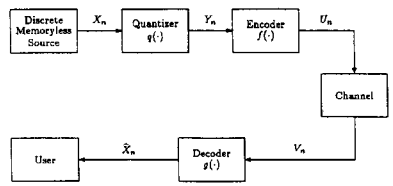

Fig. 1. Block diagram of encoding/decoding system.

As indicated in Fig. 1, subsequent to quantization (source encoding), a channel encoder described by the mapping $f: A_Y \to A_U = \{0, 1, \cdots, M-1\}$, with $M = 2^r \geq N$, operates upon the quantizer output $Y_n$ to generate a sequence $U_n = f(Y_n)$ of integers. The binary representation of these integers will then constitute $r$-bit codewords which will be delivered to a binary symmetric channel (BSC) with crossover probability $\epsilon$. The channel operates on these $r$-bit codewords on a bit-by-bit basis. Let us suppose that $V_n \in A_U$ denotes the decimal representation of the $r$-bit binary codeword at the channel output. Obviously, for $\epsilon \neq 0$, there is a nonzero probability that $V_n$ does not equal $U_n$. From this point on, for the sake of simplicity, we consider our channel as a channel with input $U$ and output $V$ both in $A_U$. Note that computing the transition probability matrix of this channel is straightforward.

Finally, to complete the description of the encoding/decoding operation, we should mention the last stage of the operation, which consists of taking the channel output $V_n$ and decoding it into $\hat{X}_n = g(V_n)$, which can take on one of the $M$ possible values, called the decoder *reconstruction levels*, from the set $A_{\hat{X}} = \{R_1, R_2, \cdots, R_M\}$. It is important to note that, in general, $M$ need not be equal to $N$. Furthermore, even if $M = N$, the $R_l$'s are not necessarily equal to the $Q_l$'s. We shall elaborate on this issue shortly.

Upon defining $$u_k = v_k = k - 1, \qquad k = 1, 2, \cdots, M, \qquad (2.2)$$

the channel transition probabilities (which clearly depend upon $\epsilon$) are given by $$P_{k|m} = \Pr\{V = v_k | U = u_m\}, \qquad m, k = 1, 2, \cdots, M. \qquad (2.3)$$

The mean squared-error (MSE) incurred in the system, which depends upon the choice of the quantizer $q$, the channel encoder $f$, and the decoder $g$, can be expressed by[1]

$$D(q, f, g) = \sum_{k=1}^{M} \sum_{l=1}^{N} P_{k|\hat{m}(l)} \int_{T_{l-1}}^{T_l} (x - R_k)^2 p(x) \, dx, \qquad (2.4)$$

where $\hat{m}(\cdot)$ is defined by $$f(Q_l) = u_{\hat{m}(l)}, \qquad l = 1, 2, \cdots, N. \qquad (2.5)$$

We wish to minimize the overall MSE given by (2.4) by appropriate choices of $q$, $f$, and $g$. It is clear that the $Q_l$'s are only intermediate entities in our system and their actual values do not change the overall MSE. Thus the MSE is merely a function of the quantization thresholds $T = (T_1, T_2, \cdots, T_{N-1})$, the channel encoder $f$, and the reconstruction levels $R = (R_1, R_2, \cdots, R_M)$.

The problem of obtaining the optimum thresholds $T^*$, the optimum reconstruction levels $R^*$, and the optimum encoding function $f^*$ will be addressed in the next section. Notice that $f$ is a function from a finite alphabet $A_Y$ to a finite alphabet $A_U$, and hence there is only a finite number

---

[1] It must be noted that the quantity $D(q, f, g)$ is also a function of the channel crossover probability $\epsilon$. This dependency is not reflected in our notation for the sake of brevity.

of possibilities for $f$. In fact, it is simple to show that the total number of distinct possibilities for $f$ is $M!/(M-N)!$. Various researchers have considered the problem of system design under *fixed* encoder choices. Among these, Kurtenbach and Wintz [6] consider the problem of quantization for noisy channels. They restricted attention to the natural binary code (NBC) and the Gray code (GC). Also, Rydbeck and Sundberg [7] consider a similar problem with other code assignments, such as the folded binary code (FBC) and the minimum distance code (MDC).

In any case, upon fixing the encoder structure $f$, the problem is that of determining the vectors $T^*$ and $R^*$. For a fixed $f$ and $R$, the best set of threshold levels $T$ is determined by minimizing $D(q, f, g)$ with respect to $T$ subject to the constraint that $T_l \le T_{l+1}$, $l = 0, 1, \cdots, N-1$. This constraint will be referred to as the *realizability constraint*.

Let us for the moment drop the realizability constraint and attempt to solve the unconstrained minimization problem. The best set of threshold levels $T$ is determined by setting the partial derivatives of (2.4), with respect to the $T_l$'s, equal to zero, which implies $$T_l = \frac{1}{2} \frac{\sum_{k=1}^{M} \left[ P_{k|\hat{m}(l)} - P_{k|\hat{m}(l+1)} \right] R_k^2}{\sum_{k=1}^{M} \left[ P_{k|\hat{m}(l)} - P_{k|\hat{m}(l+1)} \right] R_k}, \quad l = 1, 2, \cdots, N-1.$$

(2.6)

If this unconstrained minimization results in a solution $T$ that satisfies the realizability constraint, then this $T$ is also the solution to the constrained problem. On the other hand, well-known estimation-theoretic results imply that for a fixed $T$, the MSE is minimized when the reconstruction level $R_k$ is chosen as the conditional expectation of $X$, given $V = v_k$; i.e., $$R_k = E\{ X | V = v_k \}, \quad k = 1, 2, \cdots, M. \quad (2.7)$$

Equations (2.6) and (2.7) constitute a set of $M + N - 1$ nonlinear simultaneous equations whose solution (if it exists) results in vectors $T^*$ and $R^*$ that satisfy the necessary conditions for optimality for a fixed encoding rule $f$. It is important here to note that (2.6) and (2.7) are simply the generalized versions of a similar set of necessary conditions obtained by Kurtenbach and Wintz [6] for the case in which $M = N$.

Several comments about the above necessary conditions for optimality are in order. Kurtenbach and Wintz [6] proposed an iterative algorithm for solving equations (2.6) and (2.7). This algorithm, which is a straightforward extension of Lloyd's algorithm (1st method) for minimum distortion quantizer design [7], suffers from some difficulties which are not mentioned in [6]. Most important of all, it can be proven that Lloyd's iterative algorithm for quantizer design actually converges. This is easily shown by proving that the average distortion is a nonincreasing function of the iteration index. Here, however, the same result does not hold. Specifically, it is straightforward to prove that for a fixed set of threshold levels $T$, updating the reconstruction levels $R$ according to (2.7) cannot increase the overall MSE. But, unfortunately, if we fix $R$ and update $T$ according to (2.6), it does not immediately imply that the distortion is not increased. In fact, the matrix of second derivatives of $D(q, f, g)$ with respect to the $T_l$'s given by (2.6) is described by $$\frac{\partial^2}{\partial T_m \partial T_l} D(q, f, g)$$

$$= \begin{cases} 0, & m \ne l \\ 2p(T_l)\left[ E\{ \hat{X} | Y = Q_{l+1} \} - E\{ \hat{X} | Y = Q_l \} \right], & m = l, \end{cases}$$

(2.8)

which implies that the second derivative matrix is a diagonal matrix whose entries are described by (2.8). To ensure that the solution to (2.6) does not increase the average distortion, we need to show that this matrix is positive definite. Therefore, a sufficient condition for the convergence of the algorithm is that $E\{ \hat{X} | Y = Q_{l+1} \} > E\{ \hat{X} | Y = Q_l \}$, $l = 1, 2, \cdots, N-1$, at *every* step of the iteration process. The second important point is the realizability constraint. This needs to be stated explicitly because there is no guarantee that the unconstrained minimization will result in a solution that satisfies the realizability constraint. This is in marked contrast to the noiseless channel case (Lloyd's algorithm) where the realizability constraint is always satisfied and hence is not stated explicitly.

In addition to the above issues, the algorithm in [6] does not address the problem of optimal codeword assignment, nor does it make any attempt to find the optimal value of the number of quantization intervals $N$ for a given bit rate $r$ bits/sample.

In summary, the problems to be solved are the following.

1. The realizability constraint needs to be explicitly enforced in the optimization algorithm.
2. The convergence of the algorithm has to be proven.
3. The best value of $N$, the number of quantization intervals, needs to be determined.
4. The codeword assignment problem needs to be considered.

In what follows, we present an algorithm in which these problems are considered and a locally optimal system is obtained in which the quantizer, the encoder, and the decoder satisfy the necessary conditions for optimality all at the same time.

III. NECESSARY CONDITIONS FOR OPTIMAL SYSTEM DESIGN

We approach the problem of optimal quantizer design from a slightly different perspective now. Our goal is to come up with a set of necessary conditions for the optimality of the quantizer, the channel encoder, and the decoder.

Here, instead of separating the quantizer (source encoder) and the channel encoder, we concentrate on designing an *encoder* whose input is the source output $\{ X_n \}$ and whose output is the channel input $\{ U_n \}$. In essence, we search for an optimal mapping $\gamma: \mathbb{R} \to A_U$ which is described by the composite function $\gamma(x) \equiv f[q(x)]$.

The approach consists of two stages. First, for a fixed decoder $g$, we develop necessary conditions for the optimality of the encoder function $\gamma$. Then, for a fixed $\gamma$, we develop necessary conditions for the optimality of $g$. The pair of conditions given in these two stages can then be used to establish a set of conditions for the optimality of the entire system. The same approach has been used by Fine [15] for optimization of a more general system. Certain extensions of Fine's work can be found in [18].

Let us now proceed by describing these necessary conditions for optimality. We assume first that the decoder $g$ is known and fixed. We would like to determine the best encoder structure. Recall that our objective is to minimize the MSE given by $$D(\gamma, g) \equiv D(q, f, g) = \int_{-\infty}^{\infty} p(x) E\{(X - \hat{X})^2 | X = x\} \, dx. \quad (3.1)$$

Since $p(x)$ is a nonnegative quantity, to minimize $D(\gamma, g)$ it suffices to minimize $E\{(X - \hat{X})^2 | X = x\}$. However, $$E\{(X - \hat{X})^2 | X = x\} = \sum_{i=1}^{M} E\{(X - \hat{X})^2 | X = x, U = u_i\}$$
$$\cdot \Pr\{U = u_i | X = x\}. \quad (3.2)$$

Notice that our encoder is a deterministic mapping, and hence it maps a given $x$ to some $u = \gamma(x) \in A_U$. This implies that for this $u$, $$\Pr\{U = u | X = x\} = 1, \quad (3.3)$$

and hence $$E\{(X - \hat{X})^2 | X = x\} = E\{(X - \hat{X})^2 | X = x, U = u\}$$
$$= E\{(x - \hat{X})^2 | U = u\}. \quad (3.4)$$

Therefore, to minimize $D(\gamma, g)$, it suffices to obtain a mapping $\gamma$ that minimizes (3.4) for every value of $x$. In other words, upon defining the set $A_i(g)$ as the collection of all values of $x$ that should be encoded to the $i$th channel input, i.e., $u_i$, we must satisfy $$A_i(g) = \left\{ x: E\{(x - \hat{X})^2 | U = u_i\} \right.$$
$$\left. \le E\{(x - \hat{X})^2 | U = u_j\}, \text{ for all } j \ne i \right\}, \quad (3.5)$$

which can be written as $$A_i(g) = \bigcap_{\substack{j=1 \\ j \ne i}}^{M} A_{ij}(g), \quad (3.6)$$

where $A_{ij}(g)$ is defined as $$A_{ij}(g) = \left\{ x: 2x \left[ E\{\hat{X} | U = u_j\} - E\{\hat{X} | U = u_i\} \right] \right.$$
$$\left. \le E\{\hat{X}^2 | U = u_j\} - E\{\hat{X}^2 | U = u_i\} \right\}. \quad (3.7)$$

Here, $A_{ij}(g)$ specifies a set on the real line whose members, if mapped to $u_i$ instead of $u_j$, will result in a lower MSE.

Let us now look more closely, at (3.7). Upon defining[2]

$$\alpha_{ij} \triangleq E\{\hat{X}^2 | U = u_j\} - E\{\hat{X}^2 | U = u_i\}, \quad (3.8a)$$

$$\beta_{ij} \triangleq E\{\hat{X} | U = u_j\} - E\{\hat{X} | U = u_i\}, \quad (3.8b)$$

and $$t_{ij} \triangleq \frac{\alpha_{ij}}{2\beta_{ij}}, \qquad \beta_{ij} \ne 0, \quad (3.8c)$$

we have $$A_{ij}(g) = \begin{cases} (-\infty, t_{ij}], & \beta_{ij} > 0, \\ [t_{ij}, \infty), & \beta_{ij} < 0, \\ (-\infty, \infty), & \beta_{ij} = 0, \alpha_{ij} \ge 0, \\ \phi, & \beta_{ij} = 0, \alpha_{ij} < 0. \end{cases} \quad (3.9)$$

Therefore, $A_{ij}(g)$ is an *interval* and hence $A_i(g)$ is also an interval, since it is a finite intersection of intervals. If we define the upper and lower endpoints of $A_i(g)$ by $$t_i^u = \min_{j: \beta_{ij} > 0} \{t_{ij}\} \quad (3.10a)$$

and $$t_i^l = \max_{j: \beta_{ij} < 0} \{t_{ij}\}, \quad (3.10b)$$

respectively, we can characterize $A_i(g)$ by $$A_i(g) = \begin{cases} \phi, & \beta_{ij} = 0 \text{ and } \alpha_{ij} < 0 \text{ for some } j, \\ \mathbb{R}, & \beta_{ij} = 0, \alpha_{ij} \ge 0, \text{ all } j, \\ [t_i^l, t_i^u], & \text{otherwise}, \end{cases} \quad (3.11)$$

provided that $t_i^l \le t_i^u$. To be consistent with our previous notation and to resolve the ambiguity on the endpoints of the quantization intervals, we define the set $\hat{A}_i(g)$ to be identical to $A_i(g)$, except when $A_i(g) = [t_i^l, t_i^u]$, in which case $\hat{A}_i(g) \triangleq (t_i^l, t_i^u]$. Then, the optimum encoder mapping $\gamma$ for a *fixed* decoder mapping $g$ is given by $$\gamma(x) = u_i \qquad x \in \hat{A}_i(g), \quad i = 1, 2, \cdots, M. \quad (3.12)$$

Notice that (3.12) satisfies the *necessary* and *sufficient* conditions for the optimality of $\gamma$, given a fixed $g$, provided that $t_i^l \le t_i^u$, $i = 1, 2, \cdots, M$.

On the other hand, for a fixed encoder $\gamma$, the optimal decoder is described, as mentioned in the previous section, by the conditional expectation of the input given the channel output. Specifically, $$R_i(\gamma) = g(v_i) = E\{X | V = v_i\}, \qquad i = 1, 2, \cdots, M. \quad (3.13)$$

It should be mentioned that (3.13) is also the necessary and sufficient condition for the optimality of $g$ given $\gamma$.

---

[2] Notice that $\alpha_{ij}$, $\beta_{ij}$, and $t_{ij}$ all depend upon the decoder structure $g$. But here, for the sake of simplicity, this direct dependence is not reflected in our notation.

Before we proceed to give an elaborate description of the algorithm for system design, we make several comments concerning the conditions described by (3.12) and (3.13). First, it is of fundamental importance to note that in (3.12) we could encounter a situation in which $t_i^l > t_i^u$ even though $\beta_{ij} \neq 0$ for all $j \neq i$. This, in fact, implies that no value of $x$ should be encoded as $u_i$, or, equivalently, $\hat{A}_i(g) = \phi$. As we will describe in the numerical results section, this phenomenon, which occurs when the channel is very noisy, indicates that in certain cases the total number of quantization regions should be smaller than the total number of available codewords $M$. Secondly, assuming that $t_i^l \leq t_i^u$ for all $i$, an iterative algorithm which works based on the successive application of (3.12) and (3.13) guarantees convergence. This is because the sequence of values of the MSE obtained in these iterations is a nonincreasing sequence of nonnegative numbers, and hence it converges. Furthermore, despite the fact that (3.12) and (3.13) are both necessary and sufficient conditions when $g$ and $\gamma$ are fixed, respectively, the final solution obtained by the iterative algorithm need *not* satisfy the *sufficient* conditions for the system's optimality. That is, the final solution obtained by this algorithm is only a *locally optimum*[3] solution.

In the following section, we present a precise description of the algorithm used for the optimal encoder/decoder design.

IV. ALGORITHM

In the previous section we noted that certain problems exist in designing an optimal encoder for a given decoder. The problem lies with (3.12), which is true only if $t_i^l \leq t_i^u$, $i = 1, 2, \cdots, M$. In this section we shall further analyze the necessary conditions for optimal encoder design in order to take care of situations when $t_i^l > t_i^u$ for some $i$. We will then describe the entire algorithm for optimal encoder/decoder design.

Assume that the decoder has been fixed and we wish to determine the optimal encoder mapping. Compute $E\{\hat{X}|U = u_i\}$, $i = 1, 2, \cdots, M$, and arrange them in increasing order; i.e., reshuffle the codewords and the corresponding reconstruction levels in such a way that $$E\{\hat{X}|U = u_1'\} \leq E\{\hat{X}|U = u_2'\} \leq \cdots \leq E\{\hat{X}|U = u_M'\},$$
(4.1)

in which $u_i' \in A_U$ is such that $E\{\hat{X}|U = u_i'\}$ is the $i$th smallest element of the set $\{E\{\hat{X}|U = u_i\}, i = 1, 2, \cdots, M\}$. Note that this reshuffling of the codewords does not affect the analysis in Section III. However, it introduces substantial simplification in the analysis that follows and in the implementation of the algorithm. The following theorem shows that the above reordering of the codewords results in an encoder which partitions the real line in essentially the same order.

*Theorem 1:* For a given $g$, or equivalently $R$, if the codewords are reordered to satisfy (4.1), and if $i < j$, it is guaranteed that $A_i(g)$ lies to the left of $A_j(g)$ provided that $A_i(g)$ and $A_j(g)$ are both well-defined; i.e., $t_k^u \geq t_k^l$, $k = i, j$. The converse is also true; i.e., if we obtain an *optimal* encoder for which $A_i(g)$ lies to the left of $A_j(g)$, then $E\{\hat{X}|U = u_i'\} \leq E\{\hat{X}|U = u_j'\}$.

*Proof:* Let us use the same notation as in Section III for the reshuffled codewords. Then, it is easy to see that[4]

$$t_i^u = \min_{k > i} \{t_{ik}\}, \quad i = 1, 2, \cdots, M-1, \quad (4.2a)$$

and similarly, $$t_i^l = \max_{k < i} \{t_{ik}\}, \quad i = 2, 3, \cdots, M. \quad (4.2b)$$

Let us suppose that $t_k^u \geq t_k^l$, $k = i, j$. Then, to prove that $A_i(g)$ lies to the left of $A_j(g)$ for $i < j$, it suffices to show that $t_i^u \leq t_j^l$. However, $$t_i^u = \min_{k > i} \{t_{ik}\} \leq t_{ij} \quad (4.3a)$$

and $$t_j^l = \max_{k < j} \{t_{jk}\} \geq t_{ji}, \quad (4.3b)$$

but, by definition, $t_{ij} = t_{ji}$, which implies $t_i^u \leq t_j^l$.

To prove the converse, we proceed as follows. Since $A_i(g)$ lies to the left of $A_j(g)$, we have $$E\{(\hat{X} - x)^2|U = u_i'\} \leq E\{(\hat{X} - x)^2|U = u_j'\},$$
for $x \leq t_{ij}$. (4.4a)

Also, from the definition of $t_{ij}$, we have $$E\{(\hat{X} - t_{ij})^2|U = u_i'\} = E\{(\hat{X} - t_{ij})^2|U = u_j'\}. \quad (4.4b)$$

Subtracting (4.4b) from (4.4a) and further simplification yields $$(t_{ij} - x)E\{\hat{X}|U = u_i'\} \leq (t_{ij} - x)E\{\hat{X}|U = u_j'\},$$
for $x \leq t_{ij}$, (4.5)

which in turn implies $$E\{\hat{X}|U = u_i'\} \leq E\{\hat{X}|U = u_j'\}. \quad (4.6)$$

It now remains to determine the codewords for which the corresponding upper endpoint is strictly smaller than the lower endpoint. Let us denote the set of all $i$'s satisfying this condition by $I^*$, given by $$I^* = \{i : t_i^u < t_i^l\}. \quad (4.7)$$

Essentially, $i \in I^*$ implies that for all $x \in \mathbb{R}$ there is always a codeword with index $j \notin I^*$ which performs better than the $i$th codeword. Therefore, $I^*$ is the set of "useless" codewords which should be discarded.

---

[3] An example of the situation with multiple locally optimum solutions is the case of $\epsilon = 0$. In this case, our problem reduces to that of minimum MSE quantizer design and our algorithm is that of Lloyd's 1st method [17]. It is well-known in this case that the algorithm may not converge to the globally optimum solution [20].

[4] Here $t_i^l = \alpha$ and $t_i^u = \beta$. Also, without loss of generality, we will assume $\alpha = -\infty$ and $\beta = \infty$.

The following theorem provides a simple way of identifying the best partition of the real line, the set of codewords that lie in $I^*$, and the codeword assignment.

*Theorem 2:* Let us suppose that the codes are reshuffled to satisfy (4.1). Let us suppose that the $i$th interval is well-defined, i.e., $t_i^l \le t_i^u$, and suppose $t_i^u = t_{ij}$ for some $j = i+1, i+2, \cdots, M$. Then, a) if $j > i+1$, all codewords with indices $k = i+1, i+2, \cdots, j-1$, belong to $I^*$,
b) the $j$th codeword does not belong to $I^*$; i.e., $t_j^l \le t_j^u$, and
c) $t_j^l = t_i^u$.

*Proof:* As we have assumed, $$t_{ij} \le t_{ik}, \quad k = i+1, i+2, \cdots, M. \quad (4.8)$$

We will first show that $$t_{kj} \le t_{ij}, \quad k = i+1, i+2, \cdots, j-1. \quad (4.9)$$

Consider an $x \in (t_{ij}, t_{ik})$. Then, for encoding this $x$, the $j$th codeword is preferable to the $i$th codeword, and the $i$th codeword is preferable to the $k$th codeword, and hence the $j$th codeword is preferable to the $k$th codeword; i.e., $x$ must satisfy $x \ge t_{kj}$. Since this must hold for all $x$ in $(t_{ij}, t_{ik})$, we must have $t_{kj} \le t_{ij}$. Notice that in arriving at this result, the fact that $i < k < j$ plays an important role. Using (4.9), we have $$t_k^u = \min_{m > k} \{t_{km}\} \le t_{kj} \le t_{ij} = t_i^u,$$
$$k = i+1, i+2, \cdots, j-1, \quad (4.10)$$

which together with the fact that $t_k^l \ge t_i^u$, $k = i+1, i+2, \cdots, j-1$, implies that $t_k^u \le t_k^l$, $k = i+1, i+2, \cdots, j-1$, which proves a).

Now, we proceed to show that $t_j^u > t_j^l$. We have $$t_j^u = \min_{k > j} \{t_{jk}\} \ge \min_{k > j} \{t_{ik}\} \ge t_{ij} \quad (4.11a)$$

and $$t_j^l = \max_{k < j} \{t_{jk}\} \le t_{ij} = t_i^u, \quad (4.12b)$$

which implies that $t_j^u \ge t_j^l$ and proves b).

Finally, to prove c), note that $$t_j^l = \max_{k < j} \{t_{jk}\} \ge t_{ji} = t_i^u, \quad (4.13)$$

which together with (4.12b) implies that $t_j^l = t_i^u$.

Combining the results of Theorems 1 and 2 yields the following simple algorithm for determining the optimal encoder for a given decoder.

Step A. Set $i = 1$.
Step B. Compute $t_i^u$. Let $j(i)$ be such that $t_i^u = t_{ij(i)}$. Eliminate all codewords with indices $i+1, i+2, \cdots, j(i)-1$. Set $t_{j(i)}^l = t_i^u$.
Step C. Set $i = j(i)$. If $i < M$, go to Step B. Otherwise, set $t_i^u = \infty$, and stop.

It is important to note, as we will emphasize in the numerical results section, that for very noisy channels, it turns out that a large number of codewords belong to $I^*$. In this case, the algorithm for generating the best partition results in a quick way of identifying these "bad" codewords and hence is much more efficient than an *ad hoc* algorithm, which simply computes all the thresholds and eliminates the "bad" codewords.

We now present the entire algorithm to design an optimal encoder/decoder pair, for a range of values of $\epsilon$, say, $0 < \epsilon \le \epsilon_{\max}$.

Step 1. Set $\epsilon = \epsilon_{\max}$. Set $R = R_0$, the initial set of reconstruction levels.
Step 2. Set $k = 0$ ($k$ is the iteration index). Choose an initial set of reconstruction levels $R^{(0)} = R_0$. Set $D^{(0)} = \infty$.
Step 3. Use Steps A–C described above to determine the optimal encoder $\gamma^{(k)}$ for the fixed $R^{(k)}$.
Step 4. Set $k = k+1$. Use (3.13) to obtain the best set of reconstruction levels $R^{(k)}$ for the fixed $\gamma^{(k-1)}$.
Step 5. Compute the MSE $D^{(k)}$ associated with $R^{(k)}$ and $\gamma^{(k-1)}$. If $(D^{(k-1)} - D^{(k)})/D^{(k)} < \delta$, where $\delta > 0$, go to Step 6; otherwise, go to Step 3.
Step 6. Set $\epsilon = \epsilon - \Delta\epsilon$ ($\Delta\epsilon > 0$ is the increment by which $\epsilon$ is changed). If $\epsilon \ge 0$, go to Step 2; otherwise, stop.

Clearly, in Steps 2–5 above, the locally optimal system for a fixed value of $\epsilon$ is computed. In the actual implementation of the algorithm, to insure that a *good* locally optimal system is chosen, we have considered the following variation of the algorithm. At the end of Step 6, when $\epsilon = 0$, we begin to increase $\epsilon$ again by increments of $\Delta\epsilon$. We continue this until $\epsilon = \epsilon_{\max}$. By means of this process, we obtain a curve of the MSE as a function of $\epsilon$ which may or may not coincide with the previous one. If it coincides for all values of $\epsilon$, we stop. Otherwise we start decreasing $\epsilon$ from $\epsilon_{\max}$ down to $\epsilon = 0$. We will continue this process back and forth until two MSE curves coincide, in which case we stop. Then for each value of $\epsilon$ we take the minimum MSE obtained in these iterations.

We are now in a position to present the results of this algorithm applied to the encoding of specific memoryless sources. However, before presenting the results, we shall make a few remarks about the relationship between the channel errors and the quantization error and their contribution to the overall mean squared-error.

In studying quantization in noisy channel situations, it is interesting to know the relationship between the overall MSE and the MSE due to the quantization noise and the channel noise separately. This separability issue (or the lack thereof) has been addressed in various places such as [5]–[7] and [19]. It would be convenient, as it is sometimes erroneously assumed, if the overall MSE could be written as the sum of the quantization noise and the channel noise. Indeed, Totty and Clark [19] have shown that this is the case when the decoder reconstruction levels are chosen to be the same as the encoder quantization levels (i.e., with our notation, $N = M$ and $R_l = Q_l$, $l = 1, 2, \cdots, M$) and when the $Q_i$'s are chosen to be the center of probability mass of their corresponding intervals.

In our scheme, in which the encoder is described in terms of a partitioning of the real line followed by a mapping to the code alphabet, the outstanding issue is that of "defining" the quantization noise. This is because, in the scheme described in Section III, there is no mention of the quantization levels in the encoder. Indeed if the quantization noise is defined as the *smallest* possible squared-error distortion attainable by a quantizer whose threshold levels are the same as the threshold levels of the encoder, then it is straightforward to extend the result in [19] and prove that the overall MSE can be decomposed into the sum of the quantization noise and the channel noise. The proof can be found in [24].

V. NUMERICAL RESULTS

In this section, we provide numerical results determining the performance of the system described in Section III operating on various source distributions. We make comparisons against the performance of the Lloyd–Max quantization scheme encoded by the natural binary code (NBC) and the folded binary code (FBC) as well as the optimum performance theoretically attainable (OPTA) obtained through rate-distortion theoretic arguments.

A. Source Description

In what follows, we assume that the p.d.f. of the assumed memoryless source is chosen from the class of generalized Gaussian distributions described by $$p(x) = \left[\frac{\alpha\eta(\alpha,\beta)}{2\Gamma(1/\alpha)}\right]\exp\left\{-[\eta(\alpha,\beta)|x|]^\alpha\right\},$$

$$-\infty < x < \infty, \quad (5.1a)$$

where $$\eta(\alpha,\beta) \triangleq \beta^{-1}\left[\frac{\Gamma(3/\alpha)}{\Gamma(1/\alpha)}\right]^{1/2}, \quad (5.1b)$$

with $\alpha > 0$ describing the exponential rate of decay, $\beta$ a positive quantity representing a scale parameter, and $\Gamma(\cdot)$ is the gamma function. The variance of the associated random variable is given by $\sigma_X^2 = \beta^2$. For $\alpha = 2$, we have the Gaussian distribution, while for $\alpha = 1$ we have the Laplacian distribution. The generalized Gaussian distribution with values of $\alpha$ in the range $0.1 < \alpha < 1.0$ provides a useful model for broad-tailed processes [21]. It is also useful to note that for large values of $\alpha$, the distribution tends to a uniform distribution. Typical behavior of p.d.f.'s as a function of a normalized input is illustrated in Fig. 2 for selected parameter choices.

B. Rate-Distortion Derived Bounds

It is well-known from the results of source coding subject to a fidelity criterion that for a channel with capacity $C$ bits/channel use and a source with distortion-rate function $D(R)$, where $R$ is measured in bits/source symbol,

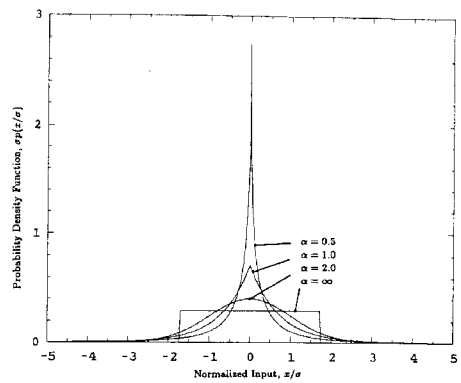

Fig. 2. Probability density function for generalized Gaussian distribution with selected parameter values.

the smallest attainable average distortion is given by [2]–[4]

$$D_{\min} = D(rC), \quad (5.2)$$

where $r$ is the number of channel uses for each source symbol.

In our problem, the channel is a binary symmetric channel with crossover probability $\epsilon$. It is easily shown [3] that, in this case, $$C = 1 + \epsilon\log_2\epsilon + (1-\epsilon)\log_2(1-\epsilon), \text{ bits/channel use}. \quad (5.3)$$

In general, closed form expressions for $D(R)$ do not exist; however, Blahut's algorithm [22] can be used for numerical computation of $D(R)$.

C. Lloyd–Max Quantizer Performance on Noisy Channels

We compare our results against the performance of the Lloyd–Max quantizer optimized for the same source, when the quantizer output is encoded by the natural binary code or the folded binary code and transmitted via a binary symmetric channel. In effect, we compare the performance of our system designed for the noisy channel against a system whose designer has been completely ignorant about the channel noise but has made every effort to minimize the quantization noise. We will denote the performance of this system by $D_{LM}(R)$; it will be clear from the presentation of the results whether the NBC or the FBC is used. This quantity can be computed easily from (2.6). It might be interesting to note at this point that for small values of $\epsilon$ ($\epsilon \approx 0$), $D_{LM}(R)$ grows approximately *linearly* with respect to $\epsilon$.

D. Performance Results

Our main objective in developing the algorithm of Section IV was to study the potential performance improvements which could be obtained from this algorithm compared to a system which uses an optimal Lloyd–Max quantizer encoded by the NBC or the FBC. For selected values of $\alpha$ used in Fig. 2, we have obtained the performance of a *locally* optimal encoder/decoder pair as described in Section III for different values of $\epsilon$ in the range [0, 0.1]. Since the locally optimum system obtained depends on the initial codeword assignment, we have obtained two locally optimum systems based on the NBC and the FBC as the initial codeword assignments. We will refer to these systems as LOSNBC and LOSFBC, respectively. While the LOSNBC and LOSFBC are identical in some cases, in many cases they differ noticeably both in structure and in performance. The Lloyd–Max quantizer followed by the NBC or the FBC will be referred to as LMNBC and LMFBC, respectively.

The signal-to-noise ratios resulting from the LOSNBC, LOSFBC, LMNBC, and LMFBC are tabulated in Tables I–IV for $r = 1$, 2, 3, and 4 bits/sample and $\epsilon = 0.005$, $\epsilon = 0.01$, $\epsilon = 0.05$, and $\epsilon = 0.1$. Furthermore, for the sake of illustration, the signal-to-noise ratios of these systems, as well as the optimum performance theoretically attainable based on (5.2), are presented in Figs. 3–10.

TABLE I
SNR (IN dB) OF LOCALLY OPTIMUM SYSTEMS (LOSNBC, LOSFBC), REFERENCE SYSTEMS (LMNBC, LMFBC), AND OPTIMUM PERFORMANCE THEORETICALLY ATTAINABLE (OPTA) FOR GENERALIZED GAUSSIAN SOURCE WITH $\alpha = 0.5$

| $r$ | | $\epsilon = 0.005$ | $\epsilon = 0.010$ | $\epsilon = 0.050$ | $\epsilon = 0.100$ |
|---|---|---|---|---|---|
| 1 bit/sample | LMNBC | 1.77 | 1.66 | 0.88 | 0.07 |
| | LOSNBC | 1.78 | 1.70 | 1.26 | 0.93 |
| | LMFBC | 1.77 | 1.66 | 0.88 | 0.07 |
| | LOSFBC | 1.78 | 1.70 | 1.26 | 0.93 |
| | OPTA | 8.97 | 8.84 | 7.40 | 6.10 |
| 2 bits/sample | LMNBC | 4.55 | 3.61 | −0.34 | −2.63 |
| | LOSNBC | 5.14 | 4.69 | 2.76 | 1.68 |
| | LMFBC | 5.09 | 4.52 | 1.51 | −0.66 |
| | LOSFBC | 5.14 | 4.68 | 2.76 | 1.68 |
| | OPTA | 15.18 | 14.64 | 12.14 | 9.69 |
| 3 bits/sample | LMNBC | 5.19 | 2.90 | −3.28 | −5.99 |
| | LOSNBC | 7.28 | 6.18 | 3.50 | 2.32 |
| | LMFBC | 7.94 | 6.35 | 0.78 | −2.24 |
| | LOSFBC | 8.35 | 7.23 | 4.05 | 2.32 |
| | OPTA | 20.97 | 20.34 | 16.67 | 13.20 |
| 4 bits/sample | LMNBC | 3.49 | 0.64 | −6.03 | −8.75 |
| | LOSNBC | 10.01 | 9.00 | 5.13 | 3.04 |
| | LMFBC | 8.98 | 6.42 | −0.46 | −3.81 |
| | LOSFBC | 10.79 | 9.09 | 5.39 | 3.38 |
| | OPTA | 26.95 | 26.05 | 20.92 | 16.57 |

TABLE II
SNR (IN dB) OF LOCALLY OPTIMUM SYSTEMS (LOSNBC, LOSFBC), REFERENCE SYSTEMS (LMNBC, LMFBC), AND OPTIMUM PERFORMANCE THEORETICALLY ATTAINABLE (OPTA) FOR GENERALIZED GAUSSIAN SOURCE WITH $\alpha = 1.0$

| $r$ | | $\epsilon = 0.005$ | $\epsilon = 0.010$ | $\epsilon = 0.050$ | $\epsilon = 0.100$ |
|---|---|---|---|---|---|
| 1 bit/sample | LMNBC | 2.92 | 2.84 | 2.22 | 1.55 |
| | LOSNBC | 2.93 | 2.84 | 2.25 | 1.67 |
| | LMFBC | 2.92 | 2.84 | 2.22 | 1.55 |
| | LOSFBC | 2.93 | 2.84 | 2.25 | 1.67 |
| | OPTA | 6.42 | 6.21 | 4.89 | 3.72 |
| 2 bits/sample | LMNBC | 6.75 | 6.08 | 2.84 | 0.73 |
| | LOSNBC | 6.81 | 6.26 | 4.05 | 2.80 |
| | LMFBC | 6.93 | 6.40 | 3.56 | 1.52 |
| | LOSFBC | 6.94 | 6.44 | 4.05 | 2.80 |
| | OPTA | 12.13 | 11.70 | 9.23 | 7.05 |
| 3 bits/sample | LMNBC | 9.30 | 7.44 | 1.76 | −0.93 |
| | LOSNBC | 9.94 | 8.68 | 5.21 | 3.62 |
| | LMFBC | 10.36 | 8.87 | 3.61 | 0.82 |
| | LOSFBC | 10.49 | 9.17 | 5.18 | 3.62 |
| | OPTA | 17.87 | 17.23 | 13.52 | 10.23 |
| 4 bits/sample | LMNBC | 9.78 | 7.11 | 0.52 | −2.29 |
| | LOSNBC | 12.17 | 10.49 | 6.32 | 4.45 |
| | LMFBC | 12.13 | 9.69 | 3.13 | 0.07 |
| | LOSFBC | 12.76 | 11.03 | 6.82 | 4.79 |
| | OPTA | 23.65 | 22.77 | 17.82 | 13.42 |

TABLE III
SNR (IN dB) OF LOCALLY OPTIMUM SYSTEMS (LOSNBC, LOSFBC), REFERENCE SYSTEMS (LMNBC, LMFBC), AND OPTIMUM PERFORMANCE THEORETICALLY ATTAINABLE (OPTA) FOR GENERALIZED GAUSSIAN SOURCE WITH $\alpha = 2.0$

| $r$ | | $\epsilon = 0.005$ | $\epsilon = 0.010$ | $\epsilon = 0.050$ | $\epsilon = 0.100$ |
|---|---|---|---|---|---|
| 1 bit/sample | LMNBC | 4.25 | 4.10 | 3.09 | 2.09 |
| | LOSNBC | 4.25 | 4.10 | 3.15 | 2.27 |
| | LMFBC | 4.25 | 4.10 | 3.09 | 2.09 |
| | LOSFBC | 4.25 | 4.11 | 3.15 | 2.27 |
| | OPTA | 5.75 | 5.54 | 4.31 | 3.22 |
| 2 bits/sample | LMNBC | 8.47 | 7.77 | 4.41 | 2.22 |
| | LOSNBC | 8.50 | 7.88 | 5.20 | 3.63 |
| | LMFBC | 8.52 | 7.85 | 4.58 | 2.41 |
| | LOSFBC | 8.52 | 7.88 | 5.20 | 3.63 |
| | OPTA | 11.49 | 11.07 | 8.59 | 6.40 |
| 3 bits/sample | LMNBC | 11.61 | 9.85 | 4.28 | 1.56 |
| | LOSNBC | 11.88 | 10.49 | 6.47 | 4.67 |
| | LMFBC | 11.99 | 10.36 | 4.93 | 2.18 |
| | LOSFBC | 12.04 | 10.50 | 6.47 | 4.67 |
| | OPTA | 17.24 | 16.60 | 12.89 | 9.59 |
| 4 bits/sample | LMNBC | 12.92 | 10.33 | 3.79 | 0.93 |
| | LOSNBC | 14.15 | 12.30 | 7.81 | 5.60 |
| | LMFBC | 13.84 | 11.36 | 4.84 | 1.89 |
| | LOSFBC | 14.14 | 12.30 | 7.81 | 5.60 |
| | OPTA | 23.00 | 22.14 | 17.19 | 12.79 |

TABLE IV
SNR (IN dB) OF LOCALLY OPTIMUM SYSTEMS (LOSNBC, LOSFBC), REFERENCE SYSTEMS (LMNBC, LMFBC), AND OPTIMUM PERFORMANCE THEORETICALLY ATTAINABLE (OPTA) FOR GENERALIZED GAUSSIAN SOURCE WITH $\alpha = \infty$

| $r$ | | $\epsilon = 0.005$ | $\epsilon = 0.010$ | $\epsilon = 0.050$ | $\epsilon = 0.100$ |
|---|---|---|---|---|---|
| 1 bit/sample | LMNBC | 5.77 | 5.53 | 3.98 | 2.60 |
| | LOSNBC | 5.77 | 5.53 | 4.06 | 2.84 |
| | LMFBC | 5.77 | 5.53 | 3.98 | 2.60 |
| | LOSFBC | 5.77 | 5.53 | 4.06 | 2.84 |
| | OPTA | 6.44 | 6.29 | 4.91 | 3.60 |
| 2 bits/sample | LMNBC | 10.90 | 10.04 | 6.02 | 3.59 |
| | LOSNBC | 10.93 | 10.06 | 6.51 | 4.50 |
| | LMFBC | 10.71 | 9.69 | 5.47 | 3.03 |
| | LOSFBC | 10.92 | 10.06 | 6.51 | 4.50 |
| | OPTA | 12.68 | 12.14 | 9.59 | 7.21 |
| 3 bits/sample | LMNBC | 14.52 | 12.60 | 6.73 | 3.88 |
| | LOSNBC | 14.67 | 13.00 | 8.12 | 5.87 |
| | LMFBC | 13.98 | 11.93 | 5.94 | 3.15 |
| | LOSFBC | 14.68 | 13.00 | 8.12 | 5.87 |
| | OPTA | 18.60 | 17.97 | 14.05 | 10.69 |
| 4 bits/sample | LMNBC | 16.23 | 13.60 | 6.92 | 3.95 |
| | LOSNBC | 17.01 | 14.87 | 9.74 | 7.03 |
| | LMFBC | 15.42 | 12.72 | 6.07 | 3.18 |
| | LOSFBC | 17.02 | 14.86 | 9.74 | 7.03 |
| | OPTA | 24.43 | 23.57 | 18.55 | 13.95 |

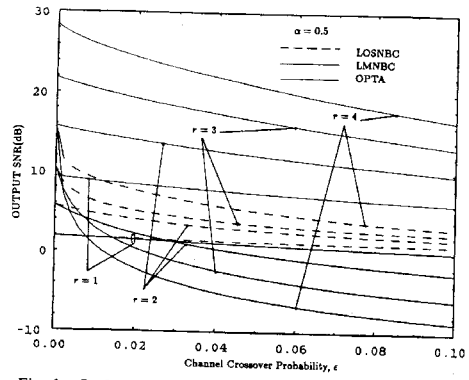
Fig. 3. Performance of LOSNBC, LMNBC, and OPTA; $\alpha = 0.5$.
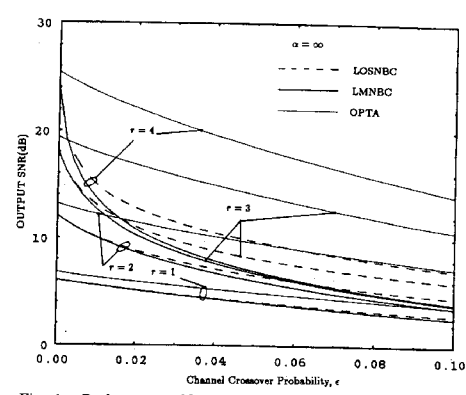
Fig. 6. Performance of LOSNBC, LMNBC, and OPTA; $\alpha = \infty$.
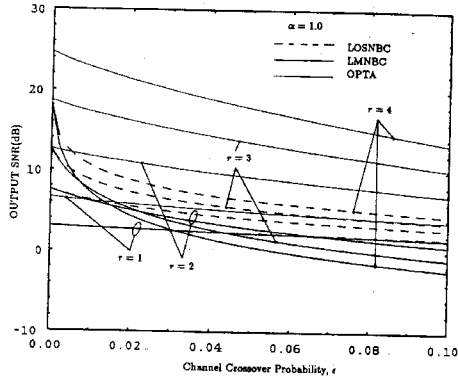
Fig. 4. Performance of LOSNBC, LMNBC, and OPTA; $\alpha = 1.0$
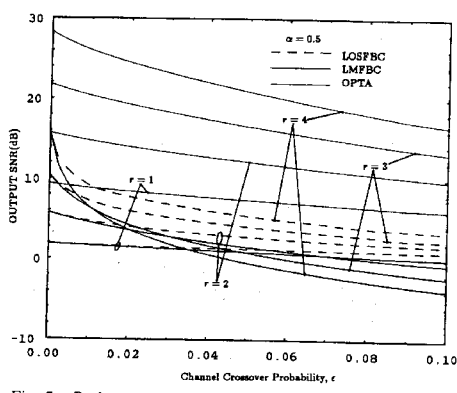
Fig. 7. Performance of LOSFBC, LMFBC, and OPTA; $\alpha = 0.5$.
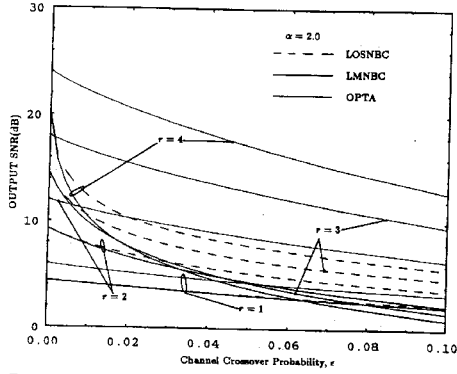
Fig. 5. Performance of LOSNBC, LMNBC, and OPTA; $\alpha = 2.0$.
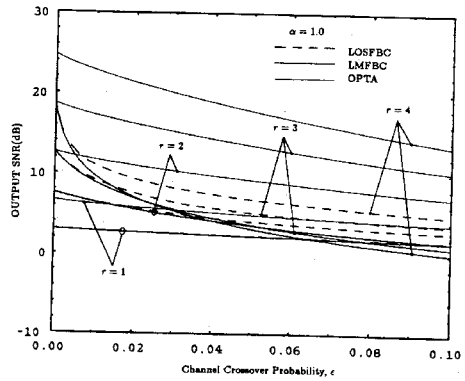
Fig. 8. Performance of LOSFBC, LMFBC, and OPTA; $\alpha = 1.0$.

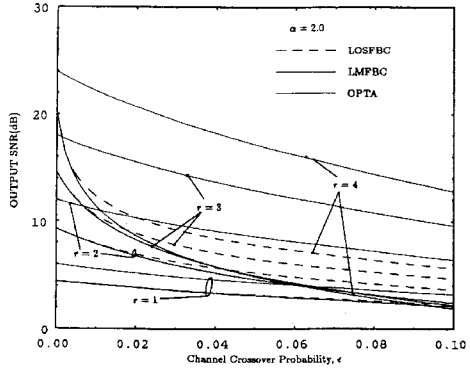

Fig. 9. Performance of LOSFBC, LMFBC, and OPTA; $\alpha = 2.0$.

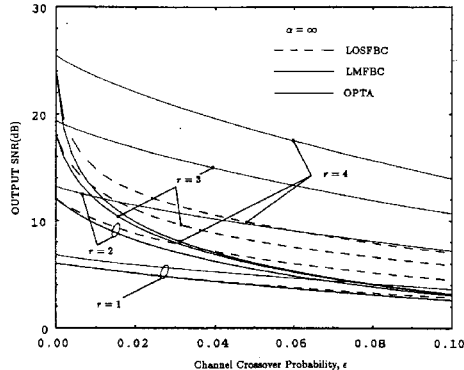

Fig. 10. Performance of LOSFBC, LMFBC, and OPTA; $\alpha = \infty$.

Several important comments and conclusions about these results are in order. In general, one can conclude that the LOSNBC performs better than the LMNBC and, similarly, the LOSFBC performs better than the LMFBC. Let us emphasize that these performance improvements are, in certain cases, quite substantial; for example, for the Laplacian source which closely approximates the distribution of speech signals, at $\epsilon = 0.01$ and $r = 4$ bits/sample, the best locally optimal system we have obtained, i.e., the LOSFBC, performs 3.92 dB better than LMNBC and 1.34 dB better than LMFBC. The general trend that can be observed from the results in Tables I-IV indicates that the performance improvements of the locally optimum system over the corresponding Lloyd-Max scheme becomes more noticeable for larger values of $r$, larger $\epsilon$, and for more broad-tailed densities. Indeed, for $r = 4$ bits/sample, $\epsilon = 0.1$, and $\alpha = 0.5$ (Table I), the SNR improvements are more than 11.5 dB and 7 dB for the NBC- and the FBC-based systems, respectively.

In almost all situations the LOSFBC results in better performance than the LOSNBC. The difference is especially noticeable for more broad-tailed densities ($\alpha = 0.5$ and $\alpha = 1.0$). For larger values of $\alpha$, this difference is negligible or nonexistent. Also it is important to note that while the LMFBC performs substantially better than the LMNBC for small values of $\alpha$, its superiority diminishes for larger values of $\alpha$. Indeed, for the uniformly distributed source ($\alpha = \infty$), the LMNBC performs *better* than the LMFBC.

As described in Section IV, it is possible to write the overall MSE in terms of the quantization MSE and the channel MSE, separately. We have observed in our numerical results that in the optimum system, the quantization MSE *increases* as a function of $\epsilon$. In other words, the system design is such that the quantizer structure is changed, as $\epsilon$ is increased, in such a way that more distortion will be incurred in the quantization portion (source coding) so that the overall MSE is minimized. This type of exchange of MSE between the source and channel encoder, of course, does not exist in Shannon's coding arguments.

To illustrate this better, in Fig. 11 we have displayed the behavior of the quantization thresholds, in a 3 bits/sample optimum scheme, as a function of $\epsilon$. It is interesting to observe that, while the quantizer starts off with eight levels at $\epsilon = 0$, for some value of $\epsilon > 0$ it switches to a four-level quantizer. Indeed, our experimental results have shown that for some value of $\epsilon > 0.1$, this quantizer will switch again to a two-level quantizer. In other words, consistent with our claims in Section III and IV, some of the codewords become "useless" (those belonging to $I^*$ in Section IV) as the channel becomes noisier, and, therefore, they are not used in the transmission of any values of the source output.

Finally, for the sake of completeness, in Tables V and VI we have included the parameters (i.e., the thresholds and the reconstruction levels), as well as the corresponding codewords for the LOSFBC, for the Gaussian source with $r = 4$ bits/sample and $\epsilon = 0.005$ and $\epsilon = 0.1$. Notice that,

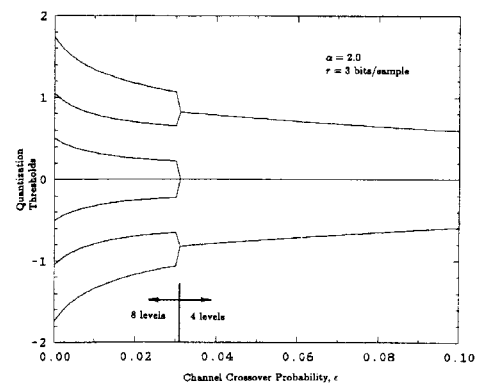

Fig. 11. Optimal quantization thresholds as function of channel crossover probability; $\alpha = 2.0$; $r = 3$ bits/sample.

TABLE V
PARAMETERS AND CODEWORDS DESCRIBING LOSFBC FOR
GENERALIZED GAUSSIAN SOURCE WITH $\alpha = 2.0$ (GAUSSIAN),
$r = 4$ BITS/SAMPLE, $\epsilon = 0.005$; MSE $= 0.0385$

| Quantization Interval | Codeword | Reconstruction Level |
|---|---|---|
| $(-\infty, -1.831]$ | 0011 | $-2.171$ |
| $(-1.831, -1.338]$ | 0111 | $-1.543$ |
| $(-1.338, -1.006]$ | 1011 | $-1.150$ |
| $(-1.006, -0.689]$ | 0010 | $-0.833$ |
| $(-0.689, -0.454]$ | 0001 | $-0.564$ |
| $(-0.454, -0.277]$ | 0110 | $-0.359$ |
| $(-0.277, -0.011]$ | 0000 | $-0.141$ |
| $(-0.011, 0.161]$ | 1010 | 0.073 |
| $(0.161, 0.234]$ | 0101 | 0.189 |
| $(0.234, 0.412]$ | 1001 | 0.318 |
| $(0.412, 0.650]$ | 0100 | 0.524 |
| $(0.650, 0.959]$ | 1000 | 0.791 |
| $(0.959, 1.303]$ | 1110 | 1.111 |
| $(1.303, 1.822]$ | 1101 | 1.520 |
| $(1.822, \infty)$ | 1100 | 2.162 |
|  | 1111† | 0.039 |

† Untransmitted codewords.

TABLE VI
PARAMETERS AND CODEWORDS DESCRIBING LOSFBC FOR GENERALIZED
GAUSSIAN SOURCE WITH $\alpha = 2.0$ (GAUSSIAN), $r = 4$ BITS/SAMPLE,
$\epsilon = 0.1$; MSE $= 0.2753$

| Quantization Interval | Codeword | Reconstruction Level |
|---|---|---|
| $(-\infty, -0.960]$ | 0011 | $-1.335$ |
| $(-0.960, -0.527]$ | 0111 | $-0.817$ |
| $(-0.527, -0.181]$ | 0001 | $-0.416$ |
| $(-0.181, 0.283]$ | 0000 | 0.070 |
| $(0.283, 0.837]$ | 1000 | 0.576 |
| $(0.837, \infty)$ | 1100 | 1.301 |
|  | 1011† | $-1.132$ |
|  | 0010† | $-0.603$ |
|  | 1111† | $-0.521$ |
|  | 0110† | $-0.462$ |
|  | 0101† | $-0.418$ |
|  | 1001† | 0.158 |
|  | 1010† | 0.416 |
|  | 0100† | 0.648 |
|  | 1101† | 1.072 |
|  | 1110† | 1.156 |

† Untransmitted codewords.

while for the less noisy channel ($\epsilon = 0.005$) 15 of the 16 available codewords are used, for the more noisy channel with $\epsilon = 0.1$, only six of the 16 available codewords are used for transmission.

VI. SUMMARY AND CONCLUSION

We have studied the problem of optimal quantization and coding when the quantizer outputs are to be transmitted via a noisy channel. Only memoryless sources, zero-memory quantization, and memoryless channels have been considered. An iterative algorithm has been developed for obtaining a locally optimal quantizer and coder. On the basis of the numerical results obtained for a wide variety of sources, it can be concluded that this design technique offers improvements over Lloyd–Max quantization followed by the NBC or the FBC. The improvement is more noticeable for noisier channels, for more broad-tailed densities, and at higher bit rates.

It is shown through numerical results that there is a close interaction in the optimal system between the quantization noise and the channel noise to minimize the overall MSE.

An open problem which remains unresolved is that of obtaining the globally optimum system. The *locally* optimum system to which our algorithm converges depends upon the initial point, and we know of no way of choosing the initial point to ensure convergence to the *globally* optimum system.

A second interesting problem is the effect of channel noise in block transform encoding of sources with memory. The optimal design of the system not only affects the structure of the quantizer and the encoder, but it could affect the bit assignment, too [23]. The study of this problem in block transform coding of Gauss–Markov sources is underway.

Finally, in most practical cases the exact value of the channel crossover probability is not known. An interesting issue is that of designing a robust system where only a partial knowledge of the channel's characteristics is available.

ACKNOWLEDGMENT

The authors wish to thank the reviewers for their thorough review and for the suggestion to include the FBC results which contributed to an improved presentation.

REFERENCES

[1] C. E. Shannon, "A mathematical theory of communication," *Bell Syst. Tech. J.*, vol. 27, pp. 379–423 and 623–656, 1948.
[2] ———, "Coding theorems for a discrete source with a fidelity criterion," *IRE Nat. Conv. Rec.*, pp. 142–163, Mar. 1959.
[3] A. J. Viterbi and J. K. Omura, *Principles of Digital Communications and Coding*. New York: McGraw-Hill, 1979.
[4] T. Berger, *Rate-Distortion Theory: A Mathematical Basis for Data Compression*. Englewood Cliffs, NJ: Prentice-Hall, 1971.
[5] J. J. Spilker, Jr., *Digital Communications by Satellite*, Englewood Cliffs, NJ: Prentice-Hall, 1977.
[6] A. Kurtenbach and P. Wintz, "Quantizing for noisy channels," *IEEE Trans. Commun. Techn.*, vol. COM-17, pp. 291–302, Apr. 1969.
[7] N. Rydbeck and C. W. Sundberg, "Analysis of digital errors in nonlinear PCM systems," *IEEE Trans. Commun.*, vol. COM-24, pp. 59–65, Jan. 1976.
[8] T. R. Crimmins, H. M. Horwitz, C. J. Palermo, and R. V. Palermo, "Minimization of mean-square error for data transmitted via group codes," *IEEE Trans. Inform. Theory*, vol. IT-15, pp. 72–78, Jan. 1969.
[9] G. A. Wolf and R. Redinbo, "The optimum mean-square estimate for decoding binary block codes," *IEEE Trans. Inform. Theory*, vol. IT-20, pp. 344–351, May 1974.
[10] G. R. Redinbo, "On the design of mean-square error channel coding systems using cyclic codes," *IEEE Trans. Inform. Theory*, vol. IT-28, pp. 406–413, May 1982.
[11] J. W. Modestino and D. G. Daut, "Combined source-channel coding of images," *IEEE Trans. Commun.*, vol. COM-27, pp. 1644–1659, Nov. 1979.
[12] J. W. Modestino, D. G. Daut, and A. L. Vickers, "Combined source-channel coding of images using the block cosine transform," *IEEE Trans. Commun.*, vol. COM-29, pp. 1261–1274, Sept. 1981.
[13] P. Noll, "Effects of channel errors on the signal-to-noise performance of speech encoding systems," *Bell Syst. Tech. J.*, vol. 54, pp. 1615–1636, Nov. 1975.

APPDENDIX C

Trellis-Coded Quantization Designed for Noisy Channels

Min Wang, *Member, IEEE*, and Thomas R. Fischer, *Senior Member, IEEE*

*Abstract*—Trellis-coded quantization (TCQ) of memoryless sources is developed for transmission over a binary symmetric channel. The optimized TCQ coder can achieve essentially the same performance as Ayanoğlu and Gray's unconstrained trellis coding optimized for the binary symmetric channel, but with a much lower implementation complexity for transmission rates above 1 b/sample. In most cases, the optimized TCQ coder also provides larger signal-to-noise ratio than Farvardin and Vaishampayan's channel-optimized vector quantization. Algorithms are developed for the joint design of trellis-coded quantization/modulation (TCQ/TCM). The jointly designed TCQ/TCM system outperforms the straightforward cascade of separately designed TCQ and TCM systems. The improvement is most significant at low channel signal-to-noise ratio. For a first-order Gauss-Markov source, the predictive TCQ/TCM performance can exceed that of optimum pulse amplitude modulation.

*Index Terms*—Source coding, trellis codes, quantization, joint source/channel coding.

I. INTRODUCTION

A SOURCE coding system to be used with a noisy transmission channel should be designed to minimize the average distortion between the source and its estimate at the receiver [1]–[3]. Dunham and Gray [1] prove the existence of optimum joint source and channel trellis coding systems for stationary and ergodic sources operating over discrete memoryless channels. In their theory, the proper distortion measure to use to design the trellis encoder is a cost function equal to the expected value of the distortion between the source sample and the corresponding reproduction letter, where the expectation is over the channel probability distribution. Ayanoğlu and Gray [2] develop a generalized Lloyd algorithm to design the reproduction codebook of a trellis coding system used with a binary symmetric channel. For a noisy channel, the optimized trellis coder performs much better than one designed for a noiseless channel.

Manuscript received June 10, 1991; revised August 23, 1994. This work was supported by the National Science Foundation under Grant NCR-8821764. This paper was presented in part at the IEEE International Symposium on Information Theory, San Diego, CA, Jan. 14–19, 1990.
M. Wang was with Rockwell International Corp., Newport Beach, CA 92658. She is now with Motorola Inc., Fort Worth, TX 76137.
T. R. Fischer is with the School of Electrical Engineering and Computer Science, Washington State University, Pullman, WA 99164.
IEEE Log Number 9406001.

For the additive white Gaussian noise channel, Fischer and Marcellin [8] introduce the idea of combining trellis-coded quantization (TCQ) [5] with trellis-coded modulation (TCM) [4] for joint source/channel coding. They use identical trellises for the TCQ and TCM, and a consistent labeling between quantization levels and modulation symbols. As a consequence, the Euclidean distance in the channel is made commensurate with the quantization noise in the source encoder, and so likely transmission errors of small Euclidean distance tend to cause small additional quantization noise. The simulation results in [8] are for separately designed TCQ and TCM systems. At high channel signal-to-noise ratio, the system achieves the performance promised by trellis coded scalar quantization. However, the performance curves drop dramatically as the channel signal-to-noise ratio decreases, especially for the predictive TCQ encoding of a source with memory. One goal of this paper is to develop a technique to jointly design a TCQ/TCM system such that this "precipitous drop" in performance is avoided.

The paper is divided into two parts. In the first part, we adopt the methodology of Ayanoğlu and Gray [2] and design trellis-coded quantization systems for use with a binary symmetric channel (BSC). For 1 b/sample encoding, our results are equivalent to [2]; for larger encoding rates, the advantage of TCQ is lower implementation complexity. In the second part of the paper, we consider the additive white Gaussian noise (AWGN) channel and the communication system transmitter consists of a trellis-coded quantizer and trellis coded modulator. Using the Dunham and Gray formulation, we first discuss the complexity of designing a (locally) optimum codebook and argue that it is prohibitive. An algorithm combined with a numerical method is then presented to jointly design the TCQ codebook and the TCM symbol set. Finally, simulation results are presented for the encoding of memoryless Gaussian and Laplacian sources as well as the first-order Gauss-Markov source. In the latter case, the best performance is achieved by allowing the size of the TCQ and TCM alphabet to vary with the channel signal-to-noise ratio. For large trellises, the resulting encoding performance slightly exceeds the optimum (continuous alphabet) pulse amplitude modulation performance of Berger [12], and hence exceeds the joint source/channel VQ performance obtained by Vaishampayan and Farvardin [16].

II. OPTIMAL TRELLIS-CODED QUANTIZATION OVER THE BINARY SYMMETRIC CHANNEL

A. Formulation

Consider the digital communication system shown in Fig. 1. The source encoder is a trellis coded quantizer, with $N = 2^{R+\tilde{R}}$ reproduction levels partitioned into $N_1 = 2^{R'+\tilde{R}}$ subsets, denoted as $\mathcal{Y} = \{y_{k,l}\}$, with $y_{k,l}$ denoting the $l$th level in the $k$th subset. The encoding trellis is defined by a rate-$R'/(R' + \tilde{R})$ convolutional encoder. Here $R \geq 1$ is the encoding (transmission) rate in bits/sample, and $R'$ and $\tilde{R}$ are positive integers satisfying $1 \leq R' \leq R$ and $0 \leq \tilde{R}$. The parameter $\tilde{R}$ is called the "codebook expansion factor," since the TCQ codebook size is $2^{\tilde{R}}$ times that of a nominal $R$ bits/sample scalar quantizer. We assume that $N$ can be properly divided by $N_1$, and that each subset has exactly $N_2 = N/N_1 = 2^{R-R'}$ codewords. The output of the TCQ encoder is a sequence of binary codewords from some code $\mathcal{C}$, each codeword of length $\tilde{R}$, with $R'$ bits specifying the subset (and the path through the trellis) and the remaining $R - R'$ bits determining the codeword in the specified subset. The binary symmetric channel has bit error probability $P_b$. At the receiver, the channel noise corrupted binary sequence is converted into a TCQ quantization level sequence using the TCQ decoder. Suppose that the source sequence to be transmitted is $\mathcal{X} = \{x_j\}$. Let $\tilde{x}_j \in \mathcal{Y}$, $\tilde{c}_j \in \mathcal{C}$, $\hat{c}_j \in \mathcal{C}$, and $\hat{x}_j \in \mathcal{Y}$ represent the TCQ codeword (quantization level), the binary codeword corresponding to $\tilde{x}_j$, the channel output version of $\tilde{c}_j$, and the decoded version of $x_j$, respectively.

Define the overall average squared error as $$D = E\{(x_j - \hat{x}_j)^2\} \quad (1)$$

or $$D = E\{(x_j - y_{i,n})^2\}$$

if $x_j$ is decoded as $y_{i,n}$. To design the TCQ system, we apply the ideas in [1] and [2] for the design of joint source and channel trellis waveform coders. This extension is straightforward because TCQ is a special case of the general trellis coding scheme [2].

Suppose $x_j$ is TCQ encoded as $y_{k,l} = \tilde{x}_j$. Following [2], we define a distortion measure between $x_j$ and $y_{k,l}$ as $$d(x_j, y_{k,l}) = \sum_{i=1}^{N_1} \sum_{n=1}^{N_2} P_{i,n|k,l}(x_j - y_{i,n})^2 \quad (2)$$

where $P_{i,n|k,l} = Pr\{y_{i,n}$ received $|y_{k,l}$ sent$\}$ is called the channel transition probability. $P_{i,n|k,l}$ is a function of the channel bit error probability $P_b$. Appendix A provides the computation of the transition probability for $R' = \tilde{R} = 1$, and $R = 1$ and 2 b/sample. The distortion measure defined in (2) can be interpreted as the expected distortion between the source sample $x_j$ and its TCQ encoded value $y_{k,l}$, where the expectation is taken over the channel probability distribution. The average distortion between

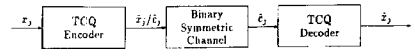

Fig. 1. TCQ binary symmetric communication system.

the source and the corresponding receiver output is $$D = E\{d(x_j, y_{k,l})\} \quad (3)$$

where the expectation is over the source distribution. The TCQ encoding is performed by using the Viterbi algorithm [10] to find the trellis path with the smallest average distortion, as given in (3).

B. Design Algorithm

The design process is based on a generalized Lloyd algorithm and is similar to [2], but subject to the TCQ structure. Let $\mathcal{X} = \{x_j\}_{j=1}^{|\mathcal{X}|}$ be a training sequence, where $\|\mathcal{X}\|$ denotes the number of elements in the set $\mathcal{X}$. Let $m$ be an iteration index, let $\mathcal{Y}^{(m)} = \{y_{k,l}^{(m)}\}$ be the set of reproduction levels at the $m$th design step, and let $Q_{k,l}^{(m)} = \{x_j: x_j \in \mathcal{X}$ is encoded as $y_{k,l}^{(m)}\}$. The TCQ encoder finds the path through the trellis (i.e., sequence of $y_{k,l}^{(m)}$) to minimize $$D^{(m)} = \frac{1}{\|\mathcal{X}\|} \sum_{x_j \in \mathcal{X}} d(x_j, y_{k,l}^{(m)}).$$

This can be rewritten as $$D^{(m)} = \frac{1}{\|\mathcal{X}\|} \sum_{k=1}^{N_1} \sum_{l=1}^{N_2} \sum_{x_j \in Q_{k,l}^{(m)}} \sum_{i=1}^{N_1} \sum_{n=1}^{N_2} P_{i,n|k,l}(x_j - y_{i,n}^{(m)})^2. \quad (4)$$

The updated reproduction levels $\{y_{i,n}^{(m+1)}\}$ are selected to minimize the overall MSE. The necessary conditions are obtained by setting $\partial D/\partial y_{i,n} = 0$, and are $$y_{i,n}^{(m+1)} = \frac{1}{\sum_{k=1}^{N_1} \sum_{l=1}^{N_2} P_{i,n|k,l} \|Q_{k,l}^{(m)}\|} \sum_{k=1}^{N_1} \sum_{l=1}^{N_2} P_{i,n|k,l} \sum_{x_j \in Q_{k,l}^{(m)}} x_j$$

$$i = 1, 2, \cdots, N_1; n = 1, 2, \cdots, N_2. \quad (5)$$

An algorithm to design the optimum TCQ reproduction levels over a binary symmetric channel with bit error probability $P_b$ is summarized as follows.

*0) Initialization:* Given a training sequence $\mathcal{X} = \{x_j\}_{j=1}^{|\mathcal{X}|}$, a convergence threshold $\epsilon > 0$, and an initial partitioned reproduction codebook $\mathcal{Y} = \{y_{k,l}^{(0)}\}$, set $m = 0$ and $D^{(-1)} = \infty$.

*1) Reproduction Codebook Update:* Encode the training sequence using the Viterbi algorithm and the codebook $\{y_{k,l}^{(m)}\}$ to obtain $\{Q_{k,l}^{(m)}\}$ and $D^{(m)}$. The branch metric of the trellis is the distortion defined in (2). If $(D^{(m-1)} - D^{(m)})/D^{(m)} < \epsilon$, quit with $y_{k,l} = y_{k,l}^{(m)}$, $k = 1, 2, \cdots, N_1, l = 1, 2, \cdots, N_2$. Otherwise, update the TCQ reproduction levels according to (5) to obtain $\mathcal{Y}^{(m+1)} = \{y_{k,l}^{(m+1)}\}$.

*2) Set $m \leftarrow m + 1$:* Go to step 1).

The design algorithm is convergent and the average distortion is a nonincreasing function of the iteration index.

C. Simulation results

In this section, we present numerical results on the performance of the trellis coded quantization optimized for the binary symmetric channel (denoted as BSCTCQ). Comparisons are made with conventional TCQ used on a binary symmetric channel (denoted simply as TCQ), with Ayanoğlu and Gray's joint source and channel trellis waveform coders [2], and with Farvardin and Vaishampayan's channel-optimized vector quantization (FVCOVQ) [3].

We select $R' = \tilde{R} = 1$, the size of the reproduction codebook is $2^{R \cdot \tilde{R}} = 2 \cdot 2^R$, and the reproduction codebook is partitioned into $2^{R'+\tilde{R}} = 4$ subsets, each with exactly $2^{\tilde{R}-R'} = 2^R/2$ codewords. The four-state encoding trellis is generated by a feedback-free rate-1/2 convolutional encoder as shown in Fig. 2. There are $2^{R'} = 2$ branches entering/leaving each state. The encoding rates simulated are $R = 1$ and $R = 2$ b/sample, although the method is straightforwardly extended to higher rates. The computation of the channel transition probability is provided in Appendix A. The sources to be considered are memoryless Gaussian and Laplacian with zero mean and unit variance. The system is designed by using a training sequence of 10 000 samples. The results presented, either in figure or table, are the average performance of a source testing sequence consisting of 100 blocks, each of 1000 samples. The figures are generated for 11 different channel bit error probabilities evenly distributed in the interval [0.0, 0.5]. The Shannon lower bound to the distortion-rate function evaluated at the channel capacity is also included in each figure.

Table I lists simulation results of BSC optimized TCQ and conventional TCQ for the memoryless Gaussian source, both for several BSC bit error probabilities. The 96 percent confidence intervals are 0.032 and 0.035 dB, respectively, in signal-to-noise ratio (SNR). Table I also lists Farvardin and Vaishampayan's channel-optimized vector quantization performance at dimension $n = 1, 2, 4$, and 8. The results indicate that the BSCTCQ system yields larger signal-to-noise ratio than the FVCOVQ, except for $n = 8$ and $P_b = 0.00$ or $P_b = 0.05$. In the former case, FVCOVQ achieves a 0.05 dB gain over BSCTCQ. In the later case, both systems achieve the same performance.

Figs. 3, 4, 5, and 6 show the performance of the BSC optimized trellis coded quantization for Gaussian and Laplacian memoryless sources, respectively, at encoding rates of 1 and 2 b/sample. The corresponding performance with conventional TCQ [5] is also included. It is obvious that the channel optimized TCQ is superior, especially for large channel bit error probability. For $R = 1$, the BSC optimized TCQ achieves essentially the same performance as the binary symmetric channel optimized trellis coding scheme in [2]. Since trellis coded quantization makes hard decisions in each subset, the encoding complexity is less than that of a conventional trellis coding scheme for encoding rates above 1 b/sam-

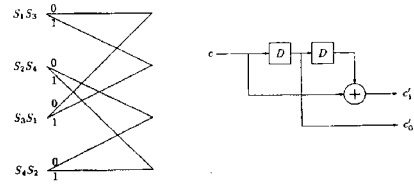

Fig. 2. A four-state trellis diagram and block diagram of a rate-1/2 feedback-free convolutional encoder [4].

ple.

III. JOINT TRELLIS-CODED QUANTIZATION / MODULATION

A. Formulation

In the remainder of the paper, we consider the digital communication system shown in Fig. 7. The source encoder is a trellis-coded quantization system. It maps (using the Viterbi algorithm) each source sample into one of $N = 2^{R+\tilde{R}}$ reproduction levels. Again, the reproduction levels are partitioned into $N_1 = 2^{R'+\tilde{R}}$ subsets. The encoding trellis is defined by a rate-$R'/(R' + \tilde{R})$ convolutional encoder. The output of the TCQ encoder is a sequence of binary codewords, each of length $R$, with $R'$ bits to specify the subset and the remaining $R - R'$ bits to determine the codeword in the specified subset. The TCM system maps each output binary codeword of the source encoder into a channel transmission symbol. This mapping is one-to-one, and therefore introduces no distortion. The transmission channel introduces additive white Gaussian noise (AWGN). The receiver consists of a TCM decoder and a TCQ decoder. The TCM decoder maps the channel output sequence into a binary codeword sequence using the Viterbi decoding algorithm. Then, the TCQ decoder maps the binary codeword sequence into a TCQ reproduction level sequence. Such a constructed system is termed a joint trellis-coded quantization/modulation (joint TCQ/TCM) system.

Referring to the communication system shown in Fig. 7, let $x_j$, $\tilde{x}_j$, and $\hat{x}_j$ represent a source sample, its TCQ encoded value, and its TCQ decoded value at the receiver, respectively. The goal of a joint TCQ/TCM system design is to select the TCQ reproduction levels and the TCM symbols to minimize the average distortion between the input sample sequence and the corresponding receiver output sequence. The average distortion is taken to be the overall squared error defined in (1).

B. Design Complexity

Dunham and Gray [1] provide a general description of a sliding block joint source and channel encoding system for a source with finite alphabet $\mathscr{A}$, and a discrete memoryless channel with input alphabet $\mathscr{B}$ and output alphabet $\mathscr{B}$. Let $\hat{\mathscr{A}}$ be a finite reproduction alphabet and let $\rho: \mathscr{A} \times \hat{\mathscr{A}} \to [0, \infty)$ be a single-letter distortion measure. In TABLE I
PERFORMANCE OF VARIOUS 1 B / SAMPLE SOURCE CODERS
WITH A BSC OF BIT ERROR PROBABILITY $P_B$ FOR THE
MEMORYLESS GAUSSIAN SOURCE. VALUES ARE
LISTED AS SNR IN DECIBELS

|  |  | $P_b = 0.00$ | $P_b = 0.005$ | $P_b = 0.01$ | $P_b = 0.05$ | $P_b = 0.10$ |
|---|---|---|---|---|---|---|
| BSCTCQ (4-state) | | 5.03 | 4.81 | 4.59 | 3.19 | 2.39 |
| TCQ (4-state) | | 5.03 | 4.80 | 4.59 | 2.47 | 1.30 |
| FVCOVQ[3] | $n=1$ | 4.40 | 4.25 | 4.11 | 3.15 | 2.27 |
| | $n=2$ | 4.38 | 4.23 | 4.11 | 3.15 | 2.26 |
| | $n=4$ | 4.58 | 4.43 | 4.24 | 3.17 | 2.28 |
| | $n=8$ | 5.08 | 4.64 | 4.34 | 3.19 | 2.29 |

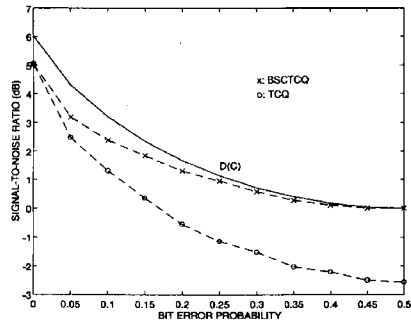

Fig. 3. Performance of a BSCTCQ system for the memoryless Gaussian source ($R = 1$ b/sample).

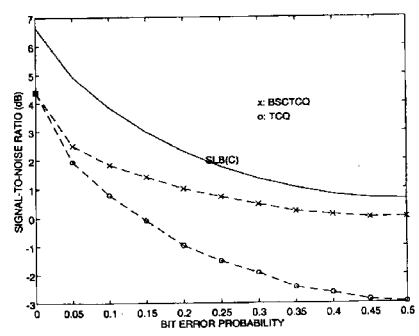

Fig. 5. Performance of a BSCTCQ system for the memoryless Laplacian source ($R = 1$ b/sample).

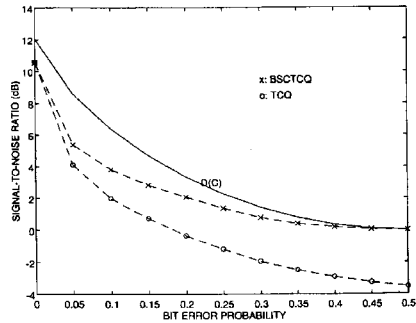

Fig. 4. Performance of a BSCTCQ system for the memoryless Gaussian source ($R = 2$ b/sample).

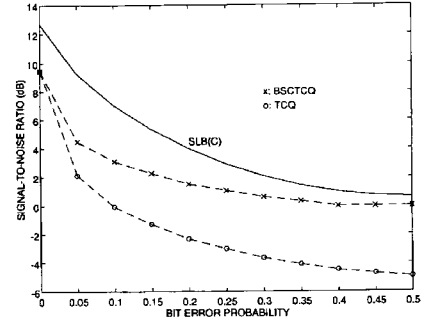

Fig. 6. Performance of a BSCTCQ system for the memoryless Laplacian source ($R = 2$ b/sample).

their theory, a sliding-block joint source and channel code consists of an encoder $g: \mathscr{A}^{L+1} \to \mathscr{B}$ with encoding rule $Z_j = g(X_{j-L_m}, \cdots, X_j, \cdots, X_{j+L_d})$, where $Z_j \in \mathscr{B}$ is the channel input, $L_m$ is the encoder memory, $L_d$ is the encoder delay, and $L = L_m + L_d$ is the encoder constraint length; and a decoder $f: \mathscr{B}^{K+1} \to \mathscr{A}$ with decoding rule $\hat{X}_j = f(\hat{Z}_{j-K_m}, \cdots, \hat{Z}_j, \cdots, \hat{Z}_{j+K_d})$ where $\hat{Z}_j \in \mathscr{B}$ is the channel output and $K_m, K_d$, and $K = K_m + K_d$ are the decoder memory, delay, and constraint length, respectively. With appropriate shifting of the time indexes, the

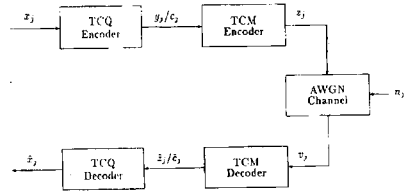

Fig. 7. Basic joint TCQ/TCM system.

state space of the decoder can be taken to be $(Z_{j-K}, \cdots, Z_{j-1})$, and is dependent on the encoder constraint length. The encoder and decoder should be jointly designed to minimize $E\{\rho(X_j, \hat{X}_j)\}$. Elaborating on this formulation, Ayanoğlu and Gray show that for the binary symmetric channel and a finite-state machine decoder, (2) is the property distortion measure to use for code design. Implicit in (2) is that the probability transition matrix is of size proportional to the decoder constraint length $K$.

The joint TCQ/TCM system differs from the Dunham and Gray formulation in that the input alphabet need not be finite, the channel is not discrete, and, since the mappings from TCQ encoded level to TCM symbol and demodulated TCM symbol to TCQ output level are one-to-one, optimization of the joint TCQ/TCM system is over the TCQ encoder and codebook, and TCM demodulator and signal constellation. This latter difference is quite significant, since it guarantees that the encoder state space is necessarily large. For example, consider the simplest case of 1 b/sample encoding using a four-state TCQ and TCM trellis, and a rate-1/2 convolutional encoder. Using the rule-of-thumb that the trellis should be searched to a depth of five constraint lengths before making a hard decision, the TCQ encoder and TCM decoder each have a delay of 10 samples. The effective size of the state space is thus about $2^{20}$, and will increase exponentially with larger encoding rates, or larger trellis size.

From the above cursory examination, we conclude that with the Dunham and Gray formulation, the state space that should be considered for jointly optimized TCQ/TCM system design is prohibitively large. Here, we focus on a joint TCQ/TCM design algorithm which uses a quasi-Newton constrained optimization to design the TCM constellation.

C. A Joint TCQ/TCM Design Algorithm

To jointly design the TCQ/TCM system, we introduce two training sequences; one is a source sequence and the other is a channel noise sequence. The TCQ and TCM systems use identical trellises, and have a consistent labeling between quantization levels and modulation symbols. Assume that there are $N = 2^{R+\tilde{R}}$ quantization levels partitioned into $N_1 = 2^{R+\tilde{R}}$ subsets, each subset with exactly $N_2 = 2^{R-\tilde{R}}$ codewords. The set of reproduction codewords is denoted as $\mathcal{Y} = \{y_{k,l}, k = 1, 2, \cdots, N_1; l = 1, 2, \cdots, N_2\}$ with $y_{k,l}$ denoting the $l$th codeword in the $k$th subset. Since both TCQ and TCM have identical trellises with a consistent labeling between quantization levels and modulation symbols, there is a one-to-one mapping between a TCQ level and a TCM symbol. We denote this as $y_{k,l} \leftrightarrow z_{k,l}$ with $\mathcal{Z} = \{z_{k,l}, k = 1, 2, \cdots, N_1; l = 1, 2, \cdots, N_2\}$ the modulation symbol set. We assume that the TCQ encoder operates in a block mode. That is, for a specified initial state, $\|\mathcal{X}\|$ input samples are encoded by searching the trellis, and then $R\|\mathcal{X}\|$ bits are released for the minimum distortion path. If the input is stationary and ergodic, then the sequence of encoded levels is jointly stationary and ergodic with the input [14]. Since the $y_{i,n}$ are one-to-one mapped to the $z_{i,n}$, then assuming the channel noise samples are white, and that the Viterbi algorithms TCM demodulator also operates in a block mode, the demodulated sequence $\hat{z}_j$ (and hence $\hat{y}_j$) is also stationary and ergodic. Hence, it is meaningful to consider the joint probability of a transmitted TCM symbol and its corresponding demodulated value, and we define $P_{i,n|k,l} = \Pr\{z_{i,n} \text{ decoded } | z_{k,l} \text{ sent}\} = \Pr\{y_{i,n} \text{ decoded } | y_{k,l} \text{ encoded}\}$.

Let $\mathcal{X} = \{x_j\}_{j=1}^{\|\mathcal{X}\|}$ be a source training sequence. The TCQ encoder uses the Viterbi algorithm to find the minimum distortion path through the encoding trellis, where $d(x_j, y_{k,l})$ defined in (2) is the branch metric for a branch labeled with the codeword $y_{k,l}$. Define $Q_{k,l} = \{x_j: x_j \in \mathcal{X} \text{ is encoded as } y_{k,l}\}$. The sets $Q_{k,l}, k = 1, 2, \cdots, N_1; l = 1, 2, \cdots, N_2$ are an optimal partitioning of $\mathcal{X}$, conditioned on the given $\mathcal{Y}$ and $P_{i,n|k,l}$. Note, however, that $P_{i,n|k,l}$ is dependent on the TCM (Viterbi algorithm) receiver.

Let $\mathcal{N} = \{n_j\}_{j=1}^{\|\mathcal{X}\|}$ be a training sequence of white Gaussian channel noise samples. For a given $\mathcal{X}, \mathcal{Y}$, and $\{P_{i,n|k,l}\}$, we generate a sequence of modulation symbols $\{z_j\}$ by TCQ encoding $x_j$ as $y_j \in \mathcal{Y}$, and mapping $y_j$ (one-to-one) to $z_j$. The channel has the output value $$v_j = z_j + n_j$$

and we wish to optimize the TCQ codebook $\mathcal{Y}$ and the TCM symbol set $\mathcal{Z}$ to minimize the overall MSE in (1).

The average distortion defined in (1) can be expressed as $$D = \frac{1}{\|\mathcal{X}\|} \sum_{y_{k,l} \in \mathcal{Y}} \sum_{x_j \in Q_{k,l}} d(x_j, y_{k,l})$$

$$= \frac{1}{\|\mathcal{X}\|} \sum_{k=1}^{N_1} \sum_{l=1}^{N_2} \sum_{x_j \in Q_{k,l}} \sum_{i=1}^{N_1} \sum_{n=1}^{N_2} P_{i,n|k,l}(x_j - y_{i,n})^2 \quad (6)$$

which is of the same form as the average distortion shown in (4) for a binary symmetric channel system. Again, we use the ideas in [1] and [2] to design the TCQ codebook. For fixed TCM symbols, that is, for fixed $\{P_{i,n|k,l}\}$, the average distortion is minimized by setting $\partial D / \partial y_{i,n} = 0$.

The corresponding necessary conditions for the reproduction levels yield $$y_{i,n} = \frac{1}{\sum_{k=1}^{N_1}\sum_{l=1}^{N_2} P_{i,n|k,l}\|Q_{k,l}\|} \sum_{k=1}^{N_1}\sum_{l=1}^{N_2} P_{i,n|k,l} \sum_{x_j \in Q_{k,l}} x_j$$

$$i = 1, 2, \cdots, N_1; n = 1, 2, \cdots, N_2. \quad (7)$$

If we define $\hat{Q}_{i,n} = \{x_j: x_j \in \mathcal{X}$ is decoded at the receiver as $y_{i,n}\}$, the average overall quantization noise can also be expressed as $$D = \frac{1}{\|\mathcal{X}\|} \sum_{i=1}^{N_1}\sum_{n=1}^{N_2} \sum_{x_j \in \hat{Q}_{i,n}} (x_j - y_{i,n})^2.$$

Setting $\partial D/\partial y_{i,n} = 0$, we obtain the updated codeword as the centroid $$y_{i,n} = \frac{1}{\|\hat{Q}_{i,n}\|} \sum_{x_j \in \hat{Q}_{i,n}} x_j,$$

$$i = 1, 2, \cdots, N_1; n = 1, 2, \cdots, N_2. \quad (8)$$

Equation (7) can be interpreted as the optimum reproduction codeword from the encoder's point of view. That is, given $P_{i,n|k,l}$, (7) minimizes the expected distortion without observation of the actual channel outputs. Equation (8) can be interpreted as the optimum codeword from the decoder's point of view.

Now, consider the design of the TCM symbols subject to a constraint on the average power. Let $P_{av}$ represent the average power of the channel symbols. Define $C_{k,l}$ as the set of all channel outputs for input $z_{k,l}$, that is, $C_{k,l} = \{v_j: v_j = z_{k,l} + n_j\}$. Then for a long training sequence the symbols satisfy $$P_{av} = \sum_{z_{k,l} \in \mathcal{Z}} z_{k,l}^2 P(z_{k,l}) = \sum_{z_{k,l} \in \mathcal{Z}} z_{k,l}^2 \frac{\|C_{k,l}\|}{\|\mathcal{X}\|}. \quad (9)$$

We know that for each $x_j$, there is the TCQ representation $y_j \in \{y_{k,l}\}$ and the corresponding $z_j \in \{z_{k,l}\}$. The output of the channel is the noise corrupted channel symbol, $v_j = z_j + n_j$. Suppose the TCM decoded value of $v_j$ is $\hat{z}_j \in \mathcal{Z}$. Ideally, we wish to select the $\hat{z}_j$ (for each $v_j$) to minimize the overall MSE. The expression in (6) for the average distortion indicates that the distortion is a function of the channel transition probabilities $P_{i,n|k,l}$, which in turn are functions of the TCM symbols. Unfortunately, we can find no closed-form expression for the relationship between the TCM symbols and the channel transition probabilities, because the $\hat{z}_j$ are computed from the $\{v_i\}_{i=1}^j$ using the Viterbi decoding algorithm. Therefore, we cannot express the average distortion as an explicit function of the TCM symbols. As a result, we cannot find the optimal TCM symbols analytically. We can, however, solve this problem by employing a quasi-Newton optimization subroutine to design the TCM symbols to minimize the average distortion in (6), with the equality constraint in (9).

The algorithm for improving the joint TCQ/TCM performance is development based on the above ideas. Let $\mathcal{Y}^{(m)} = \{y_{k,l}^{(m)}\}$ and $\mathcal{Z}^{(m)} = \{z_{k,l}^{(m)}\}$ be the set of reproduction levels and the channel symbol set at the $m$th iteration, respectively. Let $\{P_{i,n|k,l}^{(m)}\}$ be the set of channel transition probabilities (determined from $\mathcal{Z}^{(m)}$). Let $Q_{k,l}^{(m)} = \{x_j: x_j \in \mathcal{X}$ is encoded as $y_{k,l}^{(m)}\}$. The TCQ encoder finds the best path through the trellis with the minimum value of $$D^{(m)} = \frac{1}{\|\mathcal{X}\|} \sum_{k=1}^{N_1}\sum_{l=1}^{N_2} \sum_{x_j \in Q_{k,l}^{(m)}} \sum_{i=1}^{N_1}\sum_{n=1}^{N_2} P_{i,n|k,l}^{(m)} (x_j - y_{i,n}^{(m)})^2. \quad (10)$$

The reproduction levels are updated according to (7) as $$y_{i,n}^{(m+1)} = \frac{1}{\sum_{k=1}^{N_1}\sum_{l=1}^{N_2} P_{i,n|k,l}^{(m)} \|Q_{k,l}^{(m)}\|} \sum_{k=1}^{N_1}\sum_{l=1}^{N_2} P_{i,n|k,l}^{(m)} \sum_{x_j \in Q_{k,l}^{(m)}} x_j \quad (11)$$

and the partition cells are updated to $$Q_{i,n}^{(m+1)} = \{x_j: x_j \text{ is encoded as } y_{i,n}^{(m+1)}\}$$

$$i = 1, 2, \cdots, N_1; n = 1, 2, \cdots, N_2. \quad (12)$$

The TCM encoder maps each output of the TCQ encoder into a unique channel transmission symbol, and this symbol is transmitted over the channel. The channel introduces additive white Gaussian noise. Let the output of the channel be $\mathcal{V}^{(m)} = \{v_j^{(m)} = z_j^{(m)} + n_j\}$. The TCM decoder uses the Viterbi decoding algorithm to find the best path with minimum value of $$\frac{1}{\|\mathcal{X}\|} \sum_{i=1}^{N_1}\sum_{n=1}^{N_2} \sum_{v_j^{(m)} \in \hat{C}_{i,n}^{(m)}} (v_j^{(m)} - z_{i,n}^{(m)})^2 \quad (13)$$

where $\hat{C}_{k,l}^{(m)} = \{v_j^{(m)}: v_j^{(m)} \in \mathcal{V}^{(m)}$ is decoded as $z_{k,l}^{(m)}\}$. A quasi-Newton optimization subroutine is used to obtain $\mathcal{Z}^{(m+1)} = \{z_{k,l}^{(m+1)}\}$ to minimize $$\frac{1}{\|\mathcal{X}\|} \sum_{k=1}^{N_1}\sum_{l=1}^{N_2} \sum_{x_j \in Q_{k,l}^{(m+1)}} \sum_{i=1}^{N_1}\sum_{n=1}^{N_2} P_{i,n|k,l}^{(m)} (x_j - y_{i,n}^{(m+1)})^2 \quad (14)$$

subject to $$P_{av} = \sum_{z_{k,l}^{(m)} \in \mathcal{Z}^{(m)}} z_{k,l}^2 \frac{\|C_{k,l}^{(m)}\|}{\|\mathcal{X}\|}. \quad (15)$$

The TCQ levels can also be updated from (8) as $$y_{i,n}^{(m+1)} = \frac{1}{\|\hat{Q}_{i,n}^{(m)}\|} \sum_{x_j \in \hat{Q}_{i,n}^{(m)}} x_j$$

$$i = 1, 2, \cdots, N_1; n = 1, 2, \cdots, N_2. \quad (16)$$

The algorithm for joint TCQ/TCM design is summarized as follows.

*0) Initialization:* Given two training sequences $\mathcal{X} = \{x_j\}_{j=1}^{\|\mathcal{X}\|}$ and $\mathcal{N} = \{n_j\}_{j=1}^{\|\mathcal{X}\|}$, a convergence threshold $\epsilon$, an initial partitioned reproduction codebook $\mathcal{Y}^{(0)} = \{y_{k,l}^{(0)}\}$, an initial partitioned TCM symbol set $\mathscr{Z}^{(0)} = \{z_{k,l}^{(0)}\}$, and an initial set of channel transition probabilities $\{P_{i,n|k,l}^{(0)}\}$, set $m = 0$ and $D^{(-1)} = \infty$.

*1) Reproduction Codebook Update:* Encode the training sequence using the Viterbi algorithm, $\{y_{k,l}^{(m)}\}$, and $\{P_{i,n|k,l}^{(m)}\}$ to obtain $\{Q_{k,l}^{(m)}\}$ and $D^{(m)}$. The branch metric of the trellis encoding is the distortion defined in (2). If $|D^{(m-1)} - D^{(m)}|/D^{(m)} < \epsilon$, quit with $y_{k,l} = y_{k,l}^{(m)}$, $z_{k,l} = z_{k,l}^{(m)}$, and $P_{i,n|k,l} = P_{i,n|k,l}^{(m)}$, $i,k = 1,2,\cdots,N_1$; $n,l = 1,2,\cdots,N_2$. Otherwise, update the TCQ reproduction levels according to (16) [or (11)] to obtain $\mathscr{Y}^{(m+1)} = \{y_{i,n}^{(m+1)}\}$. Obtain $\{Q_{i,n}^{(m+1)}\}$ based on (12).

*2) TCM Codebook Update:* Decode the training sequence $\mathscr{V}^{(m)} = \{v_j^{(m)} = z_j^{(m)} + n_j\}_{j=1}^{|\mathscr{V}|}$, where $z_j^{(m)} \in \mathscr{Z}^{(m)}$, by using the Viterbi algorithm and $\{z_{k,l}^{(m)}\}$ to obtain $\{C_{k,l}^{(m)}\}$. Update the TCM codebook by using a quasi-Newton optimization subroutine to minimize (14) subject to the equality constraint given by (15).

*3) Set* $m \leftarrow m + 1$: Go to step 1).

We investigated, by simulation, the design algorithm performance if (16) is used instead of (11) in the reproduction codebook update. Both update equations led to equivalent performance. If (11) was used in the design algorithm then (16) was (approximately) satisfied by the final codebook design.

D. Simulation of Joint TCQ / TCM for The Memoryless Gaussian and Laplacian Sources The jointly designed TCQ/TCM system for transmitting a Gaussian memoryless source is designed according to the algorithm in the last subsection using a training sequence of 10 000 samples and an eight-state trellis. The simulation performance is shown in Fig. 8, based on the average results of encoding a test sequence (100 blocks, each of 1000 samples). The performance curves are "smoother," and avoid much of the "precipitous drop" reported in [8]. The improvement is most noticeable at low channel signal-to-noise ratio (CSNR). Fig. 9 shows the average performance (of the testing sequence) of the jointly designed TCQ/TCM system for the memoryless Laplacian source. The procedure used to design and test the system is the same as those for the memoryless Gaussian source.

IV. JOINT PREDICTIVE TCQ/TCM FOR SOURCES WITH MEMORY

A. Design Algorithm

In this section, we describe a joint predictive TCQ/TCM system and develop an algorithm to design such a system for sources with memory. As before, the TCQ has a scalar codebook and the TCM has one-dimensional symbols. The TCQ and TCM trellises are identical and the labeling between quantization levels and modulation symbols is consistent. A block diagram of the joint predictive TCQ/TCM system is shown in Fig. 10.

Let $\mathscr{X} = \{x_j\}$ be the source to be transmitted. Let $\tilde{x}_j$, $\hat{x}_j$, and $\check{x}_j$ represent for $x_j$ the predicted value, the quantized

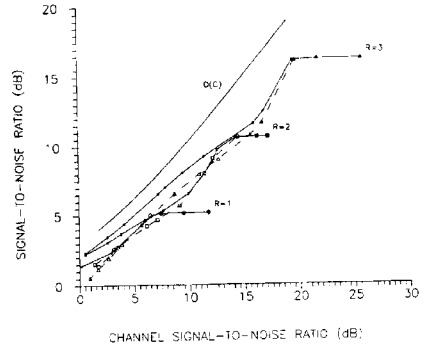

Fig. 8. Performance of a jointly designed TCQ/TCM system for a memoryless Gaussian source. Solid—jointly designed TCQ/TCM; dashed—separately designed TCQ/TCM (as in [8]).

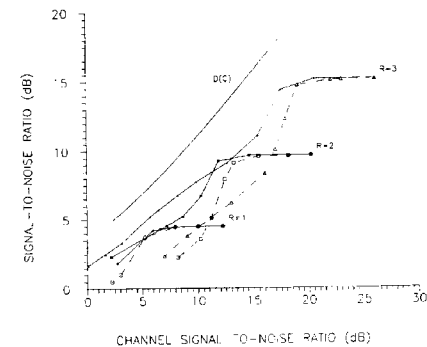

Fig. 9. Performance of a jointly designed TCQ/TCM system for a memoryless Laplacian source. Solid—jointly designed TCQ/TCM; dashed—separately designed TCQ/TCM (as in [8]).

value at the transmitter, and the quantized value decoded at the receiver, respectively. Let $e_j$ denote the prediction error, $e_j = x_j - \tilde{x}_j$, and let $\tilde{e}_j$ and $\hat{e}_j$ be the TCQ encoded and receiver decoded values of $e_j$, respectively. The differential encoder structure has the property that $x_j - \tilde{x}_j = e_j - \tilde{e}_j$. If the channel is noiseless, $\tilde{e}_j = \hat{e}_j$ and therefore, $\tilde{x}_j = \hat{x}_j$. We want to design the TCQ codebook, TCM symbols, and the predictor such that $$E\{(e_j - \hat{e}_j)^2\}$$

is minimized.

Like the joint TCQ/TCM system for a memoryless source, we use two training sequences $\mathscr{X} = \{x_j\}_{j=1}^{|\mathscr{X}|}$ and

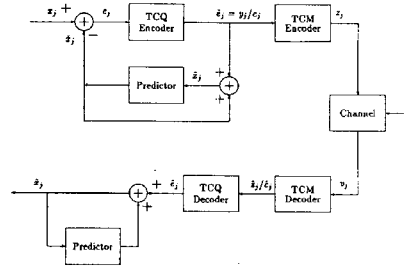

Fig. 10. Joint predictive TCQ/TCM system.

$\mathcal{N} = \{n_j\}_{j=1}^{|\mathcal{X}|}$, corresponding to the source and the channel noise, respectively. Let $m$ be the iteration index and let $M$ be the maximum number of $m$. Let $\mathcal{Y}^{(m)} = \{y_{k,l}^{(m)}\}$ and $\mathcal{Z}^{(m)} = \{z_{k,l}^{(m)}\}$ be the TCQ codebook and TCM symbol set, respectively. There is a one-to-one mapping between $\mathcal{Y}^{(m)}$ and $\mathcal{Z}^{(m)}$, that is, $y_{k,l}^{(m)} \overset{1-1}{\leftrightarrow} z_{k,l}^{(m)}$. Define $P_{i,n|k,l}^{(m)} = Pr\{z_{i,n}^{(m)}$ received $|z_{k,l}^{(m)}$ sent$\}$ as the channel transition probability. Define the sets $$\mathcal{E}^{(m)} = \left\{e_j^{(m)}: e_j^{(m)} = x_j - \tilde{x}_j^{(m)}\right\}_{j=1}^{|\mathcal{X}|}$$

$$\mathcal{V}^{(m)} = \left\{v_j^{(m)}: v_j^{(m)} = z_j^{(m)} + n_j\right\}$$

$$Q_{k,l}^{(m)} = \left\{e_j^{(m)}: e_j^{(m)} \in \mathcal{E}^{(m)} \text{ is encoded as } y_{k,l}^{(m)}\right\}$$

$$\hat{Q}_{k,l}^{(m)} = \left\{e_j^{(m)}: e_j^{(m)} \in \mathcal{E}^{(m)} \text{ is decoded as } y_{k,l}^{(m)}\right\}$$

and $$C_{k,l}^{(m)} = \left\{v_j^{(m)}: v_j^{(m)} = z_{k,l}^{(m)} + n_j\right\}.$$

Our purpose is to minimize $$D^{(m)} = \frac{1}{\|\mathcal{X}\|} \sum_{k=1}^{N_1} \sum_{l=1}^{N_2} \sum_{e_j \in Q_{k,l}^{(m)}} \sum_{i=1}^{N_1} \sum_{n=1}^{N_2} P_{i,n|k,l}^{(m)} \left(e_j - y_{i,n}^{(m)}\right)^2 \quad (17)$$

or, equivalently, $$D^{(m)} = \frac{1}{\|\mathcal{X}\|} \sum_{i=1}^{N_1} \sum_{n=1}^{N_2} \sum_{e_j \in \hat{Q}_{i,n}^{(m)}} \left(e_j - y_{i,n}^{(m)}\right)^2 \quad (18)$$

by selecting the predictor, TCQ codebook, and TCM symbol set, subject to the constraint on the average energy of the TCM symbol set, $$\sum_{z_{k,l} \in \mathcal{Z}} z_{k,l}^{2\,(m)} \frac{\|C_{k,l}^{(m)}\|}{\|\mathcal{X}\|} = P_{av}.$$

From the necessary condition $\partial D^{(m)}/\partial y_{i,n}^{(m)} = 0$, the TCQ codewords are updated similar to (11) and (16) as $$y_{i,n}^{(m+1)} = \frac{1}{\sum_{k=1}^{N_1}\sum_{l=1}^{N_2} P_{i,n|k,l}^{(m)} \|Q_{k,l}^{(m)}\|} \sum_{k=1}^{N_1} \sum_{l=1}^{N_2} P_{i,n|k,l}^{(m)} \sum_{e_j \in Q_{k,l}^{(m)}} e_j \quad (19)$$

or $$y_{i,n}^{(m+1)} = \frac{1}{\|\hat{Q}_{i,n}^{(m)}\|} \sum_{e_j \in \hat{Q}_{i,n}^{(m)}} e_j$$

$$i = 1, 2, \cdots, N_1; n = 1, 2, \cdots, N_2. \quad (20)$$

Since there is no difference between th TCM scheme in the joint predictive TCQ/TCM system and the joint TCQ/TCM system, the updating method for the TCM symbols is the same as that in the joint TCQ/TCM system design.

The predictor of the jointly designed predictive TCQ/TCM system can be either fixed or iteratively updated. The design algorithms are summarized in Appendix B.

*B. Simulation of Joint Predictive TCQ/TCM System for the First-Order Gauss–Markov Source*

Simulation results of the performance of jointly designed predictive TCQ/TCM are presented for a Gauss–Markov source. The parameters and the trellis structure are the same as those for the TCQ/TCM simulation results presented earlier. The encoding rates are $R = 1, 2,$ and 3 b/sample. The source is described by $$x_j = a_1 x_{j-1} + w_j$$

with $a_1 = 0.9$ and $w_j$ a zero mean, unit variance white Gaussian sequence. The jointly designed predictive TCQ/TCM system for this autoregressive source is designed using a training sequence of 10 000 samples. Both the fixed predictor and updated predictor design algorithms were used [9]. For the fixed predictor system, the predictor coefficient was 0.9 (and matched to the source), and for the updated predictor system, we let the initial predictor coefficient be 0.9. Both simulations ended up with the same performance and the designed predictor coefficient was equal to the correlation coefficient of the source. The simulation performance is shown in Fig. 11 for a testing sequence containing 100 blocks, each of 1000 samples. The jointly designed predictive TCQ/TCM system improves the performance over the simple joint predictive TCQ/TCM system in [8], especially when the channel becomes very noisy. However, the precipitous drops in performance still occur, and for some channel signal-to-noise ratios, a higher encoding rate system performs poorer than a lower encoding rate system. The main reason for this seems to be the propagation of a channel error due to the feedback in the decoder. As a result, the system with more quantization levels (or high encoding rate) may not perform as well as a system with a smaller size quantization codebook.

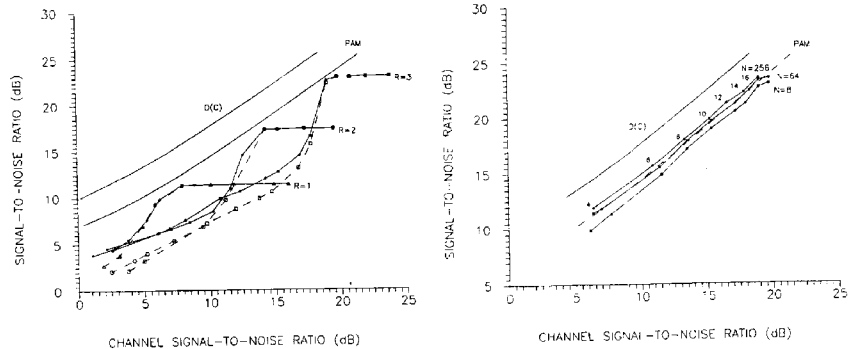

Fig. 11. Performance of a jointly designed predictive TCQ/TCM (PTCQ/TCM) system with eight-state trellis for the first-order Gauss–Markov source ($\rho = 0.9$). Solid—jointly designed PTCQ/TCM; dashed—separately designed predictive TCQ/TCM (as in [8]).

Fig. 12. Performance of a jointly designed predictive TCQ/TCM (PTCQ/TCM) system with variable codebook size and an 8-, 64-, or 256-state trellis for the first-order Gauss–Markov source ($\rho = 0.9$).

To improve the performance, the design algorithm is modified to allow the size of the TCQ codebook and the TCM symbol set to vary during the design process. This approach is somewhat similar to the method of Vaishampayan and Farvardin [16] for channel optimized vector quantization. The resulting performance is shown in Fig. 12, where the codebook size is allowed to be 16, 14, 12, 10, 8, 6, and 4. Along the performance curve, the size of the corresponding codebook is indicated. At low channel signal-to-noise ratio, a small codebook system performs better than a large codebook system. The performance curve is smoother, avoids the precipitous drop mentioned earlier, and is much closer to the best possible performance.

Fig. 12 also shows the joint predictive TCQ/TCM performance for 64- and 256-state trellises. Again, the size of TCQ codebook and TCM symbol set was allowed to change during the design process. The performance is improved as the number of trellis states increases and the performance with a 256-state trellis is always better than that of optimal PAM [12] which, in turn, is an upper bound to the performance of Vaishampayan and Farvardin's linear estimator-based decoder [16].

V. CONCLUSION

This paper has developed algorithms for the design of TCQ to be used on a noisy binary symmetric channel or with TCM on a white Gaussian channel. The former case differs from the work of Ayanoğlu and Gray [2] only due to the use of the more specific TCQ structure (which simplifies the complexity of trellis encoding at rates above 1 b/sample). In the latter case, simulations verify that significant improvement is possible over the performance achieved with a straightforward tandem of TCQ and TCM [8]. The complexity of designing a jointly optimum TCQ/TCM system using Ayanoğlu and Gray's formulation appears to be prohibitive. In an earlier effort [15], a suboptimum design methodology used the generalized Lloyd algorithm to design the TCM signal constellation. This approach provided TCQ/TCM designs yielding performance essentially equivalent to the results in the present paper for the memoryless sources. However, the quasi-Newton optimization yields slightly better performing systems for the Gauss–Markov source. Certainly, the design of the joint TCQ/TCM scheme assumes perfect knowledge of the channel characteristics. Therefore, the straightforward tandem of TCQ and TCM systems [8] might be more robust to the variations in the channel statistics.

APPENDIX A

Consider the trellis shown in Fig. 2 for a rate-1/2 feedback-free convolutional encoder. Assume the encoding rate is $R = 1$ b/sample. The size of the TCQ codebook is 4 and it is partitioned into four subsets, each with exactly one codeword. Let the codewords be denoted as $y_{1,1}$, $y_{2,1}$, $y_{3,1}$, and $y_{4,1}$, respectively. In this case, the bit which specifies the trellis branch also specifies the codeword. Suppose at time $j = j_1$, the best encoding path passes through state (0) and the bit to specify the branch is 0. If the channel is noiseless, both the transmitted and the received codewords should be $y_{1,1}$. Let $P_b$ represent the channel bit error probability.

We assume that the encoding path may pass through each state at $j = j_1 - 2$ with equal probability. Hence, the state probability is $P_s = 1/4$. Then, to obtain the transition probabilities (derived at $j = j_1$), we need only to trace back the trellis to time $j = j_1 - 2$. The trellis portion used for the derivation is shown in Fig. 13.

*Analysis:*

1) The probability that the bits specifying the transitions from $j_1 - 2$ to $j_1 - 1$ and $j_1 - 1$ and $j_1$ are correctly received is $\sum_{i=1}^{3} P_s (1 - P_b)^2 = (1 - P_b)^2$. Then the decoded output is either $y_{1,1}$ or $y_{3,1}$ with probability $(1 - P_b)^3$ or $(1 - P_b)^2 P_b$.

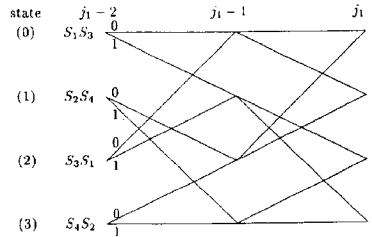

Fig. 13. The section of trellis diagram used to compute the transition probabilities.

2) The probability that the bit specifying the transition from $j_1 - 1$ to $j_1$ is incorrectly received but the bit specifying the transition from $j_1 - 2$ to $j_1 - 1$ is correctly received is $\sum_{i=0}^{3} P_i (1 - P_b)P_b = (1 - P_b)P_b$. With this probability, the decoding path passes through state (1) at $j = j_1$. Then, the decoded output is either $y_{2,1}$ or $y_{4,1}$, with probability $(1 - P_b)^2 P_b$ or $(1 - P_b)P_b^2$.

3) The probability that the bit specifying the transition from $j_1 - 2$ to $j_1 - 1$ is incorrectly received but the bit specifying the transition from $j_1 - 1$ to $j_1$ is correctly received is $\sum_{i=0}^{3} P_i P_b(1 - P_b) = P_b(1 - P_b)$. With this probability the decoding path passes through state (2) at $j = j_1$ and the decoded output is either $y_{1,1}$ or $y_{3,1}$, with probability either $P_b(1 - P_b)P_b = (1 - P_b)P_b^2$ or $P_b(1 - P_b)^2$.

4) The probability that both the bits specifying the transitions from $j_1 - 2$ to $j_1 - 1$ and $j_1 - 1$ to $j_1$ are incorrectly received is $\sum_{i=0}^{3} P_i P_b P_b = P_b^2$. With this probability the decoding path passes through state (3) at $j = j_1$ and the decoded output is either $y_{2,1}$ or $y_{4,1}$, with probability either $P_b^3$ or $P_b P_b(1 - P_b) = (1 - P_b)P_b^2$.

If at $j = j_1$ the trellis path passes through state (2) and the bit to specify the branch leaving that state is 1, the encoding output should be $y_{1,1}$. Repeating the analysis as above, we get the same expressions. Therefore, the transition probabilities given $y_{1,1}$ sent are $$P_{1,1|1,1} = (1 - P_b)^3 + (1 - P_b)P_b^2 = a$$

$$P_{2,1|1,1} = (1 - P_b)^2 P_b + P_b^3 = b$$

$$P_{3,1|1,1} = 2 \cdot (1 - P_b)^2 P_b = c$$

and $$P_{4,1|1,1} = 2 \cdot (1 - P_b)P_b^2 = d.$$

Following the above steps, we can get the expressions of the transition probabilities given that other codewords are sent. The transition probabilities are summarized in a matrix. Let the $(m, n)$th term represent the transition probability $P_{m,1|n,1}$. Then the transition probability matrix is given as $$\begin{pmatrix} a & b & c & d \\ b & a & d & c \\ c & d & a & b \\ d & c & b & a \end{pmatrix}.$$

For $R = 2$ b/sample, there are two codewords in each subset. Since 1 b is used for specifying the subset, there is 1 b more used to distinguish the codewords in a subset. Let $\{y_{k,l}, k = 1, 2, 3, 4, l = 1, 2\}$ represent the reproduction codewords and these are shown in Fig. 14 along with the bits required to specify each codeword. We make the same assumption as for $R = 1$ b/sample and extend the above procedure to $R = 2$ b/sample. Assume that at $j = j_1$ the best encoding path passes state (0) and the transmitted codeword is $y_{1,1}$. That is, the bit to specify the branch is 0.

*Analysis:*

1) The probability that the bits specifying the transitions from $j_1 - 2$ to $j_1 - 1$ and $j_1 - 1$ and $j_1$ are correctly received is $\sum_{i=0}^{3} P_i (1 - P_b)^2 = (1 - P_b)^2$. Then the decoded output is $y_{1,1}$, $y_{1,2}$, $y_{3,1}$, or $y_{3,2}$ with probability $(1 - P_b)^4$, $(1 - P_b)^3 P_b$, $(1 - P_b)^3 P_b$, or $(1 - P_b)^2 P_b^2$.

2) The probability that the bit specifying the transition from $j_1 - 1$ to $j_1$ is incorrectly received but the bit specifying the transition from $j_1 - 2$ to $j_1 - 1$ is correctly received is $\sum_{i=0}^{3} P_i (1 - P_b)P_b = (1 - P_b)P_b$. With this probability, the decoding path passes through state (1) at $j = j_1$. Then the decoded output is $y_{2,1}$, $y_{2,2}$, $y_{4,1}$ or $y_{4,2}$ with probability $(1 - P_b)^3 P_b$, $(1 - P_b)^2 P_b^2$, $(1 - P_b)^2 P_b^2$, or $(1 - P_b)P_b^3$.

3) The probability that the bit specifying the transition from $j_1 - 2$ to $j_1 - 1$ is incorrectly received but the bit specifying the transition from $j_1 - 1$ to $j_1$ is correctly received is $\sum_{i=0}^{3} P_i P_b (1 - P_b) = P_b(1 - P_b)$. With this probability the decoding path passes through state (2) at $j = j_1$ and the decoded output is either $y_{1,1}$, $y_{1,2}$, $y_{3,1}$, or $y_{3,2}$ with probability $P_b(1 - P_b)P_b(1 - P_b) = (1 - P_b)^2 P_b^2$, $(1 - P_b)P_b^3$, $(1 - P_b)^3 P_b$, or $P_b^2(1 - P_b)^2$.

4) The probability that both the bits specifying the transitions from $j_1 - 2$ to $j_1 - 1$ and $j_1 - 1$ to $j_1$ are incorrectly received is $\sum_{i=0}^{3} P_i P_b P_b = P_b^2$. With this probability the decoding path passes through state (3) at $j = j_1$ and the decoded output is $y_{2,1}$, $y_{2,2}$, $y_{4,1}$, or $y_{4,2}$ with probability $P_b^3(1 - P_b)$, $P_b^4$, $(1 - P_b)^2 P_b^2$, or $(1 - P_b)P_b^3$.

Let $$a = (1 - P_b)^4 + (1 - P_b)^2 P_b^2$$
$$b = (1 - P_b)^3 P_b + (1 - P_b)P_b^3$$
$$c = (1 - P_b)^2 P_b^2 + P_b^4$$
$$d = 2 \cdot (1 - P_b)^3 P_b$$
$$e = 2 \cdot (1 - P_b)^2 P_b^2$$

and $$f = 2 \cdot (1 - P_b)P_b^3.$$

Then the transition probabilities can be summarized as a matrix expressed as $$\begin{pmatrix} a & b & b & c & d & e & e & f \\ b & a & c & b & e & d & f & e \\ b & c & a & b & e & f & d & e \\ c & b & b & a & f & e & e & d \\ d & e & e & f & a & b & b & c \\ e & d & f & e & b & a & c & b \\ e & f & d & e & b & c & a & b \\ f & e & e & d & c & b & b & a \end{pmatrix}$$

with the $(m, n)$th term denoting $P_{i,j|k,l}$ with $i = \left\lfloor \frac{m+1}{2} \right\rfloor$, $j = 1$ if $m$ = odd, $j = 2$ if $m$ = even, and $k = \left\lfloor \frac{n+1}{2} \right\rfloor$, $l = 1$ if $n$ = odd, $l = 2$ if $n$ = even.

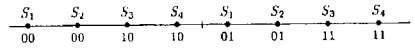

Fig. 14. The TCQ output points for $R = 2$ b/sample.

APPENDIX B

If the predictor is fixed, a design algorithm is summarized as follows.

*0) Initialization:* Given $M$ and $\epsilon$, select an initial $\mathcal{Y}^{(0)} = \{y_{k,l}^{(0)}\}$, $\mathcal{Z}^{(0)} = \{z_{k,l}^{(0)}\}$, and $\{P_{i,n|k,l}^{(0)}\}$. Set $m = 0$ and $D^{(-1)} = \infty$.

*1) Reproduction Codebook Update:* Encode the training sequence using the Viterbi algorithm, $\{y_{k,l}^{(m)}\}$, and $\{P_{i,n|k,l}^{(m)}\}$, to obtain $\mathcal{E}^{(m)} = \{e_j^{(m)}\}$, $\{Q_{k,l}^{(m)}\}$, and $D^{(m)}$ in (18) [or (17)]. If $|D^{(m-1)} - D^{(m)}|/D^{(m)} < \epsilon$ or if $m \geq M$, quit with $y_{k,l} = y_{k,l}^{(m_1)}$, $z_{k,l} = z_{k,l}^{(m_1)}$, and $P_{i,n|k,l} = P_{i,n|k,l}^{(m_1)}$, $i,k = 1,2,\cdots,N_1$; $n,l = 1,2,\cdots,N_2$, where $0 < m_1 \leq m$ and $D^{(m_1)} \leq D^{(m_2)}$ for all $0 \leq m_2 \leq m$, $m_2 \neq m_1$. Otherwise, update the TCQ reproduction levels according to (20) [or (19)] to obtain $\mathcal{Y}^{(m+1)} = \{y_{i,n}^{(m+1)}\}$.

*2) TCM Codebook Update:* Decode the training sequence $\mathcal{V}^{(m)} = \{v_j^{(m)} = z_j^{(m)} + n_j\}_{j=1}^{|\mathcal{E}^{(m)}|}$, where $z_j^{(m)} \in Z^{(m)}$, by using the Viterbi algorithm and $\{z_{k,l}^{(m)}\}$ to obtain $\{C_{k,l}^{(m)}\}$. Update the TCM codebook by using a quasi-Newton constrained optimization subroutine.

*3) Set $m \leftarrow m + 1$:* Go to step 1).

The predictor in the joint predictive TCQ/TCM system can also be designed to minimize the average distortion. Here we give an algorithm for a linear, time-invariant predictor of order $P$, such as may be used to encode a Gauss–Markov source. The predictor update equation is obtained by an application of the principle of orthogonality [9] and is $$\sum_{i=1}^{P} a_i \sum_{j=1}^{|\mathcal{X}|} \hat{x}_{j-i} \hat{x}_{j-l} = \sum_{j=1}^{|\mathcal{X}|} [x_j - \hat{e}_j]\hat{x}_{j-l}, \quad l = 1,2,\cdots,P. \quad (21)$$

An algorithm for the design of joint predictive TCQ/TCM with updated predictor is as follows.

*0) Initialization:* Given $M$ and $\epsilon$, select an initial $\mathcal{Y}^{(0)} = \{y_{k,l}^{(0)}\}$, $\mathcal{Z}^{(0)} = \{z_{k,l}^{(0)}\}$, and $\{P_{i,n|k,l}^{(0)}\}$. Set $m = 0$ and $D^{(-1)} = \infty$.

*1) Reproduction Codebook Update:* Encode the training sequence using the Viterbi algorithm, $\{y_{k,l}^{(m)}\}$, $\{a_i^{(m)}\}$, and $\{P_{i,n|k,l}^{(m)}\}$ to obtain $\mathcal{E}^{(m)} = \{e_j^{(m)}\}$, $\{Q_{k,l}^{(m)}\}$, and $D^{(m)}$ in (18) [or (17)]. If $|D^{(m-1)} - D^{(m)}|/D^{(m)} < \epsilon$ or if $m \geq M$, quit with $y_{k,l} = y_{k,l}^{(m_1)}$, $a_i = a_i^{(m_1)}$, $z_{k,l} = z_{k,l}^{(m_1)}$, and $P_{i,n|k,l} = P_{i,n|k,l}^{(m_1)}$ for all $l$ and $k$, where $0 < m_1 \leq m$ and $D^{(m_1)} \leq D^{(m_2)}$ for all $0 \leq m_2 \leq m$, $m_2 \neq m_1$. Otherwise, update the TCQ reproduction levels according to (20) [or (19)] to obtain $\mathcal{Y}^{(m+1)} = \{y_{k,l}^{(m+1)}\}$.

*2) Predictor update:* Use $\{y_{k,l}^{(m+1)}\}$, $\{a_i^{(m)}\}$, and $\{P_{i,n|k,l}^{(m)}\}$ to encode the training sequence. Use (21) to obtain the updated predictor coefficients $\{a_i^{(m+1)}\}$.

*3) TCM Codebook Update:* Decode the training sequence $\mathcal{V}^{(m)} = \{v_j^{(m)} = z_j^{(m)} + n_j\}_{j=1}^{|\mathcal{E}^{(m)}|}$, where $z_j^{(m)} \in Z^{(m)}$, using the Viterbi algorithm and $\{z_{k,l}^{(m)}\}$ to obtain $\{C_{k,l}^{(m)}\}$. Update the TCM codebook by using the quasi-Newton constrained optimization subroutine.

*4) Set $m \leftarrow m + 1$:* Go to step 1).

ACKNOWLEDGMENT

The authors wish to thank the anonymous reviewers for their useful comments.

REFERENCES

[1] J. G. Dunham and R. M. Gray, "Joint source and noisy channel trellis encoding," *IEEE Trans. Inform. Theory*, vol. IT-27, pp. 516–519, July 1981.

[2] E. Ayanoğlu and R. M. Gray, "The design of joint source and channel trellis waveform coders," *IEEE Trans. Inform. Theory*, vol. IT-33, pp. 855–865, Nov. 1987.

[3] N. Farvardin and V. Vaishampayan, "On the performance and complexity of channel-optimized vector quantizers," *IEEE Trans. Inform. Theory*, vol. 37, pp. 155–160, Jan. 1991.

[4] G. Ungerboeck, "Channel coding with multilevel/phase signals," *IEEE Trans. Inform. Theory*, vol. IT-28, pp. 55–67, Jan. 1982.

[5] W. Marcellin and T. R. Fischer, "Trellis coded quantization of memoryless and Gauss–Markov Sources," *IEEE Trans. Commun.*, vol. 38, pp. 82–93, Feb. 1990.

[6] M. W. Marcellin and T. R. Fischer, "Predictive trellis coded quantization of speech," *IEEE Trans. Acoust., Speech, Signal Process.*, vol. 38, pp. 46–55, Jan. 1990.

[7] T. R. Fischer, M. W. Marcellin, and M. Wang, "Trellis coded vector quantization," *IEEE Trans. Inform. Theory*, vol. 37, pp. 1551–1566, Nov. 1991.

[8] T. R. Fischer and M. W. Marcellin, "Joint trellis coded quantization/modulation," *IEEE Trans. Commun.*, vol. 39, pp. 172–176, Feb. 1991.

[9] E. Ayanoğlu and R. M. Gray, "The design of predictive trellis waveform coders using the generalized Lloyd algorithm," *IEEE Trans. Commun.*, vol. COM-34, pp. 1073–1080, Nov. 1986.

[10] G. D. Forney, Jr., "The Viterbi algorithm," *Proc. IEEE*, vol. 61, pp. 268–278 (Invited Paper), Mar. 1973.

[11] Y. Linde, A. Buzo, and R. M. Gray, "An algorithm for vector quantizer design," *IEEE Trans. Commun.*, vol. COM-28, pp. 84–95, Jan. 1980.

[12] T. Berger, *Rate Distortion Theory*. Englewood Cliffs, NJ: Prentice Hall, 1971.

[13] V. Cuperman and A. Gersho, "Vector predictive coding of speech at 16 Kbits/s," *IEEE Trans. Commun.*, vol. COM-33, pp. 685–696, July 1985.

[14] R. M. Gray, "Sliding block coding," *IEEE Trans. Inform. Theory*, vol. IT-21, pp. 357–368, July 1975.

[15] M. Wang and T. R. Fischer, "The design of joint source/channel trellis coded quantization/modulation," Abstract in *IEEE Int. Symp. Inform. Theory*, San Diego, CA, Jan. 1990.

[16] V. A. Vaishampayan and N. Farvardin, "Joint design of block source codes and modulation signal sets," *IEEE Trans. Inform. Theory*, vol. 38, pp. 1230–1248, July 1992.

APPENDIX D

Trellis Coded Quantization of Memoryless and Gauss–Markov Sources

MICHAEL W. MARCELLIN AND THOMAS R. FISCHER

*Abstract*—Exploiting the duality between modulation for digital communications and source coding, trellis coded quantization (TCQ) is developed and applied to the encoding of memoryless and Gauss–Markov sources. The theoretical justification for the approach is alphabet constrained rate distortion theory, which is a dual to the channel capacity argument that motivates trellis coded modulation (TCM). We adopt the notions of signal set expansion, set partitioning, and branch labeling of TCM, but modify the techniques to account for the source distribution, to design TCQ coders of low complexity with excellent mean squared error (MSE) performance.

For a memoryless uniform source, TCQ provides a MSE within 0.21 dB of the distortion rate bound at all positive (integral) rates. The performance is superior to that promised by the coefficient of quantization for all of the best lattices known in dimensions 24 or less. For a memoryless Gaussian source, the TCQ performance at rates of 0.5, 1, and 2 bits/sample, is superior to all previous results we have found in the literature, including stochastically populated trellis codes and entropy coded scalar quantization.

The encoding complexity of TCQ is very modest. In the most important case, the encoding for an $N$-state trellis requires only 4 multiplications, $4 + 2N$ additions, $N$ comparisons, and 4 scalar quantizations per data sample.

TCQ is incorporated into a predictive coding structure for the encoding of Gauss–Markov sources. Simulation results for first-, second-, and third-order Gauss–Markov sources (with coefficients selected to model sampled speech) demonstrate that for encoding rates of 1, 2, or 3 bits/sample, predictive TCQ yields distortions ranging between 0.75 dB and 1.3 dB from the respective distortion rate bounds.

I. INTRODUCTION

THERE are numerous parallels between the research areas of modulation theory and source coding. Both areas rely heavily on signal space concepts, both have benefitted tremendously from block and trellis coding formulations, both areas find important application for lattices, and theoretical results in each area are dominated by the Euclidean distance measure due to the typical assumption of Gaussian channel noise in the analysis of modulation systems and the typical choice of mean squared error (MSE) as the distortion measure in source coding. The past ten years have witnessed a renewed interest in modulation theory spawned by Ungerboeck's [1] formulation of coded modulation using trellis coding, and culminating quite recently in general lattice based approaches [2]–[5] to coded modu- Paper approved by the Editor for Quantization, Speech/Image Coding of the IEEE Communications Society. Manuscript received February 17, 1987; revised October 10, 1988. This work was supported in part by the National Science Foundation under Grant NCR-8821764. This paper was presented in part at the 1988 International Symposium on Information Theory, Kobe City, Japan.

M. W. Marcellin is with the Department of Electrical and Computer Engineering, The University of Arizona, Tucson, AZ 85721.

T. R. Fischer was with the Department of Electrical Engineering, Texas A&M University. He is now with the Department of Electrical and Computer Engineering, Washington State University, Pullman, WA 99164.

IEEE Log Number 8932067.

lation. It is the purpose of this paper to develop the natural dual[1] to this trellis coded modulation, namely, trellis coded quantization.

Trellis coding is a proven technique for source coding, with a long history [6]–[15]. A number of theorems (e.g., [6], [7]) demonstrate the asymptotic optimality (in a rate distortion sense) of the method. Unfortunately, the source coding theorems are generally nonconstructive (except for stochastically populating the trellis) and the complexity of traditional implementations has limited the approach to generally small encoding rates (typically, rates less than about two bits/sample).

The novel feature of the trellis coded quantization approach is the use of a structured codebook with an expanded set of quantization levels. Based on Ungerboeck's notion of set partitioning, the trellis structure then prunes the expanded number of quantization levels down to the desired encoding rate. By employing a deterministic codebook, a computationally simple encoding structure is achieved. The encoder uses the Viterbi algorithm [16] and, in the most important case, the encoding requires only 4 multiplications, 4 additions, and 4 scalar quantizations per source sample, plus 2 additions and 1 comparison per trellis state per source sample. Significantly, this encoding complexity is roughly independent of the encoding rate, and is far less than the complexity of corresponding stochastically populated trellis coders.

The main contribution of the paper is to describe the construction and performance of a good class of source codes for memoryless and Gauss–Markov sources. In comparing TCQ to other results in the literature, we find that TCQ is comparable and often superior in mean squared error performance to all previous results, but with very modest computational complexity. Further, an analysis of the effect of channel errors shows that TCQ can be constructed to be surprisingly insensitive to channel errors.

The remainder of the paper begins by considering the alphabet constrained rate distortion theory formulated by Pearlman and his coauthors [8]–[10]. Motivated by this theory and Ungerboeck's trellis coded modulation [1], [17], [18], TCQ systems are then designed for memoryless uniform, Gaussian, and Laplacian sources. The computational complexity of TCQ is then described, followed by an analysis of the effect of channel errors. Finally, a predictive TCQ structure is formulated and used to design coders for first-, second-, and third-order Gauss–Markov sources.

II. ALPHABET CONSTRAINED RATE DISTORTION THEORY

Alphabet constrained rate distortion theory is, in many respects, a mixture of the theory for discrete and continuous sources. For a discrete source, a specific reproduction alphabet must be chosen in order to compute the rate distortion function, while in the continuous case, the reproduction alphabet is implicitly the entire real line. In many cases, such an uncountable output alphabet is impractical or even impossible to implement in a finite complexity source coder.

Alphabet constrained rate distortion theory was developed in a series of papers by Pearlman and his coauthors [8]–[10]. The basic

---

[1] Our use of the word "dual" is as a synonym for "counterpart," and should not be confused with the mathematically more formal use of dual in dual codes or dual lattices.

idea is to find an expression for the best achievable performance for encoding a continuous source using a finite reproduction alphabet. The theory has been developed to the extent that the choice of an output alphabet is quite flexible. The options available when choosing an output alphabet are as follows: i) choosing only the size of the alphabet (the number of elements), ii) choosing the size and the actual values of the alphabet, iii) choosing the size, values, and the probabilities with which the values are to be used. Since case ii) will be sufficient for our purposes, we present only a simple derivation [of case ii)] that we feel is more straightforward and intuitive than that in [10].

Let $X$ be a source, producing independent and identically distributed (i.i.d.) outputs according to some continuous probability density function (pdf) $fx$. Consider prequantizing $X$ with a high rate scalar quantizer to obtain the "source" $U$ taking values in $\{a_1, a_2, \cdots, a_K\}$ with probabilities $P(a_1), P(a_2), \cdots, P(a_K)$. Consider further, encoding $U$ as $\hat{X}$ where $\hat{X}$ takes values in $\{b_1, b_2, \cdots, b_J\}$. For notational convenience, we define the prequantization noise as $Q = U - X$. The distortion of the overall system is then $$E[(X - \hat{X})^2] = E[(U - Q - \hat{X})^2]$$
$$= E[Q^2] + E[(U - \hat{X})^2] - 2E[Q(U - \hat{X})].$$

Clearly, $$E[Q(U - \hat{X})] = \sum_{k=1}^{K}\sum_{j=1}^{J} \int q(a_k - b_j) f(q|a_k, b_j) P(a_k, b_j) dq.$$

Since $f(q|a_k, b_j) = f(q|a_k)$, we have $$E[Q(U - \hat{X})] = \sum_{k=1}^{K} P(a_k) \sum_{j=1}^{J}(a_k - b_j) P(b_j|a_k) \int q f(q|a_k) dq$$

$$= \sum_{k=1}^{K} P(a_k)(a_k - E[\hat{X}|a_k]) E[Q|a_k]. \quad (1)$$

For the Lloyd-Max quantizer [19], [20], $E[Q|a_k] = 0$ and hence, $$E[(X - \hat{X})^2] = E[(X - U)^2] + E[(U - \hat{X})^2].$$

Using the Blahut algorithm for discrete sources [21], we can compute the distortion rate function $D_U(R)$ for the discrete source $U$ and reproduction alphabet $\{b_1, b_2, \cdots, b_J\}$. We define the alphabet constrained distortion rate function as $$D_C(R) = E[(X - U)^2] + D_U(R).$$

It is a simple matter to show that a source coder exists that achieves performance arbitrarily close to $D_C(R)$ while encoding $X$ using symbols in $\{b_1, b_2, \cdots, b_J\}$, because the rate distortion theory of discrete sources guarantees the existence of a coder to encode $U$ using symbols in $\{b_1, b_2, \cdots, b_J\}$ while achieving performance arbitrarily close to $D_U(R)$. So, the desired encoder for $X$ is constructed by simply cascading a Lloyd-Max quantizer with such a coder.

Figs. 1 and 2 show the alphabet constrained rate distortion functions for the i.i.d. uniform and Laplacian sources with 8 bit Lloyd-Max prequantization. The alphabet constrained rate distortion functions for the i.i.d. Gaussian source are similar. In each case, the output alphabet (of size $J$) is the set of output points for the $J$ level Lloyd-Max quantizer. Also shown in these figures are the corresponding Shannon lower bounds and Lloyd-Max quantizer performance at various points of interest.

The alphabet constrained rate distortion function can be computed in a similar manner for non-Lloyd-Max prequantizers. The quantity in (1) will no longer be zero, but can be computed using information available from the Blahut algorithm used to compute $D_U(R)$. For the

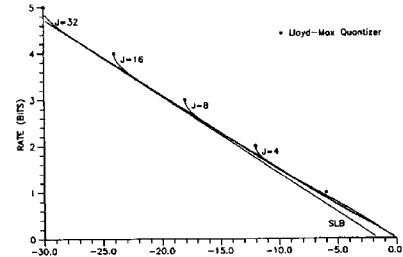

Fig. 1. Alphabet constrained rate distortion functions for the memoryless uniform source.

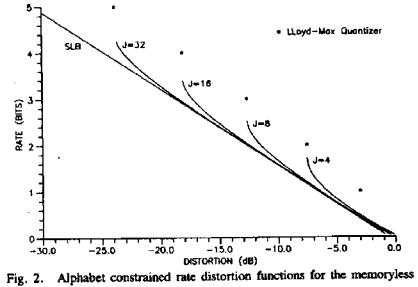

Fig. 2. Alphabet constrained rate distortion functions for the memoryless Laplacian source.

fixed output alphabet case examined here, our development is more general than that in [10] where the prequantization was taken to be uniform.

It should be noted that the alphabet constrained rate distortion function is not actually a rate distortion function in the strictest sense: we have shown that a coder exists with performance arbitrarily close to $D_C(R)$, but we have not established that no coder can have better performance. In fact, choosing a finer prequantizer (higher rate) generally decreases $D_C(R)$. However, with sufficiently high rate prequantization, $D_C(R)$ is very near the unconstrained rate distortion function for rates and reproduction alphabet sizes that will be of interest here. It should also be pointed out that this formulation is actually more indicative of practical digital communication systems where prequantization is inherent in the sampling process.

III. TRELLIS CODED QUANTIZATION OF MEMORYLESS SOURCES

Trellis coded quantization (TCQ) uses Ungerboeck's set partitioning ideas from trellis coded modulation [1], [17], [18] to achieve performance comparable (superior in most cases) to that of conventional trellis coding [8]–[12] with a fraction of the complexity of conventional trellis coding.

To transmit one of $2^m$ symbols per signaling interval using trellis coded modulation, the traditional $2^m$ point signal constellation is doubled (to $2^{m+1}$ points) and then partitioned into $2^{\tilde{m}+1}$ subsets where $\tilde{m}$ is an integer less than or equal to $m$. $\tilde{m}$ of the input bits are expanded by a rate $\tilde{m}/(\tilde{m} + 1)$ convolutional code and used to select which of the subsets the channel symbol for the current signaling interval will come from. The remaining $m - \tilde{m}$ bits are used to select one of the $2^{m-\tilde{m}}$ channel symbols in the selected subset. The channel is assumed to corrupt the transmitted signal with additive white Gaussian noise and Viterbi decoding [16] is used to find the sequence of symbols which minimizes the probability that the transmitted and received sequences are different. This coded modulation scheme performs better than conventional modulation techniques because the convolutional code and set partition are chosen in such a manner as to increase the Euclidean distance between allowable sequences of channel symbols over that in traditional modulation schemes.

Consider the decoder used for trellis coded amplitude modulation. The Viterbi algorithm is used to find the allowable sequence of channel symbols that is closest in Euclidean distance to the received sequence at the channel output. Note that the Euclidean distance between two sequences of length $n$, say $x$ and $\hat{x}$, is given by $$d_E(x,\hat{x}) = \sqrt{\sum_{i=1}^{n}(x_i - \hat{x}_i)^2}$$

and hence, given $x$, finding the sequence $\hat{x}$, that minimizes $d_E(x,\hat{x})$ is equivalent to finding the sequence that minimizes $(1/n)d_E^2(x,\hat{x}) = \rho_n(x,\hat{x})$, which is the familiar squared error distortion measure. Since any set of sequences $C = \{\hat{x}_1, \hat{x}_2, \cdots, \hat{x}_K\}$, each of length $n$, defines a source code, the set of all allowable channel sequences and the Viterbi decoder from the coded modulation formulation can be used as a source code and corresponding source coder. Specifically, given an input sequence $x$, the Viterbi algorithm finds the sequence in $C$ that minimizes $\rho_n(x,\hat{x})$.

IV. TCQ OF THE MEMORYLESS UNIFORM SOURCE

It can be argued that the source coder described above should perform well for the i.i.d. uniform source as follows. Consider encoding a sequence of independent realizations of a uniform random variable. Clearly, such realizations (thought of as vectors in $n$-dimensional space) lie in an $n$-dimensional hypercube and hence, the output sequences of a source coder should also lie in this hypercube. For a fixed encoding rate of $R$ bits per sample, there are $2^{Rn}$ output sequences. Since source vectors are no more likely to be in one region within the hypercube than any other (of equal volume), these output sequences should be placed uniformly throughout the hypercube. A moment of thought will show that a step toward achieving this goal is to maximize the distance between output sequences (with appropriate boundary constraints due to the hypercube "sides"). The convolutional codes and set partitions in coded modulation are chosen in an attempt to do just that.

From a theoretical standpoint, trellis coded quantization of the memoryless uniform source is justified by alphabet constrained rate distortion theory. Examination of Fig. 1 will show, that for a given encoding rate of $R$ bits per sample, it is possible to obtain nearly all of the gain theoretically possible over the $R$ bit per sample Lloyd-Max quantizer by using an encoder with an output alphabet consisting of the output points of the $R+1$ bit per sample Lloyd-Max quantizer. Those more familiar with coded modulation will recognize the fact that the alphabet constrained rate distortion curves for source coding at a rate of $R$ bits per sample using $2^{R+i}$ ($i > 0$ an integer) output symbols are a direct counterpart to Ungerboeck's channel capacity curves for transmitting data through a channel at a rate of $m$ bits per modulation interval using $2^{m+i}$ channel symbols [1].

Consider encoding the memoryless source distributed uniformly on the interval $[-A, A]$ (i.e., $f_X(x) = 1/2A$, $x \in [-A, A]$). The Lloyd-Max (minimum MSE) scalar quantizer is the uniform quantizer with output points $\pm(2i - 1)A/2^R$, $i = 1, 2, \cdots, 2^{R-1}$, and corresponding MSE $$D_{SQ}(R) = \sigma_X^2 2^{-2R} \quad (2)$$

where $\sigma_X^2 = A^2/3$ is the variance of $X$, and $R$ is the encoding rate in bits per sample. Comparing $D_{SQ}(R)$ to the known values of the distortion rate function [22] at encoding rates of 1, 2, and 3 bits per sample, there is only a potential for improvement over (2) of 0.77 dB, 1.17 dB, and 1.36 dB, respectively. Asymptotically (as $R$ gets large) there is a potential for 1.53 dB improvement. In the past, improvement over (2) has been obtained by using vector quantization (using either lattices [23], [24] or the clustering algorithm [25]), tree coding, and trellis coding. Since the uniform quantizer outputs are equally likely, entropy coding is of no benefit.

For encoding the memoryless uniform source at an encoding rate of $R$ bits per sample using TCQ with any of Ungerboeck's amplitude modulation trellises [1], [18], the output alphabet can be chosen as the set of output points of the rate-$(R + 1)$ Lloyd-Max quantizer. These output points are partitioned into four subsets by starting with the leftmost (most negative) point and proceeding to the right, labeling consecutive points $D_0, D_1, D_2, D_3, D_0, D_1, D_2, D_3, \cdots$ until the rightmost (most positive) point is reached. As an example, consider an encoding rate of 2 bits per sample. The output points and corresponding partition are shown in Fig. 3 along with Ungerboeck's four-state amplitude modulation trellis. Given a data sequence $x$, the Viterbi algorithm is used to find the allowable sequence of output symbols $\hat{x}$, that minimizes $\rho_n(x, \hat{x})$.

The sequence of output symbols chosen by the Viterbi algorithm can be represented by the bit sequence specifying the corresponding trellis path (sequence of subsets) in addition to the sequence of $R - 1$ bit codewords necessary to specify symbols from the chosen subsets. These bit sequences are transmitted through the channel (assumed error free for now) and used to reconstruct the output sequence as follows: the bit sequence that specifies the trellis path is used as the input to the convolutional coder; the output of the convolutional coder selects the proper subset; and the sequence of $R - 1$ bit code words is used to select the correct symbol from each subset.

Simulation results for encoding the memoryless uniform source using TCQ with Ungerboeck's amplitude modulation trellises and the Lloyd-Max quantizer output alphabets are listed in Table I, along with the corresponding Lloyd-Max quantizer performance and distortion rate function values for various rates of interest. Each simulation was carried out by encoding 100 sequences (each of length 1000) of independent realizations from a uniformly distributed pseudo-random number generator. The values listed in Table I reflect the sample average of the 100 computed distortions.

The sample variance was also computed for these 100 distortion samples and used to compute confidence intervals on the true average distortion for each coder. Since each distortion $(\rho_n(x,\hat{x}) = $

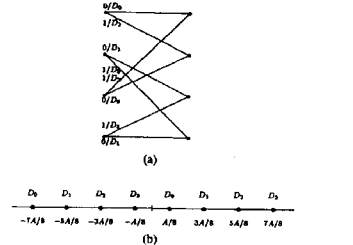

Fig. 3. (a) Ungerboeck's four-state amplitude modulation trellis. (b) Output points and partition for 2 bit per sample TCQ.

TABLE I
TRELLIS CODED QUANTIZATION PERFORMANCE FOR THE MEMORYLESS UNIFORM SOURCE USING RATE-$(R + 1)$ LLOYD–MAX OUTPUT POINTS. (VALUES ARE LISTED AS SNR IN dB)

| Rate (bits) | Trellis Size (States) | | | | | | | Lloyd-Max Quantizer | Distortion Rate Function |
|---|---|---|---|---|---|---|---|---|---|
| | 4 | 8 | 16 | 32 | 64 | 128 | 256 | | |
| 1 | 5.78 | 5.96 | 6.06 | 6.13 | 6.19 | 6.29 | 6.33 | 6.02 | 6.79 |
| 2 | 12.47 | 12.60 | 12.69 | 12.76 | 12.83 | 12.90 | 12.93 | 12.04 | 13.21 |
| 3 | 18.77 | 18.90 | 18.98 | 19.04 | 19.10 | 19.16 | 19.20 | 18.05 | 19.42 |
| 4 | 24.95 | 25.06 | 25.13 | 25.19 | 25.24 | 25.30 | 25.34 | 24.08 | N/A |
| 5 | 49.16 | 49.24 | 49.32 | 49.38 | 49.44 | 49.49 | 49.53 | 48.16 | 49.69 |
| 12 | 73.24 | 73.35 | 73.40 | 73.46 | 73.53 | 73.58 | 73.61 | 72.25 | 73.78 |

TABLE II
TRELLIS CODED QUANTIZATION PERFORMANCE FOR THE MEMORYLESS UNIFORM SOURCE USING DOUBLED AND OPTIMIZED OUTPUT ALPHABETS. (VALUES ARE LISTED AS SNR IN dB)

| Rate (bits) | Trellis Size (States) | | | | | | | Lloyd-Max Quantiser | Distortion Rate Function |
|---|---|---|---|---|---|---|---|---|---|
| | 4 | 8 | 16 | 32 | 64 | 128 | 256 | | |
| 1 | 6.22 | 6.33 | 6.39 | 6.44 | 6.48 | 6.55 | 6.58 | 6.02 | 6.79 |
| 2 | 12.62 | 12.73 | 12.80 | 12.85 | 12.91 | 12.97 | 13.00 | 12.04 | 13.21 |
| 3 | 18.83 | 18.94 | 19.01 | 19.08 | 19.13 | 19.18 | 19.23 | 18.06 | 19.42 |

$(1/n)\sum_{i=1}^{n}(x_i - \hat{x}_i)^2$ is a sample average itself, we can appeal to the central limit theorem and assume that the distribution of the computed distortions is approximately Gaussian. Under this assumption, confidence intervals can be computed for the true average distortion of each coder. For each coder listed in Table I, the 95 percent confidence interval is no worse than ±0.02 dB. That is, with probability 0.95, the true average distortion for each coder is within 0.02 dB of the value listed in Table I.

Although Table I shows significant gain over Lloyd-Max quantization, there is still potential for improvement. For a given trellis, TCQ performance deteriorates as the encoding rate decreases. For example, with the 256 state trellis, TCQ performance is within 0.17 dB of the distortion rate function at high rates but falls off to 0.46 dB away at an encoding rate of 1 bit per sample. One explanation for this problem is, that at low rates, a large percentage of the allowable output sequences lie near the sides of the previously discussed hypercube. This is because a large portion of the points in the output alphabet are exterior points: that is, they have only 1 neighbor. For example, in the case of 1 bit per sample TCQ, the output points at ±3A/4 have only 1 neighbor each. There are only four output points for this case and hence 50 percent of the output points are exterior.

In an attempt to improve TCQ performance, we have developed a training sequence based numerical optimization procedure for output alphabet design. Training sequence design techniques have been used extensively in the source coding literature with, perhaps, the clustering algorithm for vector quantizer design [25] being the most widely known of such algorithms. The principle behind training sequence design algorithms is to find a source coder that works well for a given set of data samples that is representative of the source to be encoded.

Given a TCQ system (trellis, output alphabet, and partition) and a set of fixed data sequences to encode (a training set), the average distortion incurred by encoding these sequences can be thought of as a function of the output alphabet. For an alphabet of size $J = 2^{R+1}$, the average distortion is a function of the $J$ symbols in the output alphabet and so maps $\Re^J$ to $\Re$ where $\Re^J$ and $\Re$ are the $J$-dimensional and one-dimensional Euclidean (or real) spaces, respectively. In this frame-work, optimization of the output alphabet can be carried out by any numerical algorithm which solves for a vector in $\Re^J$ that minimizes a scalar function of $J$ variables. Note that each time the numerical algorithm updates the output alphabet estimate, the training sequences must be reencoded to compute the resulting distortion. Hence, the design process is extremely computationally intense. For this reason, we constrained the output alphabets to be symmetric about the origin in all of our designs. This restriction cuts the number of free variables in half and greatly increases convergence speed. Since the uniform pdf is symmetric and Ungerboeck's trellises exhibit symmetry with respect to subset sequences, there is no obvious reason to suspect that this assumption will degrade performance.

Each coder was designed using a training set of 100 sequences of 1000 samples each. A quasi-Newton method subroutine was used for the optimization process. The output alphabets obtained in this manner are listed in [26] with selected cases also listed in the Appendix. For the curious reader, just to design the rate-3 coders (with the symmetry constraint) for trellis sizes $2^i$, $i = 1, 2, \cdots, 8$, required more than 25 h of CPU time on a Digital Equipment Corporation VAX 8800 super-mini-computer.

Simulation results for encoding the memoryless uniform source using TCQ with the optimized output alphabets appear in Table II. Again, 100 sequences of length 1000 (different than the ones used as training data) were processed by each coder and used to compute sample average distortion and sample distortion variance. The 95 percent confidence intervals were computed and found to be no worse than ±0.02 dB. Note that the SNR's in Tables I and II are comparable for an encoding rate of 3 bits per sample. Optimization at an encoding rate of 4 bits per sample produced no significant performance increase.

The performance of TCQ with the optimized output alphabets (for encoding rates of 3 bits per sample and less) and the Lloyd-Max alphabets (for higher rates) is very good. For the simple four-state trellis, the sample average distortion is within 0.59 dB of the distortion rate function at all rates tested. This performance is better than is theoretically possible for any VQ of dimension less than 15. This is easily verified by evaluating the asymptotic quantizer bound [38], [39], $$D_n(R) = \frac{e[\Gamma(1 + n/2)]^{2/n} D(R)}{(1 + n/2)}$$

for $n = 1, 2, \cdots, 15$ where $\Gamma(\cdot)$ is the familiar gamma function, $n$ is the VQ dimension, and $D(R)$ is the distortion rate function. For the 256 state trellis, the sample average distortion is within 0.21 dB of the distortion rate function at all rates tested. This performance is better than all results we have found in the literature. In particular, the performance is better than that promised by the best lattices discovered to date in up to 24 dimensions [27] and is superior to trellis coding results for stochastic codebooks obtained by Wilson [11]. Table III lists the asymptotic performance of vector quantizers based on the $D_4$, $E_8$, $\Lambda_{16}$, and $\Lambda_{24}$ lattices [27]. The values are listed as gains above Lloyd-Max quantization performance. It should be pointed out that these results are only valid for high rate coders and a certain amount of deterioration in performance is expected at low rates, due to the "edge effects" of truncating the lattice. Note that the results in Tables I and II are superior to the asymptotic lattice performance for rates as small as 3 bits per sample. In fact, evaluation of the asymptotic VQ bound indicates that no VQ of dimension less than 69 can exceed the MSE performance of 256 state TCQ.

TABLE III
MAXIMUM ACHIEVABLE PERFORMANCE INCREASE OVER LLOYD-MAX QUANTIZATION FOR THE MEMORYLESS UNIFORM SOURCE AT HIGH ENCODING RATES. (VALUES ARE LISTED AS SNR IN dB)

| Lattice | | | | Distortion Rate Function |
|---|---|---|---|---|
| $D_4$ | $E_8$ | $\Lambda_{16}$ | $\Lambda_{24}$ | |
| .37 | .65 | .86 | 1.03 | 1.53 |

TABLE IV
TRELLIS CODED QUANTIZATION PERFORMANCE FOR THE MEMORYLESS GAUSSIAN SOURCE USING RATE-$(R+1)$ LLOYD-MAX OUTPUT POINTS. (VALUES ARE LISTED AS SNR IN dB)

| Rate (bits) | Trellis Size (States) | | | | | | | Lloyd-Max Quantiser | Distortion Rate Function |
|---|---|---|---|---|---|---|---|---|---|
| | 4 | 8 | 16 | 32 | 64 | 128 | 256 | | |
| 1 | 4.64 | 4.78 | 4.86 | 4.93 | 4.99 | 5.06 | 5.08 | 4.40 | 6.02 |
| 2 | 10.19 | 10.31 | 10.37 | 10.44 | 10.50 | 10.55 | 10.59 | 9.30 | 12.04 |
| 3 | 15.86 | 15.96 | 16.02 | 16.10 | 16.17 | 16.21 | 16.25 | 14.62 | 18.06 |
| 4 | 21.66 | 21.78 | 21.84 | 21.92 | 21.96 | 22.02 | 22.05 | 20.22 | 24.06 |

V. TCQ OF THE MEMORYLESS GAUSSIAN AND LAPLACIAN SOURCES

Although we have no intuitively pleasing distance property arguments to justify using TCQ for memoryless Gaussian and Laplacian sources, alphabet constrained rate distortion theory indicates that a substantial performance increase over the Lloyd-Max quantizer is possible. For encoding the memoryless Gaussian and Laplacian sources at an encoding rate of $R$ bits per sample, we can again choose the respective rate-$(R+1)$ Lloyd-Max quantizer output points as the output alphabet for TCQ. The results of encoding simulations carried out in the same manner as in the uniform case using the appropriate pseudo-random number generators are listed in Tables IV and V. Here also, 95 percent confidence intervals were calculated and found to be no worse than ±0.03 dB and ±0.10 dB for the Gaussian and Laplacian results, respectively.

TABLE V
TRELLIS CODED QUANTIZATION PERFORMANCE FOR THE MEMORYLESS LAPLACIAN SOURCE USING RATE-$(R+1)$ LLOYD–MAX OUTPUT POINTS. (VALUES ARE LISTED AS SNR IN dB)

| Rate (bits) | Trellis Size (States) | | | | | | | Lloyd-Max Quantiser | Distortion Rate Function |
|---|---|---|---|---|---|---|---|---|---|
| | 4 | 8 | 16 | 32 | 64 | 128 | 256 | | |
| 1 | 3.66 | 3.75 | 3.83 | 3.91 | 3.96 | 4.00 | 4.04 | 3.01 | 6.62 |
| 2 | 8.82 | 8.93 | 9.01 | 9.08 | 9.14 | 9.18 | 9.23 | 7.54 | 12.66 |
| 3 | 14.35 | 14.47 | 14.55 | 14.62 | 14.68 | 14.74 | 14.77 | 12.64 | 18.68 |
| 4 | 20.11 | 20.23 | 20.31 | 20.38 | 20.43 | 20.49 | 20.53 | 18.13 | N/A |

TABLE VI
TRELLIS CODED QUANTIZATION PERFORMANCE FOR THE MEMORYLESS GAUSSIAN SOURCE USING DOUBLED AND OPTIMIZED OUTPUT ALPHABETS. (VALUES ARE LISTED AS SNR IN dB)

| Rate (bits) | Trellis Size (States) | | | | | | | Lloyd-Max Quantiser | Distortion Rate Function |
|---|---|---|---|---|---|---|---|---|---|
| | 4 | 8 | 16 | 32 | 64 | 128 | 256 | | |
| 1 | 5.00 | 5.19 | 5.27 | 5.34 | 5.43 | 5.52 | 5.56 | 4.40 | 6.02 |
| 2 | 10.56 | 10.70 | 10.78 | 10.85 | 10.94 | 10.99 | 11.04 | 9.30 | 12.04 |
| 3 | 16.19 | 16.33 | 16.40 | 16.47 | 16.56 | 16.61 | 16.64 | 14.62 | 18.06 |

TABLE VII
TRELLIS CODED QUANTIZATION PERFORMANCE FOR THE MEMORYLESS LAPLACIAN SOURCE USING DOUBLED AND OPTIMIZED OUTPUT ALPHABETS. (VALUES ARE LISTED AS SNR IN dB)

| Rate (bits) | Trellis Size (States) | | | | | | | Lloyd-Max Quantiser | Distortion Rate Function |
|---|---|---|---|---|---|---|---|---|---|
| | 4 | 8 | 16 | 32 | 64 | 128 | 256 | | |
| 1 | 4.54 | 4.47 | 4.56 | 4.63 | 4.72 | 4.78 | 4.83 | 3.01 | 6.62 |
| 2 | 9.41 | 9.56 | 9.64 | 9.70 | 9.79 | 9.85 | 9.90 | 7.54 | 12.66 |
| 3 | 14.87 | 15.00 | 15.03 | 15.13 | 15.22 | 15.27 | 15.37 | 12.64 | 18.68 |

TABLE VIII
PERFORMANCE OF VARIOUS SOURCE CODING SCHEMES FOR THE MEMORYLESS GAUSSIAN SOURCE. (VALUES ARE LISTED AS SNR IN dB)

| Rate | TCQ | | Ent. Cod. Quant. | Clust. Alg. VQ (Dim. 6) | Wilson | | Pearlman |
|---|---|---|---|---|---|---|---|
| | 4 Sta. | 256 Sta. | | | 32 Sta. | 128 Sta. | 512 Sta. |
| 1 | 5.00 | 5.56 | 4.64 | 4.79 | 4.76 | 5.47 | 5.50 |
| 2 | 10.56 | 11.04 | 10.55 | N/A | 10.32 | 10.87 | N/A |
| 3 | 16.19 | 16.64 | 16.56 | N/A | 15.58 | 16.78 | N/A |

The optimization procedure discussed in the previous section was also implemented for the Gaussian and Laplacian TCQ systems. The resulting output alphabets are tabulated in [26] with selected cases listed in the Appendix. The results of encoding simulations using these alphabets are listed in Tables VI and VII. The 95 percent confidence intervals are no worse than ±0.05 dB and ±0.15 dB for the Gaussian and Laplacian results, respectively.

The performance of the optimized output alphabet coders for the Gaussian source is comparable and in most cases superior to all results we have seen in the literature. Performance results for several source coding schemes for the memoryless Gaussian source are listed in Table VIII. The systems included are: TCQ; entropy coded quantization [28]; clustering algorithm based vector quantization [29]; and stochastically populated trellis coders designed by Wilson [11] and Pearlman [9].

The only source coder which outperforms the 256 state TCQ system is Wilson's 128-state trellis coder for an encoding rate of 3 bits per sample. This trellis coder was populated stochastically from a continuous output alphabet. As we shall see, this leads to a complexity that is significantly higher than that of TCQ. It should also be pointed out that TCQ performs quite well for modest trellis sizes. For example, the four-state TCQ systems outperform Wilson's 32-state systems. In fact, four-state TCQ outperforms entropy coded quantization at encoding rates of 1 and 2 bits per sample.

The performance of the Laplacian coders is rather disappointing. Although substantial improvement has been made over the Lloyd-Max quantizer, the average distortion is still far from the distortion rate function. For both the Gaussian and Laplacian sources, the performance diverges away from the distortion rate function as the rate grows. Since the analogy between TCQ and coded modulation weakens for nonuniform sources, this result is not especially surprising.

This deterioration of performance at high rates was the motivation to examine trellises other than those in [1], [18]. Ungerboeck's amplitude modulation trellises were obtained by searching over all convolutional codes with encoding circuits of the form shown in Fig. 4, where $h^0 = (h_r^0, h_{r-1}^0, \cdots, h_0^0)$ and $h^1 = (h_r^1, h_{r-1}^1, \cdots, h_0^1)$ are the parity check coefficients and $2^r$ is the number of trellis states. Encoders of this form are called *systematic* because one of the output bits is identical to the input bit. The parity check coefficients of the codes with the best distance properties for coded modulation are tabulated in [1], [18] (the table in [1] contains some errors).

After performing simulations for all coders of the type in Fig. 4 with up to 64 states, we concluded that little could be gained over Ungerboeck's trellises. In several cases, there were trellises that performed better than Ungerboeck's, but the improvement was insignificant.

VI. QUADRUPLED OUTPUT ALPHABETS FOR THE LAPLACIAN SOURCE

Careful examination of Fig. 2 will show that for the Laplacian source, doubling the signal constellation is not sufficient to achieve performance close to the rate distortion function. For example, at a rate of 2 bits per sample, the alphabet constrained rate distortion function with $2^3 = 8$ output values is roughly 1 dB away from the rate distortion function. It is clear that quadrupling the size of the output alphabet brings the alphabet constrained rate distortion function very near the rate distortion function. For this reason, an attempt was made to design codes with a four-fold output alphabet expansion.

Following Ungerboeck's formulation with the number of output points quadrupled gives rise to an eight-way partition and a rate-1/3 convolutional code. Unfortunately, labeling the output points of the rate-$R+2$ Lloyd–Max quantizer $D_0, D_1, \cdots, D_7, \hat{D}_0, \hat{D}_1, \cdots$ from left to right and searching over a large class of convolutional codes led to no substantial performance increase over the doubled alphabet systems. It is our feeling that this problem arises from the fact that all output symbols receive equal emphasis in the resulting coders. Clearly, for nonuniform sources, this is undesirable. The set partitioning and trellis branch labeling need to be modified so that less probable output values are assigned to fewer trellis branches than more probable output values. This approach is akin to that used in stochastically populated trellis coders and entropy coding. For the Laplacian source, the outermost symbols (furthest from the origin) should be used less frequently than the innermost symbols (closest to the origin).

Consider encoding the Laplacian source at a rate of 2 bits per sample using the output points of the rate-4 Lloyd–Max quantizer. In order to implement the ideas discussed above, we partition the output alphabet into 8 subsets and divide these subsets into two classes. $D_0$-$D_3$ are assigned to the "more probable" class and $D_4$-$D_7$ are assigned to the "less probable" class. This grouping leads to a labeling such as that shown in Fig. 5. Similar alphabets and partitions can be constructed for encoding rates of 1 bit per sample and 3 bits per sample.

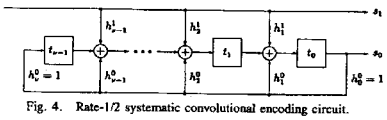

Fig. 4. Rate-1/2 systematic convolutional encoding circuit.

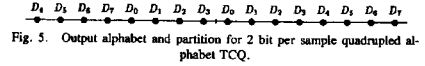

Fig. 5. Output alphabet and partition for 2 bit per sample quadrupled alphabet TCQ.

It is easily shown that for the alphabet and partition of Fig. 5, realizations of the Laplacian source are closer to a point in the more probable class than to any point in the less probable class about 85 percent of the time. Using subsets from the more probable class seven times more frequently than subsets from the less likely class corresponds to using the more likely class 87.5 percent of the time. A ratio of 6 to 1 matches the 85 percent probability more closely but the 7 to 1 ratio implies that 7 out of every 8 branch labels would come from the more likely class while 1 out of every 8 branch labels would come from the less likely class. Since the number of branches labeled $D_i (i = 0, 1, 2, 3)$ in all of Ungerboeck's amplitude modulation trellises with 16 or more states is a multiple of 8, it is possible that good codes might result by replacing 1 out of every 8 subsets labeled $D_i (i = 0, 1, 2, 3)$ by a subset labeled $D_j (j = 4, 5, 6, 7)$.

After careful scrutiny of Ungerboeck's trellises and many simulation studies, a number of interesting properties of TCQ become apparent. After using the Viterbi algorithm to encode a lengthy source sequence, the distortions associated with all the survivor paths are very nearly equal. Under the assumption that the distortions of all survivors are exactly equal at each stage of the encoding process, we will show that the step in the Viterbi algorithm, in which all paths passing through the same node but the survivor are eliminated, is equivalent to a scalar quantization process. This assumption is not exactly valid, but is approximately true after the algorithm has progressed far into the trellis. We make this assumption here because it leads to valuable insight into how trellises should be labeled for use with a quadrupled output alphabet.

In the Viterbi algorithm, $\rho(x, D_{ij})$ [where $D_{ij}$ is the $j$th element of subset $D_i$] is calculated for each branch and then added to the distortion of the survivor path from which it emanates. All but one of the paths that go to a common next state are eliminated with the one having the lowest overall distortion being the one retained. Under the assumption that all previous survivor distortions are equal, the path retained is simply the one with the smallest branch distortion $\rho(x, D_{ij})$. This is simply a scalar quantization with the branch letters of all the branches entering a common node used as output points.

Examination of all the TCQ systems discussed previously will show that there are only two of these "quantizers" in each system. One consists of the output points of $D_0$ together with those of $D_2$ and the other consists of the output points of $D_1$ and $D_3$. Thus, each "quantizer" consists of every other point from the overall output alphabet and hence, each is still reasonable as a scalar quantizer. From the partition in Fig. 5, "reasonable quantizers" might consist of $Q_0$) the points from $D_0$ and $D_2$; $Q_1$) the points from $D_1$ and $D_3$; $Q_2$) the points from $D_0$ and $D_4$; $Q_3$) the points from $D_1$ and $D_5$; $Q_4$) the points from $D_2$ and $D_6$; and $Q_5$) the points from $D_3$ and $D_7$.

TCQ trellises for use with quadrupled output alphabets were designed by replacing 1 out of every 8 of the subsets labeled $D_0$-$D_3$ by one labeled $D_4$-$D_7$ in such a manner as to only have "quantizers" of the type $Q_0$-$Q_5$. Many such labelings are possible but the ones which achieve the best performance seem to be those that exhibit a high degree of symmetry among the resulting subset sequences (a property also present in the doubled alphabet TCQ systems).

The characteristics of the trellises designed in this manner are tabulated in [26]. It should be noted that although these trellises do not necessarily correspond to a convolutional code, they can still be specified by a finite state machine. In fact, the only difference between the machines to implement these new trellises and the machines to implement Ungerboeck's trellises is the output function: for a given binary input sequence, the state transitions are identical.

The results of simulation studies carried out using 100 sequences of length 1000 each appear in Table IX. In this case, the 95 percent confidence intervals are no worse than ±0.10 dB. Note that an increase in performance over the doubled output alphabet coders has been obtained in every case. In fact, the performance of the quadrupled alphabet TCQ systems using Lloyd–Max quantizer values exceeds that of the doubled output alphabet coders (even using optimized alphabets) by at least 0.4 dB in every case with some coders showing improvements of nearly 1 dB.

TABLE IX
TRELLIS CODED QUANTIZATION PERFORMANCE FOR THE MEMORYLESS LAPLACIAN SOURCE USING RATE-$(R + 1)$ LLOYD–MAX OUTPUT POINTS. (VALUES ARE LISTED AS SNR IN dB)

| Rate (bits) | Trellis Size (States) | | | | | Lloyd-Max Quantizer | Distortion Rate Function |
|---|---|---|---|---|---|---|---|
| | 16 | 32 | 64 | 128 | 256 | | |
| 1 | 4.90 | 5.13 | 5.29 | 5.44 | 5.47 | 3.01 | 6.62 |
| 2 | 10.08 | 10.35 | 10.66 | 10.77 | 10.86 | 7.54 | 12.66 |
| 3 | 15.36 | 15.65 | 16.15 | 16.16 | 16.33 | 13.64 | 18.66 |

TABLE X
TRELLIS CODED QUANTIZATION PERFORMANCE FOR THE MEMORYLESS LAPLACIAN SOURCE USING QUADRUPLED AND OPTIMIZED OUTPUT ALPHABETS. (VALUES ARE LISTED AS SNR IN dB)

| Rate (bits) | Trellis Size (States) | | | | | Lloyd-Max Quantizer | Distortion Rate Function |
|---|---|---|---|---|---|---|---|
| | 16 | 32 | 64 | 128 | 256 | | |
| 1 | 4.92 | 5.13 | 5.35 | 5.49 | 5.54 | 3.01 | 6.62 |
| 2 | 10.47 | 10.73 | 10.98 | 11.16 | 11.22 | 7.54 | 12.66 |
| 3 | 16.20 | 16.43 | 16.79 | 16.84 | 16.96 | 12.64 | 18.68 |

TABLE XI
PERFORMANCE OF VARIOUS SOURCE CODING SCHEMES FOR THE MEMORYLESS LAPLACIAN SOURCE. (VALUES ARE LISTED AS SNR IN dB)

| Rate | TCQ | | Ent. Cod. Quant. | Clust. Alg. VQ (Dim. 6) | Wilson* | | Pearlman 512 Sts. |
|---|---|---|---|---|---|---|---|
| | 16 Sts. | 256 Sts. | | | 64 Sts. | 128 Sts. | |
| 1 | 4.92 | 5.54 | 5.76 | 4.98 | 5.21 | N/A | 5.15 |
| 2 | 10.47 | 11.22 | 11.31 | N/A | N/A | 11.45 | N/A |
| 3 | 16.20 | 16.96 | 17.20 | N/A | 15.47 | 16.84 | N/A |

* within accuracy of graph in [11]

Of course, the optimization procedure can be used here to obtain performance even better than that of the quadrupled alphabet Lloyd–Max TCQ systems. The resulting output alphabets are listed in [26]. The results of encoding simulations using these optimized output alphabets are presented in Table X. The corresponding 95 percent confidence intervals are no worse than ±0.09 dB.

The performance of the quadrupled and optimized output alphabet coders for the Laplacian source is comparable and in most cases superior to other results we have seen in the literature. Performance results for several source coding schemes for the memoryless Laplacian source are listed in Table XI. The systems included are: quadrupled alphabet TCQ; entropy coded quantization [28]; clustering algorithm based vector quantization [29]; and stochastically populated trellis coders designed by Wilson [11] and Pearlman [9].

For each rate examined, the performance of entropy coded quantization exceeds the 256 state TCQ performance by roughly 0.2 dB. It should be pointed out, however, that entropy coded quantization is particularly prone to error propagation and also to buffer overflow in practical implementations [30]. As will be shown in subsequent sections, these factors are not a significant problem for TCQ. Wilson's 128-state trellis coder is slightly superior in performance to the 256-state TCQ system at an encoding rate of 2 bits per sample, but again, the complexity is substantially higher for Wilson's scheme. As in the Gaussian case, TCQ performance is quite good even for modest size trellises.

VII. COMPUTATIONAL BURDEN

In this section, we derive expressions for the computational requirements of TCQ systems. As we shall see, the computational burden of TCQ is far less than that of most source coders with comparable performance.

Recall that for each coder discussed, every subset contains $2^{R-1}$ elements. Clearly, the $2^{R-1}$ parallel branches associated with each subset come from a common node, and hence, have the same "survivor distortion." Therefore, the best path within a given subset can be determined by a rate-$(R - 1)$ scalar quantization operation. After this quantization operation has been performed for each subset, only two branches entering each node remain in contention and hence, each "new survivor" can be computed by adding the distortions from the scalar quantizations to the associated "old survivors" and choosing the path associated with the smaller of these two sums.

For each of the doubled output alphabet and quadrupled output alphabet coders there are 4 and 8 subsets, respectively. In either case, the scalar quantization need only be performed once per subset per sample (not each time the subset appears in the trellis). Hence, for the doubled alphabet coders, the computations required per data sample are 4 rate-$(R - 1)$ quantizations with associated distortion calculations, $2N$ adds and $N$ two-way compares where $N$ is the number of trellis states or nodes. In the quadrupled case, the 4 rate-$(R - 1)$ quantizations and associated distortion calculations are replaced by 8 of the same. Each distortion calculation, $(x - D_{ij})^2$ can be computed with 1 add (subtract) and 1 multiply. Hence, the computational burden of TCQ is 4 rate-$(R - 1)$ scalar quantizations, 4 multiplies, $2N + 4$ adds, and $N$ two-way compares in the doubled alphabet case and 8 rate-$(R - 1)$ scalar quantizations, 8 multiplies, $2N + 8$ adds, and $N$ two-way compares in the quadrupled alphabet case.

The exponential growth in computations with $R$ present in previous trellis coders is not a problem with TCQ. In fact, TCQ complexity is roughly independent of $R$. In recent times (and sometimes still), the number of multiplies per data sample was used as the sole measure of complexity. Under this criterion, TCQ requires only four multiplies per data sample for the memoryless uniform and Gaussian sources, and eight multiplies per data sample for the memoryless Laplacian source. Significantly, the number of multiplies in TCQ is independent of encoding rate *and* trellis size.

The computational burden of various source coding schemes is listed in Table XII. The systems included are: TCQ (doubled alphabet and quadrupled alphabet); clustering algorithm based vector quantization [25] with full search encoding, and (generally suboptimum) binary tree search encoding; and the stochastically populated trellis coders designed by Wilson [11] and Pearlman [9]. Each value in Table XII is listed as the number of operations per data sample with subtractions being counted as additions. The number of compares in each case represents the number of two-way compares required: it is easily shown that one $I$-way compare can be implemented with $I - 1$ two-way compares and that a rate-$R$ scalar quantization can be implemented with $R$ two-way compares. As before, $N$ is the number of trellis states, $R$ is the encoding rate in bits per sample, and $J$ is the alphabet size for Pearlman's trellis coders. Note that $J$ must be greater than $2^R$ for performance exceeding that of the Lloyd-Max quantizer.

The complexity of TCQ is clearly far less than that of any other scheme listed in Table XII except for tree searched VQ (at low rates and dimensions). Recalling the performance results from previous sections we see that TCQ yields performance comparable (or superior) to previous source coders with a fraction of the complexity required by previous schemes. It should be pointed out that the computational requirements of entropy coded quantization are quite modest; however, error propagation and buffer overflow problems [30] are of great concern in many practical applications. It should also be noted that the complexity of the TCQ source coder/decoder pair is concentrated at the coder. The decoder can be implemented with a shift register and lookup table. This property is desirable in certain data storage systems such as the compact disk where source coding can be done "off-line" but play-back must be done in "real-time."

VIII. Noninteger Encoding Rates

TCQ can be extended to non-integer encoding rates in a straightforward manner. In principle, any non-negative rational number can be used as an encoding rate for TCQ. Rational rates are achieved by encoding multiple samples per trellis branch.

Consider a source code with block length $n_b$ and size $K = 2^{n_s+1}$. Consider also, partitioning the $K$ sequences (codewords) from this source code into four subsets each containing $2^{n_s-1}$ sequences of length $n_b$ and assigning the subsets to trellis branches as before. In the encoding process, the scalar quantizations associated with each subset become vector quantizations and $n_b$ data samples are encoded per state transition. Since 1 bit per state transition is required to specify the sequence of subsets and $n_s - 1$ bits are required to specify a sequence from each subset, the encoding rate is $n_s/n_b$ bits per sample.

For example, an encoding rate of 1/2 bit per sample can be achieved by choosing a source code with $K = 4$ ($n_s = 1$) output sequences each of length $n_b = 2$. One choice of output sequences and corresponding partition is shown in Fig. 6. In this case, each subset contains only 1 sequence and hence, the corresponding vector quantization is trivial: whenever a particular subset is chosen, its only element is selected as the output sequence. In general, there will be $2^{n_s-1}$ sequences in each subset and the "vector quantizer" will find the one closest (in Euclidean distance) to the input sequence segment (of length $n_b$) currently being encoded.

Simulation studies were carried out with an encoding rate of 1/2 bit per sample for the memoryless uniform, Gaussian, and Laplacian sources. In each case, the output sequences of the vector quantizer were $\{(-g, -g), (-g, g), (g, -g), (g, g)\}$ where $\pm g$ are the output points of the corresponding rate-1 Lloyd-Max scalar quantizer. The results of these simulations are given in Table XIII. The 95 percent confidence intervals are no worse than $\pm 0.02$, $\pm 0.025$, and $\pm 0.04$ dB for the uniform, Gaussian, and Laplacian cases, respectively.

In Fig. 6, each output sequence is the same distance from each axis (i.e., $g$ from above). Each of the TCQ systems can be optimized with

TABLE XII
COMPUTATIONAL REQUIREMENTS OF VARIOUS SOURCE CODING SCHEMES FOR MEMORYLESS SOURCES

| Coder Type | Multiplies | Adds | Compares |
|---|---|---|---|
| TCQ (doubled alphabet) | 4 | $2N + 4$ | $N + 4(R - 1)$ |
| TCQ (quadrupled alphabet) | 8 | $2N + 8$ | $N + 8(R - 1)$ |
| Clust. Alg. VQ (Dim. n) Full Search | $2^{Rn}$ | $2^{Rn}$ | $(2^{Rn} - 1)/n$ |
| Binary Tree Search | $2Rn$ | $2Rn$ | $R$ |
| Wilson | $N2^R$ | $N2^{R+1}$ | $N(2^R - 1)$ |
| Pearlman | $J$ | $N2^R + J$ | $N(2^R - 1)$ |

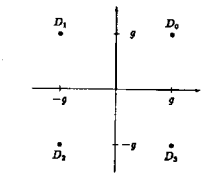

Fig. 6. Output sequences for rate-1/2 TCQ.

TABLE XIII
RATE-1/2 TCQ PERFORMANCE FOR THE MEMORYLESS UNIFORM, GAUSSIAN, AND LAPLACIAN SOURCES USING RATE-1 LLOYD–MAX OUTPUT POINTS IN 2-D SEQUENCES. (VALUES ARE LISTED AS SNR IN dB)

| Source | Trellis Size (States) | | | | | | |
|---|---|---|---|---|---|---|---|
| | 4 | 8 | 16 | 32 | 64 | 128 | 256 |
| Uniform | 2.60 | 2.74 | 2.80 | 2.88 | 2.95 | 3.02 | 3.07 |
| Gaussian | 2.35 | 2.44 | 2.49 | 2.54 | 2.60 | 2.66 | 2.68 |
| Laplacian | 1.95 | 2.01 | 2.04 | 2.08 | 2.11 | 2.14 | 2.16 |

TABLE XIV
RATE-1/2 TCQ PERFORMANCE FOR THE MEMORYLESS UNIFORM, GAUSSIAN, AND LAPLACIAN SOURCES USING OPTIMIZED 2-D SEQUENCES. (VALUES ARE LISTED AS SNR IN dB)

| Source | Trellis Size (States) | | | | | | |
|---|---|---|---|---|---|---|---|
| | 4 | 8 | 16 | 32 | 64 | 128 | 256 |
| Uniform | 2.84 | 2.96 | 3.01 | 3.09 | 3.14 | 3.21 | 3.24 |
| Gaussian | 2.49 | 2.57 | 2.61 | 2.66 | 2.71 | 2.75 | 2.78 |
| Laplacian | 2.01 | 2.07 | 2.09 | 2.12 | 2.15 | 2.18 | 2.20 |

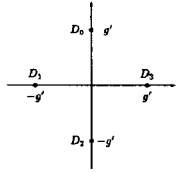

Fig. 7. Rotated output sequences for rate-1/2 TCQ.

respect to $g$ in a manner similar to that of previous sections. The resulting values of $g$ are listed in [26] and the corresponding simulation results appear in Table XIV. The 95 percent confidence intervals corresponding to the uniform, Gaussian, and Laplacian sources are no worse than $\pm 0.02$, $\pm 0.03$, and $\pm 0.045$ dB, respectively.

The set of output sequences shown in Fig. 6 are reasonable for the uniform source where the two-dimensional pdf is constant over a square and also for the Gaussian source where the pdf is spherically symmetric. In the Laplacian case however, the contours on which the two-dimensional pdf is constant are diamonds (in higher dimensions, pyramids). This is the motivation for choosing the output sequences and partition shown in Fig. 7. We call the sequences in Fig. 7 the *rotated* two-dimensional sequences to distinguish them from those in Fig. 6. Note that the sequences in Fig. 7 can be obtained (within a scale factor) by rotating Fig. 6 by $45°$.

In Fig. 7, the output sequences are $\{(0, g'), (0, -g'), (g', 0), (-g', 0)\}$ and hence, optimization over $g'$ can be carried out as before. The resulting values of $g'$ are given in [26] and the corresponding simulation results appear in Table XV. The 95 percent confidence intervals are no worse than $\pm 0.045$ dB.

The performance of TCQ at rate-1/2 is quite good. In particular, the performance of the Gaussian source surpasses that of all results we have found in the literature ([31], [32], for example) with a fraction of the complexity of previous coders. For an encoding rate of 1/2 bit per sample, TCQ can easily be shown to require only two multiplies, $N+4$ adds and $(N/2)$ two-way compares per data sample, where again, $N$ is the number of trellis states. Table XVI lists the performance and encoding complexity for Schroeder and Sloane's permutation code [31] and the Golay code based scheme proposed by Adoul and Lamblin [32]. The eight-state TCQ system achieves performance comparable to both of these schemes while requiring only two multiplies, 12 adds, and four compares per data sample. Considering the fact that commercially available digital signal processing chips are capable of performing multiplies as fast as adds and compares, the complexity of TCQ is far less than that of these other two schemes.

IX. ERROR PROPAGATION

In this section, we lift the assumption of error free channels and examine the effects of transmission errors on TCQ performance. We show that the trellises associated with Ungerboeck's coding circuits are particularly susceptible to error propagation when used for TCQ systems. This is not particularly a problem, however, because in each case, coding circuits exist with equivalent MSE performance while guaranteeing good error propagation properties.

Recall that each trellis used in our doubled alphabet TCQ systems arises from a convolutional coder (finite state machine) of the form shown in Fig. 4. Recall also that the sequence of bits transmitted through the channel can be divided into two sequences, one that is used as the input to the state machine, and one that is used to select symbols (or vectors in the noninteger rate case) from the subset selected by the output of the state machine. Note that the bits used to select symbols from the subsets have no effect on the state of the machine and hence, no effect on future outputs from the source decoder. However, the bits used as the input to the state machine directly determine the next state and hence, the next subset. Clearly, a transmission error in these bits can affect multiple outputs from TABLE XV
RATE-1/2 TCQ PERFORMANCE FOR THE MEMORYLESS LAPLACIAN SOURCE USING THE ROTATED AND OPTIMIZED 2-D SEQUENCES.
(VALUES ARE LISTED AS SNR IN dB)

| Trellis Size (States) | | | | | | |
|---|---|---|---|---|---|---|
| 4 | 8 | 16 | 32 | 64 | 128 | 256 |
| 2.16 | 2.26 | 2.29 | 2.33 | 2.38 | 2.42 | 2.44 |

TABLE XVI
PERFORMANCE OF VARIOUS SOURCE CODING SCHEMES FOR THE MEMORYLESS GAUSSIAN SOURCE FOR AN ENCODING RATE OF 1/2 BIT PER SAMPLE. (VALUES ARE LISTED AS SNR IN dB)

| Coder Type | SNR | Adds | Compares |
|---|---|---|---|
| Permutation | 2.57 | 320 | 128 |
| Golay | 2.53 | 66 | 85 | the source decoder. Examination of Fig. 4 will show that a channel error of this type has the potential to cause all subsequent source decoder outputs to be in error. This problem is due to feedback in the encoding circuit: any erroneous values in the binary storage elements are used (along with the input bits) to compute subsequent values of the storage elements. Clearly, errors can propagate in this manner indefinitely.

Fortunately, there is a solution to this problem. For every convolutional code used here, there exists a feedback free encoding circuit for which any given input bit can affect no more than $1 + \log_2 N$ outputs where $N$ is the number of trellis states [33]. It should be noted that the definition of a convolutional code is similar to that of a source code in that only output sequences are specified. The input/output relationship of any given encoding circuit is not unique, but the set of allowable output sequences is. Hence, any encoding circuit will do for our purposes, because the set of output sequences of the encoding circuit specifies the source code. The only difference between TCQ systems using encoding circuits with feedback and those using encoding circuits without feedback is that the bit sequence used to specify a particular sequence of subsets is different for the two cases. This difference is enough, however, to guarantee that the corresponding TCQ system will handle channel errors in a graceful manner. For example, a channel error can affect no more than three source decoder outputs for a four-state trellis and no more than nine-source decoder outputs for a 256-state trellis. In this respect, TCQ is preferable to systems such as entropy coding and large dimensional vector quantization where a single channel error can destroy an entire block of data. Note also, that if it is desired that only 1 source decoder output be affected by any single channel error, only 1 out of every $R$ bits must be protected.

For integer encoding rates of 2 bits per sample or greater, even these "short" subset sequence errors are less serious than might be expected. For example, consider the rate-2, doubled output alphabet case. The output alphabet and corresponding partition are shown in Fig. 8. Each subset contains a positive element and a negative element. If the bit labeling used for selecting elements from a given subset corresponds to the sign of the element (for example, 0 for a negative element and 1 for a positive element), then the sign of the element chosen by the decoder will be correct even if the subset is incorrect. Clearly, the magnitude of any such error is bounded by $(D_3^+ - D_0^+)$ where $D_0^+$ and $D_3^+$ are the positive elements of $D_0$ and $D_3$, respectively. For higher rates, the bit assignment can be chosen so that the problem of incorrect subset selection is even less serious.

It is a simple matter to show that similar results hold for rational rate TCQ and quadrupled alphabet TCQ. In the former case, we use the same trellises as in the doubled alphabet case and in the latter, the trellises arise from a simple modification of the output function of the convolutional encoding circuit in the doubled alphabet case.

X. PREDICTIVE TCQ OF SOURCES WITH MEMORY

A. The Predictive TCQ Structure

Consider the differential pulse code modulation (DPCM) structure. Each time a data sample is to be encoded, a prediction of that

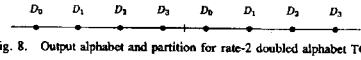

Fig. 8. Output alphabet and partition for rate-2 doubled alphabet TCQ.

data sample is formed using quantized versions of previous data samples. The difference between the data sample and the prediction (the prediction error or residual) is quantized, represented as bits, and transmitted through the channel. The quantized value of the current data sample is formed (by both the source coder and source decoder) by adding the quantized prediction residual to the prediction.

Recall from previous discussions on the TCQ of memoryless sources, that paths through the trellis specify sequences of output symbols. Hence, at each stage in the encoding, each survivor path specifies a sequence of output symbols. These output symbols are approximations of the corresponding data samples.

Consider now, a predictive TCQ system with each survivor path specifying a sequence of numbers which serve as approximations to previous data samples. Clearly, a prediction can be formed for each trellis node using the output symbols specified by the survivor path associated with that particular node. The prediction residual is formed at each node as the difference between the current data sample and the prediction associated with that node. For each branch emanating from a given node, a scalar quantization is performed to find the element of the corresponding subset which is closest to the prediction residual associated with that node. The distortions incurred by performing these scalar quantizations for each branch are added to the "old" survivor distortions and a two-way compare is carried out at each "next" node to determine the "new" survivors. Finally, the encoded value of the data sample is computed for each new survivor path as the sum of the predicted value from the appropriate old survivor and the corresponding quantized prediction residual.

Given a data sequence to be encoded, say $x = \{x_1, x_2, \cdots, x_n\}$, the $i$th step in this encoding process can be described more precisely as follows. Let the survivor path ending at node $k$ (at time $i - 1$) be called survivor-$k$ and let $\hat{x}_{i-j}^k, k = 1, 2, \cdots, N$, be the approximation (encoded value) of $x_{i-j}, j = 1, 2, 3, \cdots$, associated with survivor-$k$ where $N$ is the number of trellis states. Let $\hat{x}_{i|i-1}^k$ denote the predicted value of the current data sample $x_i$ given $\hat{x}_{i-j}^k, j = 1, 2, 3, \cdots$, and let $d_i^k = (x_i - \hat{x}_{i|i-1}^k)$ be the prediction residual associated with survivor-$k$. Finally, let $\rho_{i-1}(x, \hat{x}^k)$ be the distortion associated with survivor-$k$. As before, there are two branches labeled with subset names entering and leaving each node. We denote the subset associated with the branch leaving node $k$ and entering node $l$ as $D_l^k$. For each such subset, a scalar quantization operation is performed to determine the subset element that is closest to $d_i^k$. This element is denoted by $\bar{D}_l^k$. As in the memoryless case, all the elements of each subset (parallel branches) are discarded except the one selected by the scalar quantization operation. After this procedure, there are two branches entering each next node. Clearly, when the next node is node $l$, these branches are labeled $\bar{D}_l^{k_1}$ and $\bar{D}_l^{k_2}$ where $k_1$ and $k_2$ are the nodes from which these two branches emanate. Finally, $$\rho_i(x, \hat{x}^l) = \min_{k \in \{k_1, k_2\}} (\rho_{i-1}(x, \hat{x}^k) + (d_i^k - \bar{D}_l^k)^2) \quad (3)$$

and $$\hat{x}_i^l = \hat{x}_{i|i-1}^{k'} + \bar{D}_l^{k'}$$

where $k'$ is the value of $k$ that achieves the minimum in (3). This recursion is carried out until the end of the data sequence is reached (i.e., $i = n$).

As in the memoryless case, 1 bit per data sample is required to specify the sequence of chosen subsets and $R - 1$ bits per sample are used to specify which element from the chosen subset is closest to the corresponding prediction residual. The source decoder uses these bit sequences to produce the sequence of quantized prediction residuals corresponding to survivor-$k'$ where survivor-$k'$ is the survivor with the smallest distortion when the end of the data sequence is reached.

This sequence of quantized prediction residuals is passed through the standard DPCM decoder to obtain the encoded sequence $\hat{x}_i^{k'}, i = 1, 2, \cdots, n$.

This system is quite similar to that in [13] for an encoding rate of 1 bit per sample, but is unique for higher encoding rates. It should be pointed out that this algorithm is not optimal. The suboptimality arises because of the prediction. Future values of prediction residual depend heavily on the quantized values of $x_i$ used to compute predictions. In the step corresponding to (3), an entire path history is eliminated. It is conceivable that if not discarded, this path could have attained lower overall distortion than the one retained. However, if these paths are not discarded, the resulting structure is a tree rather than a trellis and no optimal algorithm exists other than exhaustive search. For this reason, we chose to use the stated procedure.

B. Predictive TCQ of Gauss-Markov Sources

In this section, the performance and complexity of predictive TCQ (PTCQ) systems for encoding Gauss-Markov sources are evaluated. Gauss-Markov sources are defined by $$x_i = \sum_{j=1}^{L} a_j x_{i-j} + w_i$$

where $\{a_j : j = 1, 2, \cdots, L\}$ is a set of real coefficients and $w_i$ is an element of an i.i.d. sequence of realizations of a zero-mean, Gaussian random variable. The coefficients of the Gauss-Markov sources to be studied are listed in Table XVII along with their distortion rate functions for encoding rates of 1, 2, and 3 bits per sample. We have chosen these sources because they are often used as models for sampled speech. The coefficients of the sources referred to as AR(1), AR(2), and AR$_1$(3) in Table XVII were calculated from the long term sample autocorrelation function values of sampled speech presented in [34]. These coefficients are often referred to as McDonald's coefficients. The source labeled AR$_2$(3) has been used in place of AR$_1$(3) in several publications (see [13], [35], for example). The third coefficient $a_3$ of the AR$_2$(3) source is in error. This minor transposition of digits seems to have originated in [35] and was subsequently copied in other publications. We include the AR$_2$(3) source here for the purpose of comparison to published results.

Using notation from the previous section, the prediction (of the current data sample, $x_i$) associated with survivor $k$ is $$\hat{x}_{i|i-1}^k = \sum_{j=1}^{L} a_j \hat{x}_{i-j}^k. \quad (4)$$

Using (4) and the definitions in the previous section, it is easily shown that if $\hat{x}_i^k \approx x_i$, then $d_i^k \approx w_i$. Since $w_i$ is a realization of a Gaussian random variable, say $W$, we have chosen to use the output alphabets that were optimized for the Gaussian source in Section V as the output alphabets in our PTCQ systems for Gauss-Markov sources. This choice can also be justified by the results of [36] where Kolmogorov-Smirnov goodness of fit tests were performed on prediction residuals of scalar DPCM systems. It was found that prediction residuals resulting from a Gauss-Markov input source can be reasonably modeled as realizations of a Gaussian random variable.

For low rates ($R < 2$), the distortion may be large enough to cause the assumption that $d_i^k \approx w_i$ to be questionable. To partially compensate for this fact, the sample standard deviation of $d_i^k$ was computed during simulations of the PTCQ systems and used as a scale factor for the output alphabet in subsequent simulations. Iterating on this procedure a few times led to a sample standard deviation that closely matched the scale factor used for the output alphabet. Essentially, the result of this procedure is that the scale of the output alphabet is matched to the variance of the source it is meant to encode.

In each case, the performance obtained when using the variance-matched output alphabets was superior to that obtained when using output alphabets matched to the variance of $W$ (when the two vari-

TABLE XVII
COEFFICIENTS AND DISTORTION RATE FUNCTIONS FOR VARIOUS GAUSS-MARKOV SOURCES OF INTEREST. ($D(R)$ VALUES ARE LISTED AS SNR IN dB)

| Source | Coefficients | $D(1)$ | $D(2)$ | $D(3)$ |
|---|---|---|---|---|
| AR(1) | $a_1 = .9$ | 13.23 | 19.25 | 25.27 |
| AR(2) | $a_1 = 1.515, a_2 = -.752$ | 14.96 | 21.64 | 27.86 |
| AR$_1$(3) | $a_1 = 1.748, a_2 = -1.222, a_3 = .310$ | 14.52 | 22.06 | 28.10 |
| AR$_2$(3) | $a_1 = 1.75, a_2 = -1.22, a_3 = .301$ | 14.59 | 22.16 | 28.18 |

TABLE XVIII
PTCQ PERFORMANCE FOR THE AR(1) SOURCE. (VALUES ARE LISTED AS SNR IN dB)

| Rate (bits) | Trellis Size (States) | | | | | | | Scalar DPCM | Distortion Rate Function |
|---|---|---|---|---|---|---|---|---|---|
| | 4 | 8 | 16 | 32 | 64 | 128 | 256 | | |
| 1 | 11.10 | 11.60 | 11.80 | 12.13 | 12.22 | 12.41 | 12.49 | 10.00 | 13.23 |
| 2 | 17.21 | 17.69 | 17.95 | 18.13 | 18.24 | 18.33 | 18.41 | 16.07 | 19.25 |
| 3 | 22.92 | 23.40 | 23.60 | 23.78 | 23.90 | 23.94 | 23.96 | 21.69 | 25.27 |

TABLE XIX
PTCQ PERFORMANCE FOR THE AR(2) SOURCE. (VALUES ARE LISTED AS SNR IN dB)

| Rate (bits) | Trellis Size (States) | | | | | | | Scalar DPCM | Distortion Rate Function |
|---|---|---|---|---|---|---|---|---|---|
| | 4 | 8 | 16 | 32 | 64 | 128 | 256 | | |
| 1 | 11.58 | 12.14 | 12.66 | 13.06 | 13.26 | 13.47 | 13.64 | 9.39 | 14.96 |
| 2 | 18.92 | 19.57 | 20.01 | 20.29 | 20.48 | 20.60 | 20.72 | 17.31 | 21.64 |
| 3 | 25.00 | 25.63 | 25.92 | 26.10 | 26.27 | 26.36 | 26.40 | 23.74 | 27.86 |

TABLE XX
PTCQ PERFORMANCE FOR THE AR$_1$(3) SOURCE. (VALUES ARE LISTED AS SNR IN dB)

| Rate (bits) | Trellis Size (States) | | | | | | | Scalar DPCM | Distortion Rate Function |
|---|---|---|---|---|---|---|---|---|---|
| | 4 | 8 | 16 | 32 | 64 | 128 | 256 | | |
| 1 | 10.95 | 11.59 | 12.16 | 12.57 | 12.84 | 13.06 | 13.21 | 8.40 | 14.51 |
| 2 | 19.00 | 19.67 | 20.15 | 20.47 | 20.71 | 20.85 | 20.96 | 16.90 | 22.07 |
| 3 | 25.37 | 25.97 | 26.30 | 26.50 | 26.67 | 26.76 | 26.80 | 23.79 | 28.10 |

TABLE XXI
PTCQ PERFORMANCE FOR THE AR$_2$(3) SOURCE. (VALUES ARE LISTED AS SNR IN dB)

| Rate (bits) | Trellis Size (States) | | | | | | | Scalar DPCM | Distortion Rate Function |
|---|---|---|---|---|---|---|---|---|---|
| | 4 | 8 | 16 | 32 | 64 | 128 | 256 | | |
| 1 | 11.03 | 11.65 | 12.24 | 12.64 | 12.90 | 13.12 | 13.28 | 8.46 | 14.59 |
| 2 | 19.03 | 19.74 | 20.23 | 20.54 | 20.78 | 20.93 | 21.06 | 16.96 | 22.16 |
| 3 | 25.42 | 26.04 | 26.38 | 26.58 | 26.75 | 26.85 | 26.87 | 23.88 | 28.18 |

TABLE XXII
PERFORMANCE OF VARIOUS SOURCE CODING SCHEMES FOR THE AR(1) SOURCE. (VALUES ARE LISTED AS SNR IN dB)

| | TCQ | | Clust Alg VQ* | | PTWC | | DPCM |
|---|---|---|---|---|---|---|---|
| Rate | 8 Sts. | 128 Sts. | Dim. 4 | Dim. 7 | 8 Sts. | 128 Sts. | |
| 1 | 11.60 | 12.41 | 10.2 | 11.2 | 11.47 | 12.58 | 10.00 |
| 2 | 17.69 | 18.33 | 16.00 | N/A | N/A | N/A | 16.07 |
| 3 | 23.40 | 23.94 | N/A | N/A | N/A | N/A | 21.69 |

* within accuracy of graph in [38]

ances differed). The scale factors used for each source, encoding rate, and trellis size are tabulated in [26]. Note that for an encoding rate of 3 bits per sample, the scale factor is unity in each case. This is as expected, since for encoding rates larger than about 2 bits per sample, the distortion is small enough that the prediction residual can be very closely modeled by $w_i$ for even scalar DPCM.

As in previous sections, simulation studies were carried out using 100 sequences of 1000 samples each and Ungerboeck's amplitude modulation trellises. The results of these simulations are presented in Tables XVIII-XXI for the AR(1), AR(2), AR$_1$(3), and AR$_2$(3) sources, respectively. For comparison, scalar DPCM systems were also simulated using Gaussian Lloyd-Max quantizers to scale factors "optimized" as in the PTCQ coders. The 95 percent confidence intervals were computed and found to be no worse than ±0.06 dB, ±0.08, ±0.09, and ±0.09 dB for the PTCQ performance values in Tables XVIII-XXI, respectively. The 95 percent confidence intervals for the DPCM systems were slightly larger, but not more than a few hundredths of a dB.

The performance of PTCQ for these sources is quite good. For each of the 256-state PTCQ systems, the SNR is at least 2.30 dB better than the corresponding scalar DPCM system. In some cases, PTCQ outperforms scalar DPCM by nearly 5 dB. Even the four-state systems perform between 1.19 dB and 2.57 dB better than the corresponding scalar DPCM systems.

Farvardin and Modestino reported results for entropy coded DPCM systems in [37]. They found, that for highly correlated first-order Gauss-Markov sources, the performance was at least 1.5 dB away from the rate distortion function for all rates of interest here. Since the 256-state PTCQ performance for the AR(1) source is within 1.3 dB of the rate distortion function at encoding rates of 1, 2, and 3 bits per sample, we conclude that PTCQ performance is superior to that of entropy coded DPCM for this source. It should also be noted that the performance of entropy coded DPCM deteriorates at low rates while PTCQ performance improves at low rates for highly correlated first-order Gauss-Markov processes, such as the AR(1) source studied here.

As in the memoryless case, PTCQ achieves good performance with trellises of moderate size. For the AR(1) source, the performance with only 32 states is as good or better than entropy coded DPCM. PTCQ using an eight-state trellis surpasses the vector quantization (VQ) results reported in [38] for the AR(1) source at encoding rates of 1 and 2 bits per sample. PTCQ also compares favorably with the rate-1 predictive trellis waveform coders (PTWC) designed by Ayanoğlu and Gray [13] using the generalized Lloyd algorithm. For the AR(1) source, the PTCQ systems outperform all PTWC systems with trellises having 32 or less states while the PTWC systems perform slightly better for trellises having 64 and 128 states. The performance of the encoding schemes discussed above for the AR(1) source are presented in Table XXII. The systems included are PTCQ, DPCM, clustering algorithm VQ [38], and PTWC [13].

Although PTCQ performance is not uniformly better than that of Ayanoğlu and Gray's PTWC systems, the complexity of PTCQ grows much more gracefully as a function of rate than would comparable PTWC systems. As mentioned previously, PTCQ and PTWC are quite similar for an encoding rate of 1 bit per sample. In fact, it is easily shown that the computational requirements in both cases are $(L + 2)N$ multiplies, $(L + 5)N$ adds, and $N$ compares per data sample where $L$ is the predictor order and $N$ is the number of trellis states. PTWC systems were only designed for encoding rates of 1 bit per sample in [13], but if PTWC were extended to higher encoding rates by the traditional method of expanding the trellis in such a manner that $2^R$ branches enter and leave each node, the resulting computational burden would be $(L + 2^R)N$ multiplies, $(L + 2^{R+1} + 1)N$ adds, and $(2^R - 1)N$ compares per data sample. This should be compared to the much smaller requirements of PTCQ. In particular, PTCQ requires only $(L + 2)N$ multiplies, $(L + 5)N$ adds, and $(2(R - 1) + 1)N$ compares per data sample.

Several encoding schemes for the AR$_2$(3) source at an encoding rate of 1 bit per sample are compared in [13]. PTCQ is superior to most of them in performance. Among the schemes which outperform PTCQ are Ayanoğlu and Gray's PTWC systems and a tree coder designed by Wilson and Husain [35]. The performance of these two schemes for the AR$_2$(3) source is listed in Table XXIII along with that for PTCQ. For the PTCQ and PTWC systems, $N$ is the number of trellis states, and for the tree coder, $N$ is the number of paths retained at each step of encoding while using the $(M, L)$ algorithm for searching the tree.

Although the PTWC and tree code SNR's are larger than those for PTCQ for each trellis size (number of paths retained in the tree code case) shown, it should be noted that the difference is decreasing rapidly as the trellis size grows. For example, with $N = 4$, the corresponding PTWC and tree code SNR's are 0.44 and 0.97 dB TABLE XXIII
PERFORMANCE OF VARIOUS SOURCE CODING SCHEMES FOR THE
$AR_2(3)$ SOURCE. (VALUES ARE LISTED AS SNR IN dB)

| Coder | N | | | | | | |
|---|---|---|---|---|---|---|---|
| | 4 | 8 | 16 | 32 | 64 | 128 | 256 |
| PTCQ | 11.03 | 11.85 | 12.24 | 12.64 | 12.90 | 13.12 | 13.28 |
| PTWC | 11.47 | 12.04 | 12.80 | 12.90 | N/A | N/A | N/A |
| Tree Code[1],[2] | 12.00 | 12.40 | 12.45 | N/A | N/A | N/A | N/A |

1 values taken from table in [13]
2 $(M, L)$ algorithm was used for the tree search with $M=N$ TABLE XXIV
DOUBLED AND OPTIMIZED OUTPUT ALPHABETS FOR THE
MEMORYLESS UNIFORM SOURCE

| Trellis Size (states) | Rate (bits) | Subset | | | |
|---|---|---|---|---|---|
| | | $D_0$ | $D_1$ | $D_2$ | $D_3$ |
| 4 | 1 | −1.0509 | −0.6680 | 0.6680 | 1.0509 |
| | 2 | −1.4263 | −1.1858 | −0.6606 | −0.2329 |
| | | 0.2329 | 0.6505 | 1.1858 | 1.4263 |
| | 3 | −1.5600 | −1.4978 | −1.2195 | −1.0215 |
| | | −0.7916 | −0.5480 | −0.3420 | −0.1113 |
| | | 0.1113 | 0.3420 | 0.5480 | 0.7916 |
| | | 1.0215 | 1.2195 | 1.4978 | 1.5600 |
| 256 | 1 | −1.1172 | −0.5507 | 0.5507 | 1.1172 |
| | 2 | −1.4481 | −1.1212 | −0.6505 | −0.2222 |
| | | 0.2222 | 0.6505 | 1.1212 | 1.4481 |
| | 3 | −1.5036 | −1.4272 | −1.1970 | −0.9709 |
| | | −0.7482 | −0.5369 | −0.3273 | −0.1192 |
| | | 0.1192 | 0.3273 | 0.5369 | 0.7482 |
| | | 0.9709 | 1.1970 | 1.4272 | 1.5956 | better than PTCQ respectively, but for $N = 16$, these values have already decreased to 0.36 and 0.21 dB, respectively. Also, we feel that a great deal (if not all) of the difference in performance between PTCQ and PTWC for small trellis sizes can be eliminated by using iterative procedures for optimizing the predictor and output alphabet similar to those used in designing the PTWC systems in [13].

XI. SUMMARY

A new source coding scheme for memoryless sources called trellis coded quantization (TCQ) has been developed. Simulation results for encoding the memoryless uniform, Gaussian, and Laplacian sources using TCQ were presented and computational requirements were summarized. A procedure was given for optimizing TCQ systems for encoding memoryless sources. A complete listing of the designs resulting from this optimization procedure for the memoryless uniform, Gaussian, and Laplacian sources is given in [26] while performance results are reported within the text here. In many cases, TCQ outperforms all previous source coding techniques with a fraction of the computational requirements of many of them. The effects of channel errors were examined, and specific bounds on the number of data samples that can be affected by a single channel error were developed.

Although the simulation studies discussed in Sections III–VI were limited to a few sources, we feel that similar results can be expected for other discrete memoryless sources. In particular, for sources with relatively light tailed probability density functions (such as the uniform and Gaussian sources), we would expect to achieve near-optimal performance (in a rate distortion theory sense) with modest design effort. For sources with relatively heavy tailed probability density functions (such as the Laplacian source), we would expect near-optimal performance to be more difficult to achieve.

In Section X, a predictive TCQ (PTCQ) structure was developed for encoding sources with memory. Simulation results were presented for encoding various Gauss–Markov sources that were chosen as models for sampled speech. Computational requirements were summarized and compared with those of other source coding schemes. PTCQ was shown to perform quite well in comparison with other schemes reported in the literature.

APPENDIX

This Appendix contains tables of doubled and optimized output alphabets for TCQ of memoryless sources. These alphabets were op- TABLE XXV
DOUBLED AND OPTIMIZED OUTPUT ALPHABETS FOR THE
MEMORYLESS GAUSSIAN SOURCE

| Trellis Size (states) | Rate (bits) | Subset | | | |
|---|---|---|---|---|---|
| | | $D_0$ | $D_1$ | $D_2$ | $D_3$ |
| 4 | 1 | −1.1908 | −0.3804 | 0.3804 | 1.1908 |
| | 2 | −1.8768 | −1.0728 | −0.6292 | −0.1775 |
| | | 0.1775 | 0.6292 | 1.0728 | 1.8768 |
| | 3 | −2.5390 | −1.7992 | −1.3484 | −1.0248 |
| | | −0.7732 | −0.5219 | −0.3203 | −0.1062 |
| | | 0.1062 | 0.3203 | 0.5219 | 0.7732 |
| | | 1.0248 | 1.3484 | 1.7992 | 2.5390 |
| 256 | 1 | −1.2392 | −0.2239 | 0.2239 | 1.2392 |
| | 2 | −1.8873 | −1.0620 | −0.5801 | −0.1852 |
| | | 0.1852 | 0.5801 | 1.0620 | 1.8873 |
| | 3 | −2.6300 | −1.8753 | −1.4154 | −1.0332 |
| | | −0.7416 | −0.5139 | −0.2790 | −0.1161 |
| | | 0.1161 | 0.2790 | 0.5139 | 0.7416 |
| | | 0.0332 | 1.4154 | 1.8753 | 2.6300 |

TABLE XXVI
DOUBLED AND OPTIMIZED OUTPUT ALPHABETS FOR THE
MEMORYLESS LAPLACIAN SOURCE

| Trellis Size (states) | Rate (bits) | Subset | | | |
|---|---|---|---|---|---|
| | | $D_0$ | $D_1$ | $D_2$ | $D_3$ |
| 4 | 1 | −1.4017 | −0.1422 | 0.1422 | 1.4017 |
| | 2 | −2.5920 | −1.2178 | −0.5342 | −0.1432 |
| | | 0.1432 | 0.5342 | 1.2178 | 2.5920 |
| | 3 | −3.9243 | −2.5645 | −1.7392 | −1.1633 |
| | | −0.8010 | −0.4752 | −0.2769 | −0.0384 |
| | | 0.0384 | 0.2769 | 0.4752 | 0.8010 |
| | | 1.1633 | 1.7392 | 2.5645 | 3.9243 |
| 256 | 1 | −1.4143 | −0.0239 | 0.0239 | 1.4143 |
| | 2 | −2.6622 | −1.2501 | −0.5119 | −0.0079 |
| | | 0.0979 | 0.5119 | 1.2501 | 2.6622 |
| | 3 | −4.5300 | −2.8319 | −1.9161 | −1.2703 |
| | | −0.8201 | −0.4813 | −0.2587 | −0.0449 |
| | | 0.0449 | 0.2587 | 0.4813 | 0.8201 |
| | | 1.2703 | 1.9161 | 2.8319 | 4.5300 | timized using the procedure described in Section IV. Tables XXIV, XXV, and XXVI list alphabets for the uniform, Gaussian, and Laplacian sources, respectively. For each trellis size and encoding rate, the values are listed according to the subset to which they belong.

REFERENCES

[1] G. Ungerboeck, "Channel coding with multilevel/phase signals," *IEEE Trans. Inform. Theory*, vol. IT-28, pp. 55–67, Jan. 1982.

[2] G. D. Forney, Jr., "Coset codes—Part I: Introduction and geometrical classification," *IEEE Trans. Inform. Theory*, vol. 34, pp. 1123–1151, Sept. 1988 (Invited Paper).

[3] ——, "Coset codes—Part II: Binary lattices and related codes," *IEEE Trans. Inform. Theory*, vol. 34, pp. 1151–1187, Sept. 1988 (Invited Paper).

[4] A. R. Calderbank and N. J. A. Sloan, "New trellis codes based on lattices and cosets," *IEEE Trans. Inform. Theory*, vol. IT-33, pp. 177–195, Mar. 1987.

[5] L. F. Wei, "Trellis-coded modulation with multidimensional constellations," *IEEE Trans. Inform. Theory*, vol. IT-33, pp. 483–501, July 1987.

[6] R. M. Gray, "Time-invariant trellis encoding of ergodic discrete-time sources with a fidelity criterion," *IEEE Trans. Inform. Theory*, vol. IT-23, pp. 71–83, Jan. 1977.

[7] A. J. Viterbi and J. K. Omura, "Trellis encoding of memoryless discrete-time sources with a fidelity criterion," *IEEE Trans. Inform. Theory*, vol. IT-20, pp. 325–332, May 1974.

[8] W. A. Finamore and W. A. Pearlman, "Optimal encoding of discrete-time continuous-amplitude memoryless sources with finite output alphabets," *IEEE Trans. Inform. Theory*, vol. IT-26, pp. 144–155, Mar. 1980.

[9] W. A. Pearlman, "Sliding-block and random source coding with constrained size reproduction alphabets," *IEEE Trans. Commun.*, vol. COM-30, pp. 1859–1867, Aug. 1982.

[10] W. A. Pearlman and A. Chekima, "Source coding bounds using quantizer reproduction levels," *IEEE Trans. Inform. Theory*, vol. IT-30, pp. 559–567, May 1984.

[11] S. G. Wilson, "Trellis encoding of continuous-amplitude, discrete-time information sources," Ph.D. dissertation, Univ. Washington, 1975.

[12] S. G. Wilson and D. W. Lytle, "Trellis encoding of continuous-amplitude memoryless sources," *IEEE Trans. Inform. Theory*, vol. IT-28, pp. 211–226, Mar. 1982.
[13] E. Ayanoğlu and R. M. Gray, "The design of predictive trellis waveform coders using the generalized Lloyd algorithm," *IEEE Trans. Commun.*, vol. COM-34, pp. 1073–1080, Nov. 1986.
[14] J. B. Anderson and S. Mohan, "Sequential encoding algorithms: A survey and cost analysis," *IEEE Trans. Commun.*, vol. COM-32, pp. 169–176, Feb. 1984.
[15] L. C. Stewart, R. M. Gray, and Y. Linde, "The design of trellis waveform coders," *IEEE Trans. Commun.*, vol. COM-30, pp. 702–710, Feb. 1982.
[16] G. D. Forney, Jr., "The Viterbi algorithm," *Proc. IEEE (Invited Paper)*, vol. 61, pp. 268–278, Mar. 1973.
[17] G. Ungerboeck, "Trellis-coded modulation with redundant signal sets—Part I: Introduction," *IEEE Commun. Mag.*, vol. 25, pp. 5–11, Feb. 1987.
[18] —, "Trellis-coded modulation with redundant signal sets—Part II: State of the art," *IEEE Commun. Mag.*, vol. 25, pp. 12–21, Feb. 1987.
[19] S. P. Lloyd, "Least squares quantization in PCM," unpublished memorandum, Bell Laboratories, 1957; see also *IEEE Trans. Inform. Theory*, vol. IT-28, pp. 129–137, 1982.
[20] J. Max, "Quantizing for minimum distortion," *IRE Trans. Inform. Theory*, vol. IT-6, pp. 7–12, Mar. 1960.
[21] R. E. Blahut, "Computation of channel capacity and rate-distortion functions," *IEEE Trans. Inform. Theory*, vol. IT-18, pp. 460–473, July 1972.
[22] N. S. Jayant and P. Noll, *Digital Coding of Waveforms*. Englewood Cliffs, NJ: Prentice-Hall, 1984.
[23] J. H. Conway and N. J. A. Sloane, "Voronoi regions of lattices, second moments of polytopes, and quantization," *IEEE Trans. Inform. Theory*, vol. IT-28, pp. 211–226, Mar. 1982.
[24] —, "Fast quantizing and decoding algorithms for lattice quantizers and codes," *IEEE Trans. Inform. Theory*, vol. IT-28, pp. 227–232, Mar. 1982.
[25] Y. Linde, A. Buzo, and R. M. Gray, "An algorithm for vector quantizer design," *IEEE Trans. Commun.*, vol. COM-28, pp. 84–95, Jan. 1980.
[26] M. W. Marcellin, "Trellis coded quantization: An efficient technique for data compression," Ph.D. dissertation, Texas A&M Univ., Dec. 1987.
[27] J. H. Conway and N. J. A. Sloane, "A lower bound on the average error of vector quantizers," *IEEE Trans. Inform. Theory*, vol. IT-31, pp. 106–109, Jan. 1985.
[28] N. Farvardin and J. W. Modestino, "Optimum quantizer performance for a class of non-Gaussian memoryless sources," *IEEE Trans. Inform. Theory*, vol. IT-30, pp. 485–497, May 1984.
[29] R. M. Dicharry, "An algorithm for adaptive vector quantizer design with real-time applications," M.S. thesis, Texas A&M Univ., Dec. 1984.
[30] N. Farvardin and J. W. Modestino, "On overflow and underflow problems in buffer-instrumented variable-length coding of fixed-rate memoryless sources," *IEEE Trans. Inform. Theory*, vol. IT-32, pp. 839–845, Nov. 1986.
[31] M. R. Schroeder and N. J. A. Sloane, "New permutation codes using Hadamard unscrambling," *IEEE Trans. Inform. Theory*, vol. IT-33, pp. 144–146, Jan. 1987.
[32] J.-P. Adoul and C. Lamblin, "A comparison of some algebraic structures for CELP coding of speech," *Conf. Proc. Int. Conf. Acoust., Speech, Signal Processing*, 1987, pp. 1953–1956.
[33] G. D. Forney, Jr., "Convolutional codes I: Algebraic structure," *IEEE Trans. Inform. Theory*, vol. IT-16, pp. 720–738, Nov. 1970.
[34] R. A. McDonald, "Signal-to-quantization noise ratio and idle channel performance of DPCM systems with particular application to voice signals," *Bell Syst. Tech. J.*, vol. 45, pp. 1123–1151, Sept. 1966.
[35] S. G. Wilson and S. Husain, "Adaptive tree encoding of speech at 8000 bits/s with a frequency-weighted error criterion," *IEEE Trans. Commun.*, vol. COM-27, pp. 165–170, Jan. 1979.
[36] Data compression class project for Dr. T. R. Fischer, Dep. Elec. Eng., Texas A&M Univ., Spring 1986.
[37] N. Farvardin and J. W. Modestino, "Rate-distortion performance of DPCM schemes for autoregressive sources," *IEEE Trans. Inform. Theory*, vol. IT-31, pp. 402–418, May 1985.
[38] R. M. Gray and Y. Linde, "Vector quantizers and predictive quantizers for Gauss-Markov sources," *IEEE Trans. Commun.*, vol. COM-30, pp. 381–389, Feb. 1982.
[39] Y. Yamada, S. Tazaki, and R. M. Gray, "Asymptotic performance of block quantizers with difference distortion measures," *IEEE Trans. Inform. Theory*, vol. IT-26, pp. 6–14, Jan. 1980.

★

Michael W. Marcellin was born in Bishop, CA, on July 1, 1959. He received the M.S. and Ph.D. degrees in electrical engineering from Texas A&M University in 1985 and 1987, respectively. He graduated summa cum laude with the B.S. degree in electrical engineering from San Diego State University in 1983 where he was named the most outstanding student in the College of Engineering by the engineering faculty.

He is currently an Assistant Professor of Electrical and Computer Engineering at The University of Arizona. His research interests include digital communication theory, data compression, and signal processing.

Dr. Marcellin is a member of Tau Beta Pi, Eta Kappa Nu, and Phi Kappa Phi.

★

Thomas R. Fischer received the Ph.D. degree in electrical and computer engineering from the University of Massachusetts, Amherst, in 1979, and the M.S. degree from the same university in 1978, and the Sc.B. degree magna cum laude from Brown University in 1975.

From June 1975 until August 1976, he was a Staff Engineer at the Charles Stark Draper Laboratory in Cambridge, MA. From September 1979 until December 1988 he was with the Department of Electrical Engineering, Texas A&M University. Since January 1989 he has been a Professor in the Department of Electrical and Computer Engineering at Washington State University. His current research interests include data compression, vector quantization, digital communications, and digital signal processing.

What is claimed is:

1. An image coder for use in encoding an image for transmission over a channel, comprising:

an input image source for providing an image to be encoded;

a wavelet decomposition unit for dividing said image into a plurality of two dimensional frequency subbands, each of said plurality of two dimensional frequency subbands having X rows and Y columns wherein X and Y vary with each of the subbands;

a phase scrambling unit for generating phase scrambled frequency subbands by modifying a phase component of each of said plurality of two dimensional frequency subbands using a one-dimension m-sequence truncated to a (X) times (Y) length; and a fixed rate trellis coded quantization (FRTCQ) unit for performing FRTCQ on said phase scrambled frequency subbands.

2. The image coder as claimed in claim 1, wherein said input image source includes an input for receiving an image from an exterior environment.

3. The image coder as claimed in claim 1, wherein said plurality of two dimensional frequency subbands include a lowest frequency subband (LFS) and a first group of said plurality of two dimensional frequency subbands that does not include said LFS, wherein the subbands in said first group of said plurality of two dimensional frequency subbands all have a common size; and said wavelet decomposition unit further divides said LFS into a plurality of smaller frequency subbands.

4. The image coder as claimed in claim 3, wherein said LFS has a size equal to said common size.

5. The image coder as claimed in claim 3, wherein said first group of said plurality of two dimensional frequency subbands includes substantially all of the subbands in said plurality of two dimensional frequency subbands except said LFS.

6. The image coder as claimed in claim 3, wherein said phase scrambling unit individually modifies the phase of each of said plurality of smaller frequency subbands.

7. The image coder as claimed in claim 1, wherein said one-dimension m-sequence truncated to a (X)(Y) length includes a pseudo-noise (PN) sequence.

8. The image coder as claimed in claim 1, wherein said one-dimension m-sequence truncated to a (X)(Y) length includes a binary pseudo-noise (PN) sequence.

9. The image coder as claimed in claim 1, wherein said one-dimension m-sequence is generated from a feedback shift register corresponding to a 16th-order primitive polynomial of $x^{16}+x^5+x^3+x+1$.

10. The image coder as claimed in claim 1, wherein said wavelet decomposition unit includes a plurality of high pass filters and a plurality of low pass filters.

11. A communications system for delivering an image from a first location to a second location, comprising:

a transmitter at said first location for creating a transmit signal including a first image, said transmitter including an image coder comprising:

a wavelet decomposition unit for dividing said first image into a plurality of two dimensional frequency subbands, each of said plurality of two dimensional frequency subbands having X rows and Y columns wherein X and Y vary with each of the subbands;

a phase scrambling unit for generating phase scrambled frequency subbands by modifying a phase component of each of said two dimensional frequency subbands using a one-dimension m-sequence truncated to a (X) times (Y) length; and a fixed rate trellis coded quantization (FRTCQ) unit for performing FRTCQ on said phase scrambled frequency subbands;

a receiver at said second location for receiving said transmit signal and for processing said transmit signal to extract said first image; and a channel for carrying said transmit signal from said transmitter to said receiver wherein said channel approximates a noiseless channel.

12. The communications system of claim 11, wherein said receiver includes noise mitigation equipment for ensuring that said channel approximates a noiseless channel.

13. The communications system of claim 11, further comprising means for performing adaptive-rate coded digital image transmission.

14. The communications system of claim 11, wherein said plurality of two dimensional frequency subbands include a lowest frequency subband (LFS) and a first group of said plurality of two dimensional frequency subbands that does not include said LFS, wherein frequency subbands in said first group of said plurality of two dimensional frequency subbands all have a common size; and said wavelet decomposition unit further divides said LFS into a plurality of smaller frequency subbands.

15. The communications system of claim 14, wherein said LFS has a size equal to said common size.

16. The communications system of claim 14, wherein said first group of said plurality of two dimensional frequency subbands includes substantially all of the subbands in said plurality of frequency subbands except said LFS.

17. The communications system of claim 14, wherein said phase scrambling unit individually modifies the phase of each of said plurality of smaller frequency subbands.

18. The image coder of claim 1, wherein said phase scrambling unit comprises:

a one-dimensional FFT transforming each of said plurality of two dimensional frequency subbands mapped into a one-dimensional sequence of said (X)(Y) length;

a separator separating FFT transformed coefficients into a phase component and a magnitude component an combiner adding said phase component to a phase component of said one-dimensional m-sequence truncated to said (X)(Y) length resulting in a modified phase spectrum of said frequency subbands;' a one-dimensional inverse FFT receives said modified phase spectrum of said frequency subbands and said magnitude of said magnitude component of said separator and generates phase scrambled frequency subbands.

19. The image coder of claim 1, wherein said wavelet decomposition unit includes a modified Mallat tree configuration decomposing said image input source into 22 subbands.

* * * * *